(12) United States Patent
Wake et al.

(10) Patent No.: US 7,858,251 B2
(45) Date of Patent: Dec. 28, 2010

(54) FUEL CELL SYSTEM AND SCAVENGING METHOD FOR USE IN A FUEL CELL SYSTEM

(75) Inventors: Chihiro Wake, Shioya-gun (JP); Shigeru Inai, Shioya-gun (JP); Koichiro Miyata, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 1104 days.

(21) Appl. No.: 11/583,104

(22) Filed: Oct. 18, 2006

(65) Prior Publication Data

US 2007/0092771 A1 Apr. 26, 2007

(30) Foreign Application Priority Data

Oct. 21, 2005 (JP) .............................. 2005-307193
Oct. 27, 2005 (JP) .............................. 2005-313309

(51) Int. Cl.
*H01M 8/04* (2006.01)
(52) U.S. Cl. .................................... 429/429
(58) Field of Classification Search ................... 429/13, 429/22, 24, 429
See application file for complete search history.

(56) References Cited

FOREIGN PATENT DOCUMENTS

| JP | 2001-351666 | 12/2001 |
|---|---|---|
| JP | 2003-331893 | 11/2003 |
| JP | 2004-152599 | 5/2004 |

*Primary Examiner*—Gregg Cantelmo
(74) *Attorney, Agent, or Firm*—Nelson Mullins Riley & Scarborough LLP; Anthony A. Laurentano

(57) ABSTRACT

After an ignition switch is turned off, in order to suppress operation of an air compressor and thereby reduce noise, liquid droplets residing in an oxygen-containing gas flow field as well as liquid droplets residing in a fuel gas flow field are removed during separate time periods, such that the flow rate in the oxygen-containing gas flow field and the flow rate in the fuel gas flow field do not become large at the same time. Then, an electrolyte membrane is dried using an oxygen-containing gas, in order to improve the performance upon starting a next operation.

16 Claims, 30 Drawing Sheets

FIG. 15   10B FUEL CELL SYSTEM   12B FUEL CELL VEHICLE

THREE STAGE SCAVENGING PROCESS

THREE STAGE SCAVENGING PROCESS (WITH DIVISION)

FUEL CELL SYSTEM AND SCAVENGING METHOD FOR USE IN A FUEL CELL SYSTEM

BACKGROUND OF THE INVENTION

1. Field of the Invention

The present invention relates to a fuel cell system and a scavenging method for use in a fuel cell system, in which scavenging of at least one of a fuel gas flow field and an oxygen-containing gas flow field can be performed at the time of stopping power generation, or after stopping power generation, in order to prepare for the initiation of a next operation of the fuel cell system, which operates at a low temperature, such as a temperature below the freezing point.

2. Description of the Related Art

By way of example, a polymer electrolyte fuel cell employs a membrane electrode assembly, which includes an anode (fuel electrode) and a cathode (air electrode), and a polymer electrolyte membrane interposed between the electrodes. The electrolyte membrane is an ion exchange membrane. The membrane electrode assembly is sandwiched between a pair of separators. A fuel gas flow field is formed between the anode and one of the separators, and an oxygen-containing gas flow field is formed between the cathode and the other separator. In use, normally, a predetermined number of membrane electrode assemblies together with separators are stacked together to form a fuel cell stack.

In the fuel cell, a fuel gas such as a hydrogen-containing gas is supplied to the fuel gas flow field. The fuel gas flows through the fuel gas flow field along the anode. A catalyst within the anode induces a chemical reaction with the fuel gas, in order to split hydrogen molecules into hydrogen ions and electrons. The hydrogen ions move toward the cathode through a suitably humidified electrolyte membrane, and the electrons flow through an external circuit to the cathode, thus creating DC electrical energy. Further, in the fuel cell, an oxygen-containing gas such as air is supplied to the oxygen-containing gas flow field, and the oxygen-containing gas flows along the cathode for causing a reaction. At the cathode, hydrogen ions from the anode combine with electrons and oxygen, producing water. Water is also retained at the anode due to back diffusion from the cathode, or as a result of high humidification of the fuel gas.

If water at any of the electrodes becomes excessive, water clogging may occur. Thus, in the fuel cell system of this type, when stopping operation of the fuel cell system, in order to achieve a desired performance when initiating the next operation of the fuel cell system, a technique for scavenging both sides of the anode and the cathode has been proposed. In such an anode/cathode scavenging technique, the oxygen-containing gas is supplied to the anode as well as to the cathode in order, for example, to remove water produced during power generation from the membrane electrode assembly or from the separators in the fuel cell (see Japanese Laid-Open Patent Publication No. 2003-331893).

In this anode/cathode scavenging technique, in order to remove liquid droplets, the oxygen-containing gas is supplied at a large flow rate. Thus, while performing the scavenging process, an air compressor for discharging oxygen-containing gas, such as air, is operated with high power.

However, in the fuel cell system, if the power generation period from start to end is short, in some cases, the amount of water produced by power generation is small at the anode, and large only at the cathode. Even in such cases, in the above anode/cathode scavenging process, which is performed at a large flow rate, a large capacity air compressor is required. Further, when the air compressor is operated at a large flow rate, loud noises are produced disadvantageously. Further, the high capacity air compressor is large and heavy, and consumes a large amount of energy compared to normal capacity air compressors.

Further, after the fuel cell system has stopped, when the outside temperature thereof decreases and the fuel cell is started at a low temperature, such as a temperature below the freezing point, before the fuel cell has fully warmed up, the ignition switch may be turned off by an operator such as a driver. Therefore, if operation of the fuel cell system is stopped after operation of the fuel cell system has been started at a temperature below the freezing point, and power generation is performed for a short period of time, or stated otherwise, if operation of the fuel cell system is stopped by action of the driver in a short period of time after operation of the fuel cell has been started at a temperature below the freezing point, it has been found, in some cases, that the fuel cell system becomes unstable due to insufficient activity of the electrolyte membrane.

A technique for eliminating such instability beforehand, in order to achieve desired performance when initiating a next operation of the fuel cell system, has been proposed (see Japanese Laid-Open Patent Publication No. 2004-152599).

According to this technique, immediately after operation of the fuel cell system has been started at a temperature below the freezing point, if the ignition switch is turned off, halting power generation by the fuel cell is prohibited until the temperature of the fuel cell reaches a predetermined value or more. Thus, the electrolyte membrane is always kept sufficiently active, and stable performance when initiating a next operation can be achieved.

However, in the technique disclosed in Japanese Laid-Open Patent Publication 2004-152599, immediately after operation of the fuel cell system has been started at a temperature below the freezing point, if the ignition switch is turned off, halting of power generation by the fuel cell is prohibited until the temperature of the fuel cell reaches or exceeds a predetermined value. In this case, the operator of a moving object, such as the fuel cell vehicle, may feel a sense of discomfort, since the fuel cell system is operated to perform power generation even though the ignition switch has been turned off.

Further, in the technique disclosed in Japanese Laid-Open Patent Publication No. 2003-331893, when water on both the anode and cathode sides is discharged simultaneously upon stopping the fuel cell system, a large capacity air compressor, which produces a large amount of wind, is required. Therefore, energy consumption is large, and large noises are produced.

SUMMARY OF THE INVENTION

The present invention has been made taking into consideration the aforementioned problems, wherein an object of the present invention is to provide a fuel cell system, as well as a scavenging method for the fuel cell system, in which it is possible to use a scavenging means having small energy consumption, and consequently, which makes it possible to reduce energy consumption and reduce noises at the time of stopping power generation.

Further, another object of the present invention is to provide a fuel cell system and a scavenging method, in which a scavenging means that consumes a small amount of energy can be used, and consequently, wherein it is possible to reduce energy consumption when power generation is stopped, and improve performance when starting a next operation.

Further, still another object of the present invention is to provide a fuel cell system and a scavenging method for a fuel cell system, in which, even if there is a request to stop operation of the fuel cell system after generating power for a short period of time at low temperatures, a scavenging process can be performed when the request is received, and the next operation of the fuel cell system can reliably be restarted, even when operating at low temperatures, such as a temperature below the freezing point.

Further, still another object of the present invention is to provide a fuel cell system and a scavenging method for a fuel cell system, in which it is possible to clarify a trade off between performance of the scavenging process, triggered upon request to stop operation of the fuel cell system after generating power for a short period of time at low temperatures, and product marketability such as fuel economy.

Further, still another object of the present invention is to provide a fuel cell system and a scavenging method for a fuel cell system, in which it is possible to prevent an operator from feeling a sense of discomfort, due to continuing power generation when operation of the fuel cell system has been stopped.

Further, still another object of the present invention is to provide a fuel cell system and a scavenging method for a fuel cell system, in which a fuel gas can be efficiently diluted and discharged when operation of the fuel cell system is stopped.

According to the present invention, the fuel cell system comprises a fuel cell operated to generate power by reaction of a fuel gas supplied to a fuel gas flow field and an oxygen-containing gas supplied to an oxygen-containing gas flow field, a scavenging means for scavenging in at least one of the fuel gas flow field where the fuel gas flows and the oxygen-containing gas flow field where the oxygen-containing gas flows, using a scavenging gas when power generation by the fuel cell is stopped, and a water amount detection means for detecting an amount of water produced in the fuel gas flow field as a result of power generation of the fuel cell. When operation of the fuel cell is stopped, and when the amount of water in the fuel gas flow field is at or below a predetermined value, the scavenging means performs a first scavenging process for scavenging in the oxygen-containing gas flow field using the scavenging gas at a large flow rate in order to remove liquid droplets in the oxygen-containing gas flow field, a second scavenging process for scavenging in the fuel gas flow field using the scavenging gas at the large flow rate in order to remove liquid droplets in the fuel gas flow field, and a third scavenging process for scavenging in the oxygen-containing gas flow field after the first scavenging process has been performed, using a scavenging gas at a small flow rate, which is smaller than the large flow rate.

These scavenging processes may be performed in the order of the first scavenging process→the second scavenging process→the third scavenging process, in the order of the first scavenging process→the third scavenging process→the second scavenging process, or in the order of the second scavenging process→the first scavenging process→the third scavenging process.

According to the present invention, when power generation of the fuel cell is stopped, and when the amount of water in the fuel gas flow field is at or below a predetermined value, the scavenging means performs a first scavenging process for scavenging in the oxygen-containing gas flow field using the scavenging gas at a large flow rate in order to remove liquid droplets in the oxygen-containing gas flow field, a second scavenging process for scavenging in the fuel gas flow field using the scavenging gas at the large flow rate in order to remove liquid droplets in the fuel gas flow field, and a third scavenging process for scavenging in the oxygen-containing gas flow field after the first scavenging process has been performed, using the scavenging gas at a small flow rate, which is smaller than the large flow rate. Therefore, unlike the conventional technique, the scavenging gas is not supplied at a large flow rate to both the oxygen-containing gas flow field and the fuel gas flow field at the same time. Therefore, a scavenging means that consumes a small amount of energy can be used. As a result, energy consumption at the time of stopping power generation, as well as noises, can be reduced.

Noise reduction is an advantage in terms of product marketability of the fuel cell system, as well as vehicles equipped with the fuel cell system. Further, since the inside of the fuel cell is dried suitably, it is possible to achieve suitable starting of the fuel cell system during the next operation thereof. In particular, in a polymer electrolyte fuel cell, when operation is stopped, it is possible to regulate the water amount (moisture content) of the solid polymer electrolyte membrane, thereby enabling suitable starting of the fuel cell system during the next operation thereof.

In the above system, the water amount detection means detects a water amount based on a moisture state at the time of starting operation of the fuel cell, as well as a moisture state at the time of stopping operation of the fuel cell. Thus, it is possible to estimate the water amount correctly.

According to the present invention, a scavenging method for a fuel system, comprising a fuel cell operated to generate power by reaction of a fuel gas supplied to a fuel gas flow field and an oxygen-containing gas supplied to an oxygen-containing gas flow field, is provided. When power generation by the fuel cell is stopped, scavenging is performed using a scavenging gas, so as to conduct scavenging in at least one of the fuel gas flow field where the fuel gas flows and the oxygen-containing gas flow field where the oxygen-containing gas flows. The method comprises the step of detecting the amount of water produced in the fuel gas flow field by power generation of the fuel cell, at a time when operation of the fuel cell is stopped. When the amount of water in the fuel gas flow field is at or below a predetermined value, the method further comprises the steps of performing a first scavenging process for scavenging in the oxygen-containing gas flow field using the scavenging gas at a large flow rate in order to remove liquid droplets in the oxygen-containing gas flow field, performing a second scavenging process for scavenging in the fuel gas flow field using the scavenging gas at the large flow rate in order to remove liquid droplets in the fuel gas flow field, and performing a third scavenging process after the first scavenging process has been performed, for scavenging in the oxygen-containing gas flow field using the scavenging gas at a small flow rate, which is smaller than the large flow rate.

These scavenging processes may be performed in the order of the first scavenging process→the second scavenging process→the third scavenging process, in the order of the first scavenging process→the third scavenging process→the second scavenging process, or in the order of the second scavenging process→the first scavenging process→the third scavenging process.

According to the present invention, when power generation of the fuel cell is stopped, and when the amount of water in the fuel gas flow field is at or below a predetermined value, the method comprises the steps of performing a first scavenging process for scavenging in the oxygen-containing gas flow field using the scavenging gas at a large flow rate in order to remove liquid droplets in the oxygen-containing gas flow field, performing a second scavenging process for scavenging in the fuel gas flow field using the scavenging gas at the large flow rate in order to remove liquid droplets in the fuel gas flow field, and performing a third scavenging process after the first scavenging process has been performed, for scavenging in the oxygen-containing gas flow field using the scavenging gas at a small flow rate, which is smaller than the large flow rate. Therefore, unlike the conventional technique, the scavenging gas is not supplied at a large flow rate to both the oxygen-containing gas flow field and the fuel gas flow field at the same time. Therefore, a scavenging means that consumes a small amount of energy can be used. As a result, energy consumption at the time of stopping power generation, as well as noises, can be reduced.

Noise reduction is an advantage in terms of product marketability of the fuel cell system, as well as vehicles equipped with the fuel cell system. Further, since the inside of the fuel cell is dried suitably, it is possible to achieve suitable starting of the fuel cell system during the next operation thereof. In particular, in a polymer electrolyte fuel cell, when operation is stopped, it is possible to regulate the water amount (moisture content) of the solid polymer electrolyte membrane, thereby enabling suitable starting of the fuel cell system during the next operation thereof.

In this system, in the water amount detection step, the water amount is detected based on a moisture state at the time of starting operation of the fuel cell, as well as a moisture state at the time of stopping operation of the fuel cell. Thus, it is possible to estimate the water amount correctly.

According to the present invention, in the fuel cell system, when power generation is stopped, and when the amount of water is at or less than a predetermined value, energy consumed by the scavenging process, as well as noises, can be reduced. Further, energy consumption at the time of stopping power generation can be reduced, while improving performance when a subsequent operation of the fuel cell system is initiated.

According to the present invention, in the fuel cell system, a scavenging means that consumes a small amount of energy can be used, and consequently, energy consumption, as well as noises, is reduced. Further, the energy consumption at the time of stopping power generation can be reduced, while improving performance when a subsequent operation of the fuel cell system is initiated.

According to another aspect of the present invention, the fuel cell system comprises a fuel cell operated to generate power by reaction of a fuel gas supplied to a fuel gas flow field and an oxygen-containing gas supplied to an oxygen-containing gas flow field, and a scavenging means for scavenging in at least one of the fuel gas flow field where the fuel gas flows and the oxygen-containing gas flow field where the oxygen-containing gas flows, using a scavenging gas when power generation by the fuel cell is stopped. The scavenging means performs a first scavenging process for scavenging in the oxygen-containing gas flow field using the scavenging gas at a large flow rate in order to remove liquid droplets in the oxygen-containing gas flow field, a second scavenging process for scavenging in the fuel gas flow field using the scavenging gas at the large flow rate in order to remove liquid droplets in the fuel gas flow field, and a third scavenging process for scavenging in the oxygen-containing gas flow field using the scavenging gas at a small flow rate, which is smaller than the large flow rate. The second and third scavenging processes are performed after the first scavenging process in order of the second scavenging process followed by the third scavenging process, or in order of the third scavenging process followed by the second scavenging process, wherein the fuel gas in the fuel gas flow field is diluted and discharged at the same time in the first scavenging process or in the second scavenging process.

According to the present invention, when power generation by the fuel cell is stopped, the first scavenging process for removing liquid droplets from the oxygen-containing gas flow field, and the second scavenging process for removing liquid droplets from the fuel gas flow field, are performed successively (i.e., such processes are not performed at the same time). Therefore, in comparison with the conventional technique, a small capacity scavenging means can be used for removing liquid droplets. Further, after liquid droplets in the oxygen-containing gas flow field have been removed, further scavenging of the oxygen-containing gas is performed. Therefore, the oxygen-containing gas flow field is dried sufficiently, so as to achieve a predetermined moisture content (water amount). As a result, even if there is a request to stop operation of the fuel cell system after generating power for only a short period of time at low temperatures, when the request is received, it is possible to reliably perform such a scavenging process, and the next operation of the fuel cell system can be restarted even at a low temperature, such as a temperature below the freezing point.

Further, when stopping the fuel cell system, the system is stopped after the scavenging process has been performed. Therefore, unlike the conventional technique, after a stop request has been made, for example, by turning off the ignition switch, the operator does not feel a sense of discomfort due to the power generation operation.

Further, when the first scavenging process or the second scavenging process is performed, at the same time, the fuel gas in the fuel gas flow field is diluted and gradually discharged. Therefore, any increase in the discharge fuel gas concentration can be suppressed, and thus, a dedicated process for dilution/discharge of the fuel gas is not required. Hence, it is possible to efficiently dilute and discharge the fuel gas.

In this system, after the first scavenging process, and after a predetermined condition has been satisfied, e.g., after a predetermined period of time has elapsed, the third scavenging process is performed over a relatively long time period. Therefore, it is possible to stop the fuel cell system immediately after the stop request has been received. Thus, it is possible to further reduce any sense of discomfort. The second scavenging process may be performed for a relatively short period of time immediately after the first scavenging process, or before or after the third scavenging process.

Preferably, the small flow rate in the third scavenging process is determined so as to achieve a flow rate pressure in which the accumulated volume flow rate becomes maximum, or wherein a flow rate pressure at the exhaust port of the scavenging gas becomes maximum, in order to efficiently dry the oxygen-containing gas flow field.

Further, if the fuel cell system additionally comprises a system temperature detection means for detecting the temperature of the fuel cell system during a soaking period after stopping power generation, wherein the scavenging means performs the third scavenging process when the system temperature decreases to a preset temperature during the soaking period, the performance of the scavenging process can be taken into consideration. Specifically, as the system temperature gets higher, the performance of the scavenging process also becomes higher.

Further, the fuel cell may further comprise a system temperature detection means for detecting the system temperature of the fuel cell system at the time of stopping power generation, and a time counting means having a preset wait time from the time of stopping power generation until the time for performing the third scavenging process. The wait time may be set at the time of stopping power generation, based on a relationship between the soaking period from the time of stopping power generation and the system temperature during the soaking period. In this manner, by detecting the system temperature when power generation is stopped, it is unnecessary to detect the system temperature thereafter. As the wait time grows longer, the system temperature decreases and performance of the scavenging process becomes degraded. As the wait time after stopping power generation becomes longer, it is more probable that the operator is away from the fuel cell vehicle. Thus, in the present invention, the operator can perform the scavenging process from a position remote from the fuel cell vehicle, which is an advantage in terms of product merchantability. Further, by setting a long time period for the wait time in order to delay the timing at which the scavenging process is performed, it becomes unnecessary to perform the third scavenging process. The third scavenging process is not required when operation of the fuel cell system is restarted before the preset wait time elapses.

In this system, the preset temperature is set at or above a minimum temperature, wherein the minimum temperature is determined based on the relationship between the soaking period from the time of stopping power generation and the system temperature during the soaking period, so as to achieve a predetermined start up performance when a restarting operation is performed at low temperature. Further, the wait time is within the maximum period, which also is determined based on the relationship between the soaking period from the time of stopping power generation and the system temperature during the soaking period, so as to achieve a predetermined start up performance when the restarting operation is performed at low temperature.

Based on the relationship between the soaking period from the time when power generation is stopped and the system temperature during the soaking period, it is possible to clarify a trade off between performance of the scavenging process and product marketability, such as fuel economy.

Further, according to another aspect of the present invention, a scavenging method for a fuel system, comprising a fuel cell operated to generate power by reaction of a fuel gas supplied to a fuel gas flow field and an oxygen-containing gas supplied to an oxygen-containing gas flow field, is provided. When power generation is stopped, scavenging is performed using a scavenging gas, so as to conduct scavenging in at least one of the fuel gas flow field where the fuel gas flows and the oxygen-containing gas flow field where the oxygen-containing gas flows. The method comprises the steps of performing a first scavenging process for scavenging in the oxygen-containing gas flow field using the scavenging gas at a large flow rate in order to remove liquid droplets in the oxygen-containing gas flow field, performing a second scavenging process for scavenging in the fuel gas flow field using the scavenging gas at the large flow rate in order to remove liquid droplets in the fuel gas flow field, and performing a third scavenging process for scavenging in the oxygen-containing gas flow field using the scavenging gas at a small flow rate, which is smaller than the large flow rate. The second and third scavenging processes are performed after the first scavenging process in no particular order, wherein the fuel gas in the fuel gas flow field is diluted and discharged at the same time in either the first scavenging process or the second scavenging process.

According to the present invention, when power generation by the fuel cell is stopped, the first scavenging process for removing liquid droplets from the oxygen-containing gas flow field and the second scavenging process for removing liquid droplets from the fuel gas flow field are performed successively (i.e., such processes are not performed at the same time). Therefore, in comparison with the conventional technique, a small capacity scavenging means can be used for removing liquid droplets. Further, after removal of the liquid droplets in the oxygen-containing gas flow field, further scavenging of the oxygen-containing gas is performed. Therefore, the oxygen-containing gas flow field is dried sufficiently in order to achieve a predetermined moisture content. As a result, even if there is a request to stop operation of the fuel cell system after generating power for a short period of time at low temperature, when the request is received, it is possible to reliably perform the scavenging process. Further, the fuel cell system can reliably be restarted at the next operation thereof, even at low temperatures such as a temperature below the freezing point.

Further, when the fuel cell system is stopped, the system is stopped after performing the scavenging process. Therefore, unlike the conventional technique, after a stop request, such as turning off the ignition switch, has been performed, the operator does not feel any sense of discomfort as a result of an ongoing power generation operation.

Further, when the first scavenging process or the second scavenging process is performed, at the same time, the fuel gas in the fuel gas flow field is diluted and gradually discharged. Therefore, an increase in the discharge fuel gas concentration is suppressed, and thus, a dedicated process for dilution/discharge of the fuel gas is not required. Hence, it is possible to efficiently dilute and discharge the fuel gas.

Preferably, the small flow rate used during the third scavenging process is determined in order to achieve a flow rate pressure in which an accumulated volume flow rate is maximum, or in which the flow rate pressure at the exhaust port of the scavenging gas becomes maximum, in order to efficiently dry the oxygen-containing gas flow field.

In the system, after the first scavenging process is performed and a predetermined condition has been satisfied, e.g., after a predetermined time period has elapsed, the third scavenging process is performed over a relatively long period of time. Therefore, it is possible to stop the fuel cell system immediately after the stop request has been received. Thus, the sense of discomfort can further be reduced. It should be noted that the second scavenging process is performed for a relatively short time period immediately after the first scavenging process, or before or after the third scavenging process.

Further, also in the disclosed method of the present invention, as well as in the case of the disclosed system, for example, it is possible to detect a system temperature during the soaking period, and to determine the settings of the preset temperature for performing the third scavenging process. Further, it is possible to detect the system temperature at the time of stopping power generation, and to determine the settings of a wait time, from the time when power generation is stopped until the time for performing the third scavenging process.

According to the present invention, in the fuel cell system, even if there is a request to stop operation of the fuel cell system after generating power for a short period of time at low temperatures, a scavenging process can be performed when the request is received, and the next operation of the fuel cell system can reliably be restarted, even when operating at low temperatures, such as a temperature below the freezing point.

Further, since it is possible to stop the system by performing a suitable scavenging process immediately after receiving the stop request, the operator does not feel any sense of discomfort.

According to the present invention, even if there is a request to stop operation of the fuel cell system after generating power for a short period of time at low temperature, when the stop request is received, while taking into consideration the trade off between performance of the scavenging process and product merchantability, the required scavenging process can be performed, whereupon the next operation of the fuel cell can reliably be restarted, even at low temperatures such as a temperature below the freezing point.

Further, since it is possible to stop the system by performing a suitable scavenging process immediately after receiving the stop request, the operator does not feel any sense of discomfort.

Further, it is possible to reliably dilute and discharge the fuel gas when the fuel cell system is stopped.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Hereinafter, embodiments of the present invention shall be described with reference to the drawings.

Figure 1:
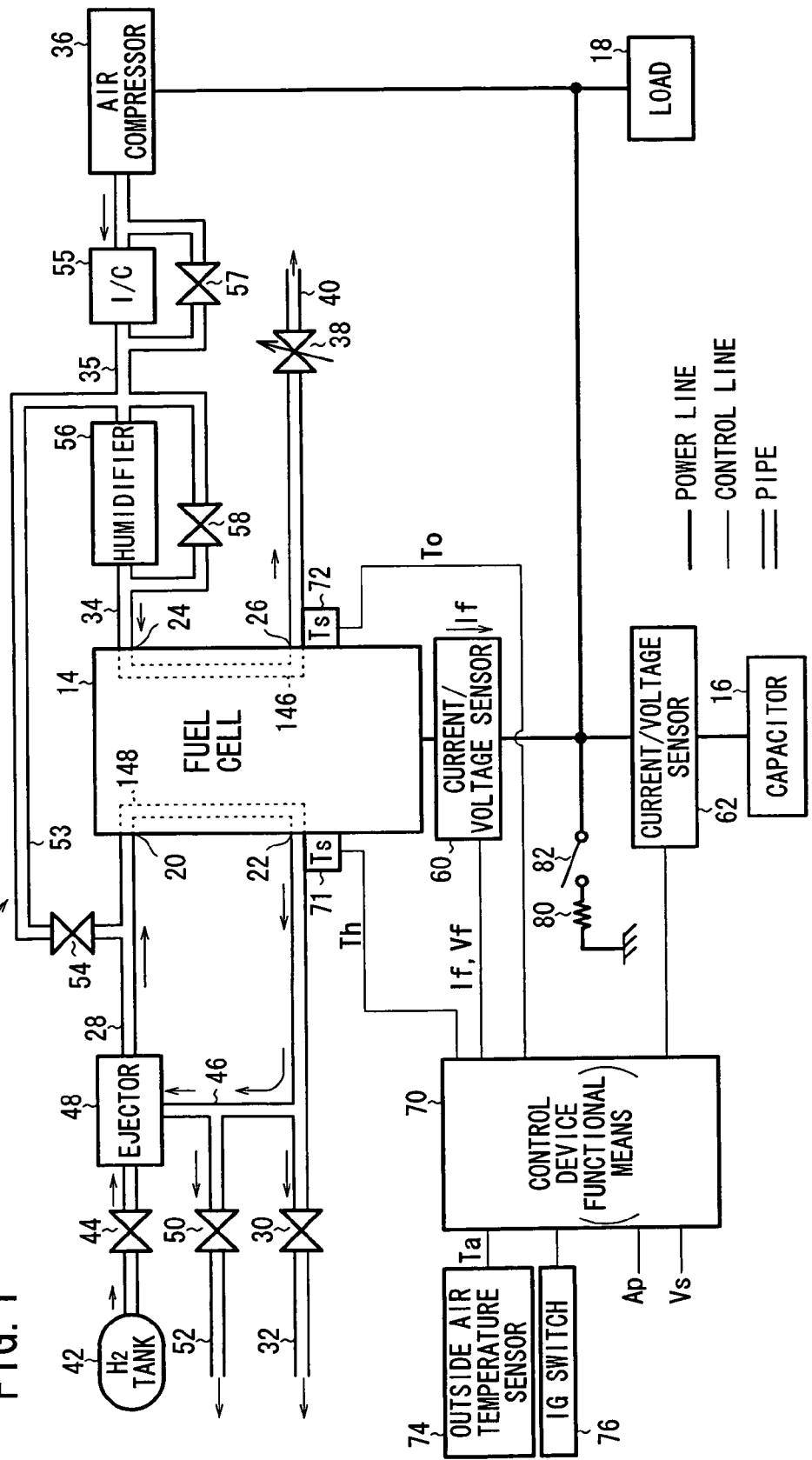
FIG. 1 is a diagram schematically showing the structure of a fuel cell vehicle equipped with a fuel cell system according to a first embodiment of the present invention.

FIG. 1 is a diagram schematically showing the structure of a fuel cell vehicle 12 equipped with a fuel cell system 10 according to a first embodiment of the present invention.

Basically, the fuel cell vehicle 12 includes a fuel cell 14, a capacitor 16, a load 18 including a motor that is driven to propel the fuel cell vehicle 12, and an auxiliary device such as an air compressor 36. The capacitor 16 serves as an energy storage means, in which a power generation current If of the fuel cell 14 is stored, and which assists the output of the fuel cell 14. For example, an electric double layer capacitor may be used as the capacitor 16. A battery may be used as an energy storage means instead of the capacitor 16, or both a battery and a capacitor 16 may be used.

The fuel cell 14 has a stacked structure, which is formed by stacking a plurality of cells each including an anode, a cathode, and a solid polymer electrolyte membrane interposed between the anode and the cathode.

Figure 2:
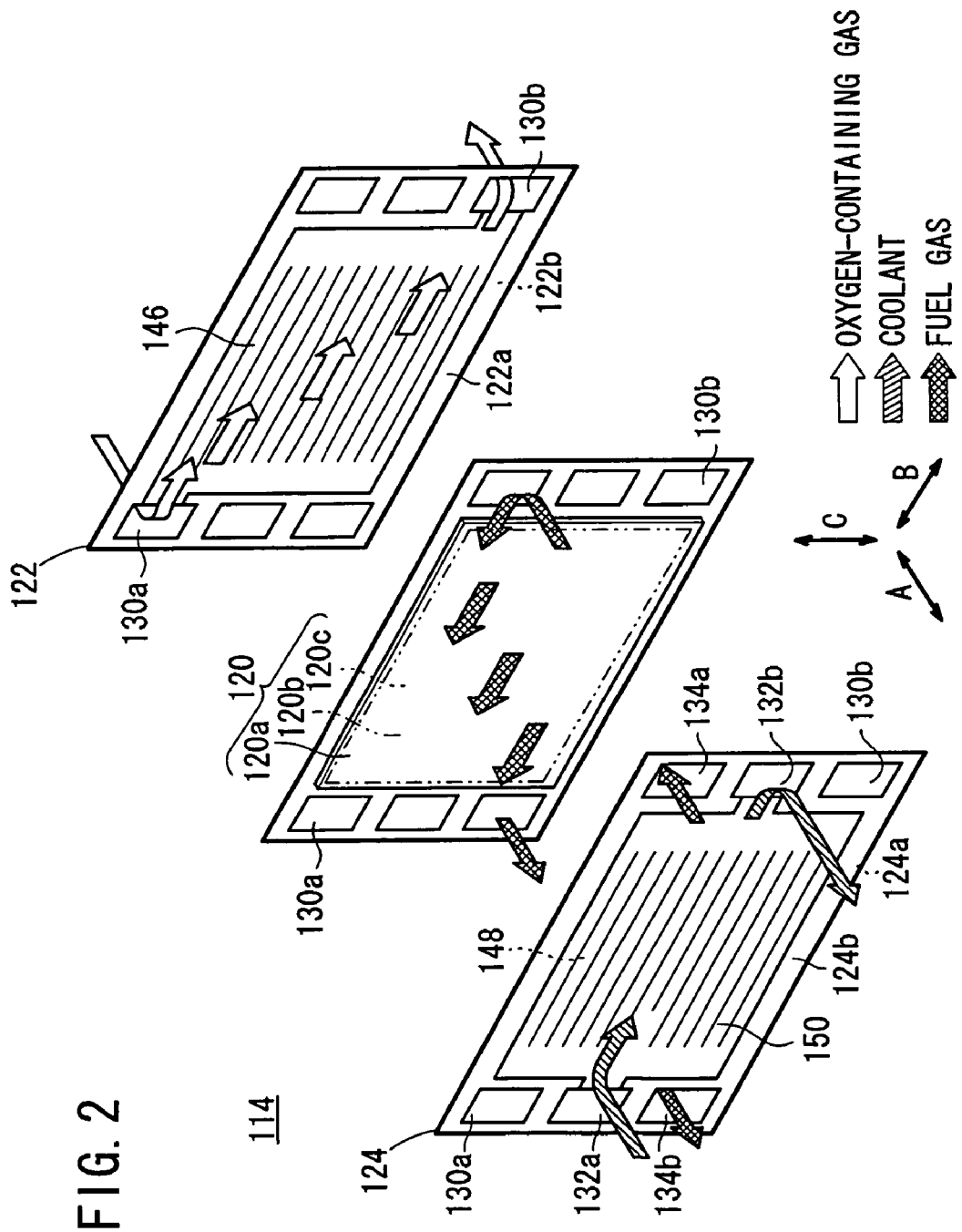
FIG. 2 is an exploded perspective view showing one of the cells that are stacked to form a fuel cell.

Specifically, as illustrated in FIG. 2, which shows an exploded perspective view of the fuel cell 14, each cell 114 of the fuel cell 14 includes a membrane electrode assembly 120 employing a solid polymer electrolyte membrane, with metal separators 122, 124 sandwiching the membrane electrode assembly 120.

At one end of the cell 114, in the direction indicated by the arrow B, an oxygen-containing gas supply passage 130a for supplying an oxygen-containing gas making up one of the reactant gases, a coolant supply passage 132a for supplying a coolant, and a fuel gas discharge passage 134b for discharging a fuel gas such as a hydrogen-containing gas making up the other reactant gas, are arranged vertically in the direction indicated by the arrow C. The oxygen-containing gas supply passage 130a, the coolant supply passage 132a, and a fuel gas discharge passage 134b extend through the cell 114 in a stacking direction, as indicated by the arrow A.

At the other end of the cell 114, a fuel gas supply passage 134a for supplying the fuel gas, a coolant discharge passage 132b for discharging the coolant, and an oxygen-containing gas discharge passage 130b for discharging the oxygen-containing gas are arranged in the direction indicated by the arrow C. The fuel gas supply passage 134a, the coolant discharge passage 132b, and the oxygen-containing gas discharge passage 130b also extend through the cell 114 in the direction indicated by the arrow A.

The membrane electrode assembly 120 includes an anode 120a, a cathode 120c, and an electrolyte membrane (solid polymer electrolyte membrane) 120b interposed between the anode 120a and the cathode 120c. The solid polymer electrolyte membrane 120b is formed by impregnating a thin membrane of perfluorosulfonic acid with water, for example.

The anode 120a and the cathode 120c each includes a gas diffusion layer, such as carbon paper, and an electrode catalyst layer formed by a platinum alloy supported on porous carbon particles. The carbon particles are deposited uniformly on the surface of the gas diffusion layer. The electrode catalyst layer of the anode 120a and the electrode catalyst layer of the cathode 120c are fixed to both surfaces of the solid polymer electrolyte membrane 120b, respectively.

The separator 122 has an oxygen-containing gas flow field (also referred to as the "reactant gas flow field") 146 on its surface 122a facing the membrane electrode assembly 120. The oxygen-containing gas flow field 146 is connected to both the oxygen-containing gas supply passage 130a and the oxygen-containing gas discharge passage 130b. For example, the oxygen-containing gas flow field 146 is formed between a plurality of grooves that extend in the direction indicated by the arrow B and the cathode 120c.

The separator 124 has a fuel gas flow field (also referred to as the "reactant gas flow field") 148 on its surface 124a facing the membrane electrode assembly 120. The fuel gas flow field 148 is connected to both the fuel gas supply passage 134a and the fuel gas discharge passage 134b. For example, the fuel gas flow field 148 is formed between a plurality of grooves that extend in the direction indicated by the arrow B and the anode 120a.

A coolant flow field 150 is formed between the surface 122b of the separator 122 and the surface 124b of the separator 124. The coolant flow field 150 guides the coolant supplied from the coolant supply passage 132a toward the coolant discharge passage 132b. The coolant flow field 150 is formed by stacking together a plurality of grooves, which are formed respectively on the separator 122 and on the separator 124. The coolant flow field 150 extends in the direction indicated by the arrow B.

Referring back to FIG. 1, the fuel cell 14 has a hydrogen supply port 20 for supplying a fuel gas such as hydrogen (H2) gas, a hydrogen discharge port 22 for discharging an exhaust gas from the fuel cell 14 (the exhaust gas contains hydrogen gas that has not been consumed during power generation), an air supply port 24 for supplying the oxygen-containing gas such as air, and an air discharge port 26 for discharging air containing unconsumed oxygen from the fuel cell 14.

A temperature sensor 71 is provided near the hydrogen discharge port 22, and a temperature sensor 72 is provided near the air discharge port 26. The temperature sensor 71 measures a temperature Th of the gas in the hydrogen discharge port 22, whereas the temperature sensor 72 measures a temperature To of the gas in the air discharge port 26. Further, although not shown, a temperature sensor for measuring the temperature of the coolant is provided near the outlet of the coolant discharge passage 132b (FIG. 2) in the fuel cell 14, for detecting (measuring) the temperature of the coolant.

A hydrogen supply channel 28 is connected to the hydrogen supply port 20. An ejector 48 is provided in the hydrogen supply channel 28. A hydrogen tank 42 stores high-pressure hydrogen, wherein the hydrogen gas is supplied from the hydrogen tank 42 to the ejector 48 through a hydrogen supply valve 44. The ejector 48 supplies hydrogen gas to the fuel cell 14 through the hydrogen supply channel 28 and the hydrogen supply port 20. Further, the ejector 48 sucks the exhaust gas, containing unconsumed hydrogen gas that has not been consumed in the fuel cell 14, whereby the exhaust gas is discharged into a hydrogen circulation channel 46, which is connected to the hydrogen discharge port 22. The exhaust gas sucked by the ejector 48 is supplied again to the fuel cell 14.

A hydrogen purge valve 30, which operates at a relatively large flow rate, is provided in the hydrogen circulation channel 46. The hydrogen purge valve 30 may be opened as necessary. When the hydrogen purge valve 30 is opened, the fuel gas, containing nitrogen gas mixed into the anode 120a from the cathode 120c through the electrolyte membrane 120b, is discharged to the outside through a hydrogen purge channel 32 and a dilution box (not shown). Thus, power generation stability is achieved. Further, a drain valve 50 is provided in the hydrogen circulation channel 46. The drain valve 50, which operates at a relatively small flow rate, discharges water that is retained in a catch tank (not shown) within the hydrogen circulation channel 46 to the outside through a water discharge channel 52.

An air supply channel 34 is connected to the air supply port 24. An air compressor 36, an intercooler (I/C) 55, a humidifier 56, an intercooler bypass valve 57, and a humidifier bypass valve 58 are connected to the air supply channel 34. The air compressor 36 includes a compressor motor for compressing atmospheric air introduced from the outside, and supplying the compressed air to the fuel cell 14. The intercooler 55 cools the high temperature compressed air (hot dry compressed air) that is discharged from the air compressor 36. The humidifier 56 humidifies the cooled air, and discharges humidified air. The intercooler bypass valve 57 bypasses the intercooler 55, and the humidifier bypass valve 58 bypasses the humidifier 56.

Further, a back pressure control valve 38 is provided at the air discharge port 26. The back pressure control valve 38 regulates the pressure of air supplied to the fuel cell 14 through the air supply channel 34 and the air supply port 24. The air discharge port 26 of the fuel cell 14 is connected to the outside through the back pressure control valve 38, an air discharge channel 40, and a dilution box (not shown).

Further, the air supply valve 54 is disposed between the hydrogen supply channel 28 and the air supply channel 35 (connection channel between the humidifier 56 and the intercooler 55) that is connected to the fuel cell 14. The air supply valve 54 is opened when compressed air is supplied into the hydrogen supply port 20 through the air inlet channel 53, i.e., during the anode scavenging process.

With the exception of the back pressure control valve 38, the hydrogen supply valve 44, the air supply valve 54, the hydrogen purge valve 30, the drain valve 50, the intercooler bypass valve 57, and the humidifier bypass valve 58 are all ON/OFF valves, respectively.

Further, in the fuel cell system 10, as well as in the fuel cell vehicle 12 equipped with the fuel cell system 10, a control device 70 is provided. The control device 70 controls overall operation of the fuel cell system 10 and the fuel cell vehicle 12, including the opening and closing of various valves of the fuel cell system 10 and fuel cell vehicle 12, control of the load 18, control of auxiliary devices such as the air compressor 36, control for charging/discharging the capacitor 16, and ON/OFF control of a contactor 82 of a discharge resistor 80.

The control device 70 comprises a computer (ECU), which operates as a means for achieving various functions by executing programs stored in a memory based on various inputs. In the present embodiment, for example, the control device 70 is operated as a scavenging means, a means for detecting (calculating) an amount of water (water amount detection means), means for detecting (calculating) a residual electrical energy stored in the capacitor 16, and a time counting (counter, timer) means.

In FIG. 1, the solid lines denote power lines, the narrow solid lines denote signal lines such as a control line, and the double lines denote pipes.

During normal power generation operations of the fuel cell system 10, basically, the hydrogen supply valve 44 and the back pressure control valve 38 are opened to suitable degrees by the valve control of the control device 70. Although the hydrogen purge valve 30 and the drain valve 50 may be opened as necessary, normally, the hydrogen purge valve 30 and the drain valve 50 remain closed. Further, normally, the air supply valve 54, the intercooler bypass valve 57, and the humidifier bypass valve 58 also are closed.

During normal power generation, the fuel gas is supplied from the hydrogen tank 42 into the hydrogen supply channel 28 through the ejector 48, and then, the fuel gas is supplied to the hydrogen supply port 20 of the fuel cell 14.

The fuel gas that is supplied to the hydrogen supply port 20 flows through the fuel gas supply passage 134*a* of each cell 114. The fuel gas is supplied to the fuel gas flow field 148, and flows along the anode 120*a*, thereby inducing an electrochemical reaction at the anode 120*a*. Then, after the fuel gas has been partially consumed at the anode 120*a*, the fuel gas, containing water and unconsumed hydrogen, is discharged as an exhaust gas to the fuel gas discharge passage 134*b*. The exhaust gas is discharged from the hydrogen discharge port 22 and flows through the hydrogen circulation channel 46.

The exhaust gas that is discharged to the hydrogen circulation channel 46 returns to a position at the middle of the hydrogen supply channel 28 due to a sucking action by the ejector 48, and the exhaust gas is supplied again to the fuel cell 14 as a fuel gas. The fuel gas contains water, i.e., the fuel gas is a humidified gas.

During normal power generation, the compressor 102 compresses outside air, and supplies the compressed air to both the intercooler 55 and the humidifier 56. Then, the humidified air is supplied to the air supply channel 34. The air, i.e., the oxygen-containing gas, is supplied to the air supply port 24 and flows through the oxygen-containing gas supply passage 130*a* of each cell 114. Then, the air flows through the oxygen-containing gas flow field 146 along the cathode 120*c*, thereby inducing an electrochemical reaction at the cathode 120*c*. After the air has been consumed at the cathode 120*c*, an exhaust gas containing the unconsumed air flows into the oxygen-containing gas discharge passage 130*b*. The exhaust gas is discharged from the air discharge port 26 into the air discharge channel 40.

Thus, in each of the cells 114, hydrogen as the fuel gas supplied to the anode 120*a*, and oxygen within the oxygen-containing gas supplied to the cathode 120*c*, are consumed in electrochemical reactions, thereby generating electricity.

The power generation process shall be described. At the anode 120*a*, hydrogen within the hydrogen gas is ionized in order to produce hydrogen ions and electrons. The hydrogen ions move toward the cathode 120*c* through the humidified electrolyte membrane 120*b*. The generated electrons are then output from the anode 120*a* through a negative electrode terminal plate (not shown) as a power generation current If, and reach the cathode 120*c* through external loads (the electrical load 18 and other auxiliary devices such as the air compressor 36). In the electrolyte membrane 120*b* disposed on the cathode 120*c* side, oxygen combines with hydrogen ions and electrons in order to produce water. Excessive water is retained in the oxygen-containing gas flow field 146 (i.e., liquid droplets are produced in the oxygen-containing gas flow field 146).

As described above, in the cell 114, hydrogen ions that are generated at the anode 120*a* move through the electrolyte membrane 120*b* toward the cathode 120*c* together with water molecules. Thus, in order to maintain electrical conductivity of the hydrogen ions, the electrolyte membrane 120*b* is required to have a predetermined humidified state. That is, the electrolyte membrane 120*b* should contain water and be maintained at a predetermined moisture content.

After the power generation state continues for a certain period of time or more, the water produced at the cathode 120*c* passes through the anode 120*a* toward the fuel gas flow field 148, whereby water also is retained in the fuel gas flow field. In particular, liquid droplets are produced in the fuel gas flow field 148.

Figure 3:
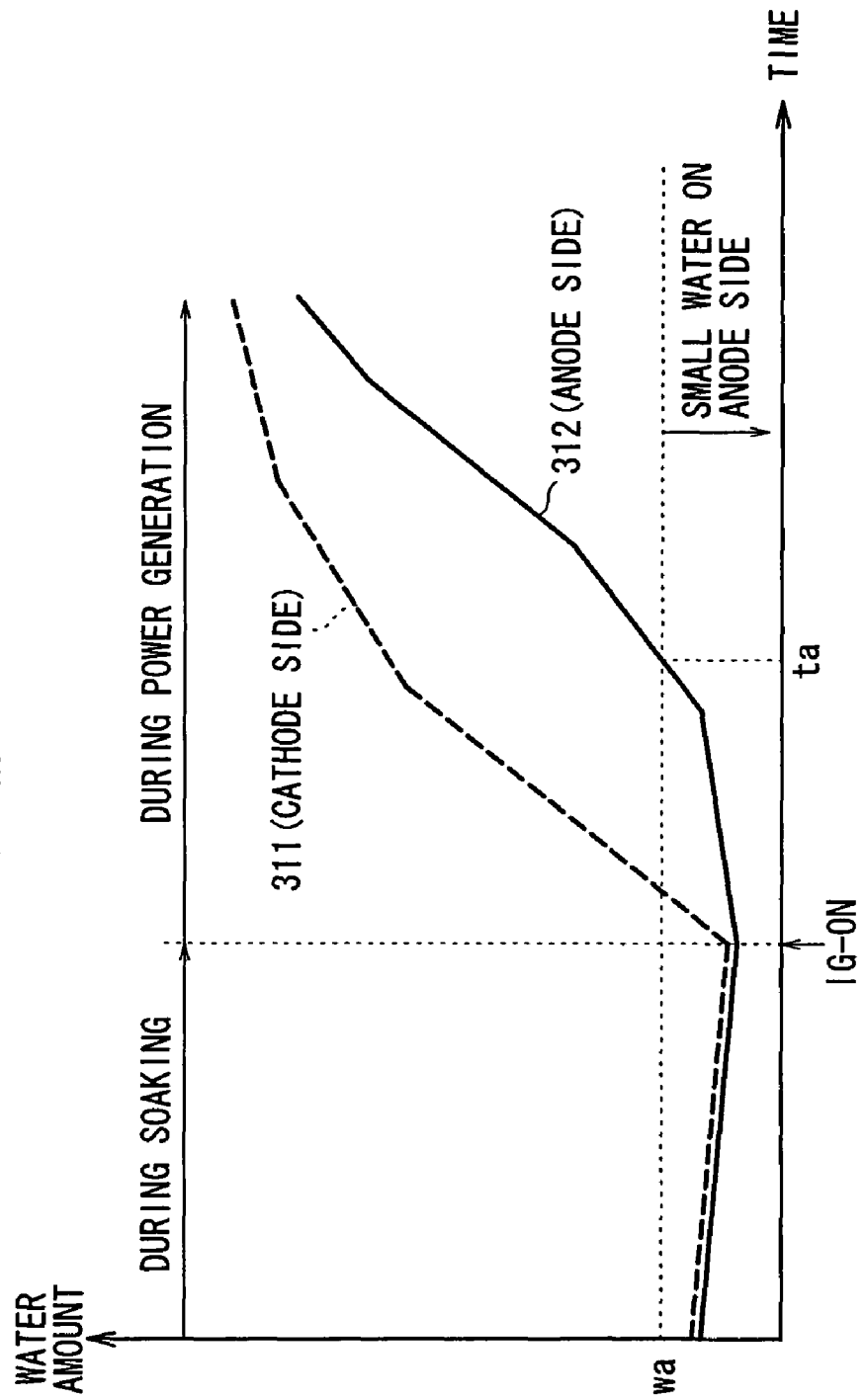
FIG. 3 is a characteristic graph showing the amount of water in the fuel cell during soaking and during power generation.

That is, as shown in FIG. 3, when the ignition switch 76 is turned ON, power generation is initiated within the fuel cell 14, as indicated by the water amount characteristic 311, initially, wherein liquid droplets are produced in the oxygen-containing gas flow field 146 (cathode side). Then, for example, after a predetermined period of time has elapsed, as shown by the water amount characteristic 312, liquid droplets in an amount exceeding a predetermined value (predetermined water amount) wa are also produced in the fuel gas flow field 148 (anode side). That is, after initiating power generation within the fuel cell 14, initially, liquid droplets are produced in the oxygen-containing gas flow field 146, and after power generation has continued for a predetermined period of time, liquid droplets also are produced within the fuel gas flow field 148. It should be noted that during a soaking period (in which the ignition switch 76 is turned OFF and operation of the fuel cell system 10 is stopped), the water content decreases gradually.

During a normal power generation operation, in which the fuel cell 14 generates power and consumes the reactant gases, the power generation current If collected from the fuel cell 14 is supplied to the load 18, as well as to the drive motor of the air compressor 36, through a current/voltage sensor 60 of the fuel cell 14. Further, the power generation current If is supplied to the capacitor 16 through a current/voltage sensor 62, in order to charge the capacitor 16. Based on the output of the current/voltage sensor 60, the accumulated electrical energy generated by the fuel cell 14 (hereinafter also referred to as the "accumulated power generation amount") is calculated and managed by the control device 70. Further, based on the output of the current/voltage sensor 62, the residual electrical energy in the capacitor 16 is calculated and managed by the control device 70. Data indicating the accumulated power generation amount and the electrical energy remaining in the capacitor are stored in a memory.

Under a control by the control device 70, the capacitor 16 is charged by the power generation current If of the fuel cell 14. When the fuel cell 14 stops generating power, the electrical energy stored in the capacitor 16 is supplied to the load 18 and to the air compressor 36. It should be noted that when a driving force is transmitted from drive wheels to the drive motor as the load 18, during deceleration of the fuel cell vehicle 12, the drive motor functions as a power generator, and generates a so called regenerative braking force. Thus, kinetic energy of the vehicle body also is collected as electrical energy. Further, the electrical energy from the load 18 is regenerated (i.e., stored) in the capacitor 16.

During normal power generation in the fuel cell vehicle 12 equipped with the fuel cell system 10, the control device 70 calculates a required electrical energy based on the pedal position Ap of the accelerator pedal, vehicle speed Vs, or the like. Further, based on the calculated required electrical energy, the control device 70 implements various controls, e.g., the control device 70 sends control signals to the fuel cell 14, the load 18, the air compressor 36, and the back pressure control valve 38, or the like. In order to reliably control the load 18, as well as to control starting operations of the fuel cell system 10 at low temperatures, such as temperatures below the freezing point, the control device 70 receives signals from the current/voltage sensors 60, 62, the outside air temperature sensor 74, and the temperature sensors 71, 72, respectively, indicating the power generation current If, the power generation voltage Vf (terminal voltage for each cell 114), the current flowing into the capacitor 16, the voltage Vc of the capacitor 16, the outside air temperature Ta, the gas temperature Th inside the hydrogen discharge port 22, and the gas temperature To inside the air discharge port 26. Alternatively, in the following explanation, an average voltage or a total sum voltage may be used as the power generation voltage Vf, if necessary.

Further, an ignition switch (IG switch) 76 is connected to the control device 70. The ignition switch 76 outputs an ON signal (i.e., a signal for switching operation of the fuel cell system 10 from an OFF state to an ON state) as a start-up signal (signal for starting operation), and an OFF signal (i.e., a signal for switching operation of the fuel cell system 10 from the ON state to the OFF state) as a stop signal.

Figure 4:
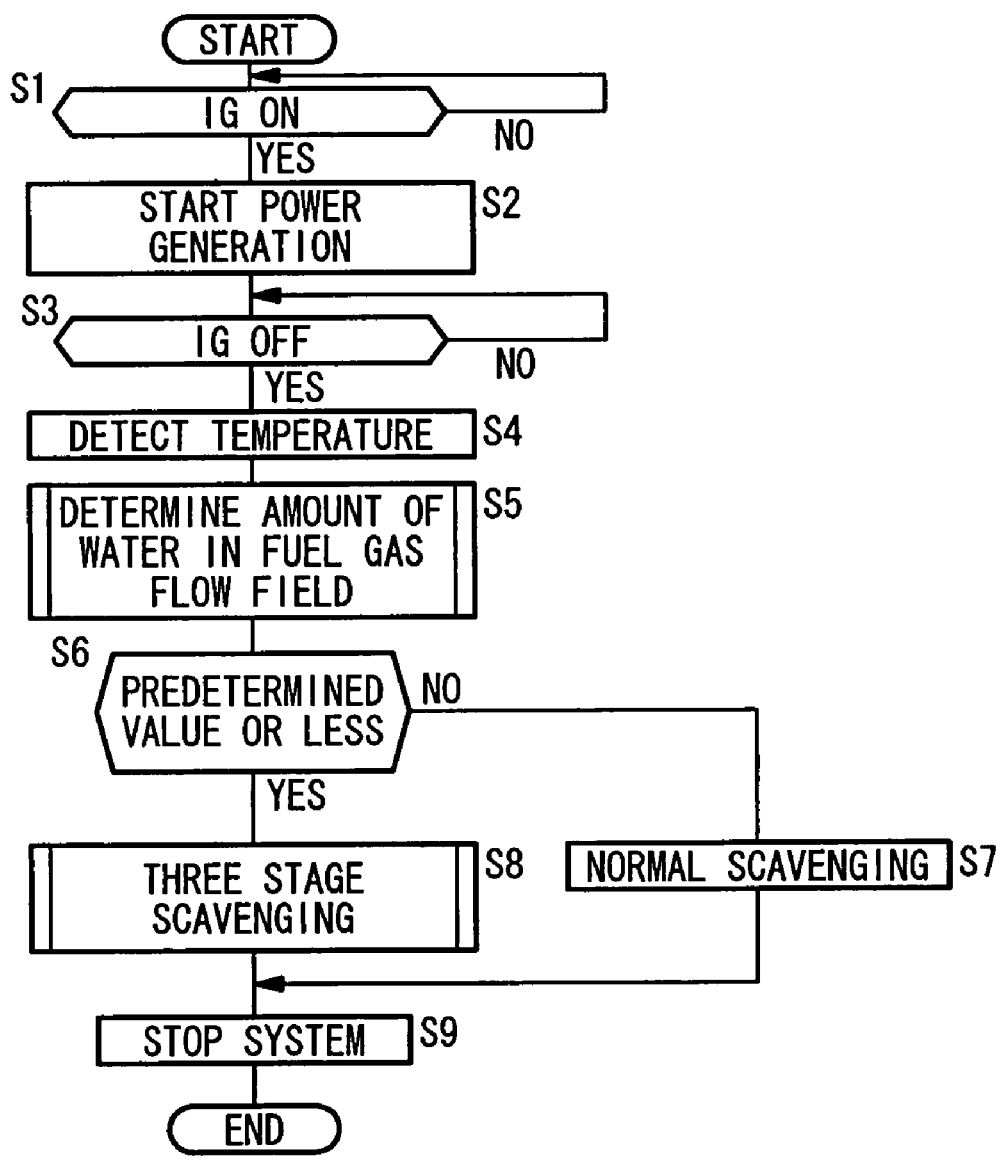
FIG. 4 is a flow chart showing operation of a scavenging process.

The basic structure and operations of the fuel cell system 10, as well as a fuel cell vehicle 12 equipped with the fuel cell system 10, have been described above. Next, operations of the scavenging process shall be described with reference to the flow chart shown in FIG. 4.

In step S1, when the control device 70 detects an ON signal of the ignition switch 76 as a start-up signal for initiating operation of the fuel cell system 10 (fuel cell vehicle 12), in step S2, the fuel cell 14 begins to generate power.

During power generation, in step S3, it is detected whether the ignition switch 76 has output an OFF signal.

If an OFF signal is detected, in step S4, the temperature detection means for detecting the temperature of the fuel cell 14, which in the present embodiment comprises a temperature sensor 71 attached to the hydrogen discharge port 22, detects the fuel cell temperature Th when operation of the fuel cell 14 is stopped (Th=Te). Instead of using the temperature sensor 71 provided in the hydrogen discharge port 22, a temperature sensor (not shown) attached to the hydrogen supply port 20, a temperature sensor (not shown) for detecting a temperature of the coolant, or the temperature sensor 72 provided in the air discharge port 26 may also be used as sensors for detecting the temperature of the fuel cell 14.

Then, in step S5, a process is performed for determining a water amount (moisture content) within the fuel gas flow field 148 when operation of the fuel cell 14 is stopped.

Figure 5:
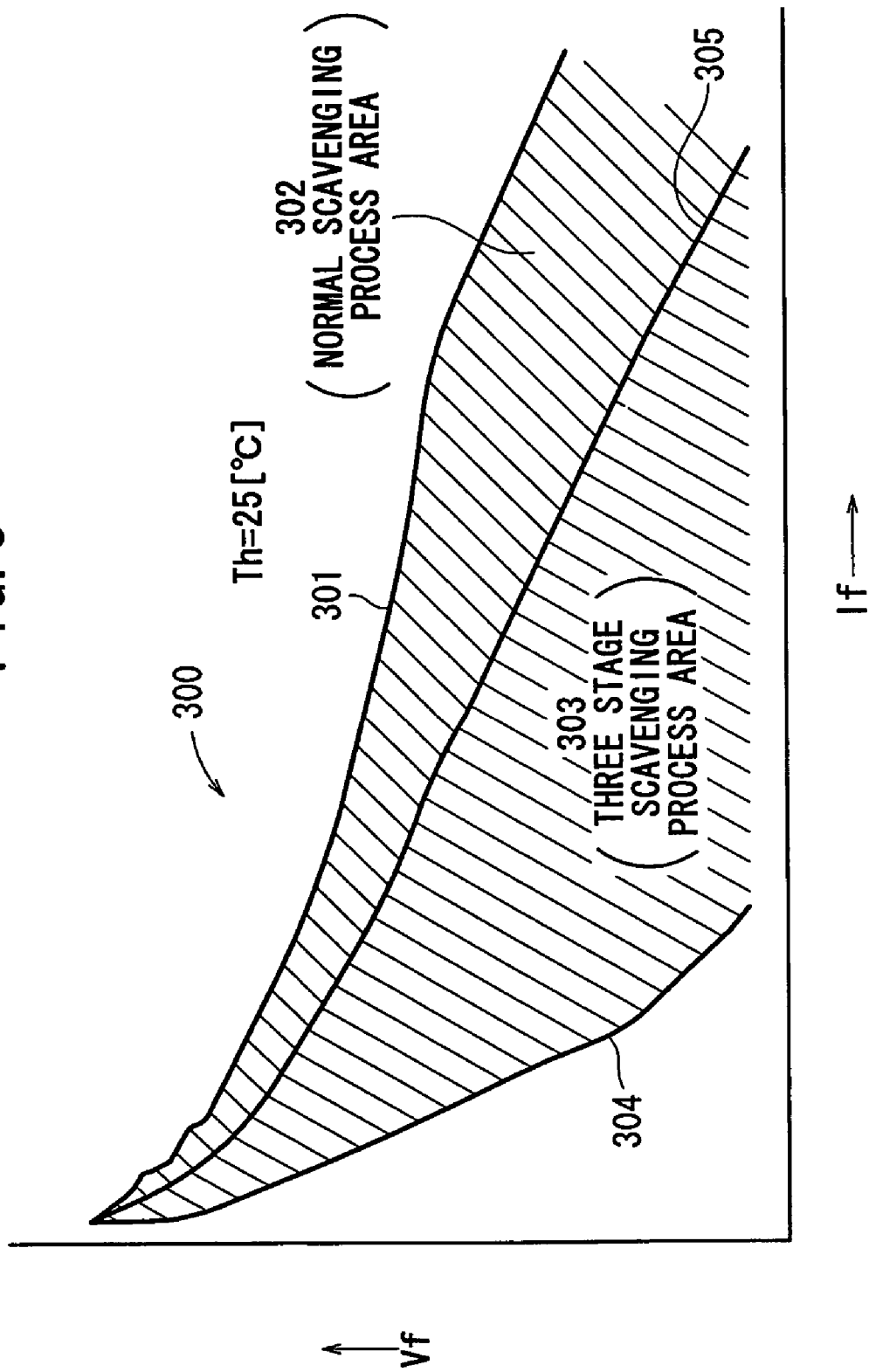
FIG. 5 is a power generation characteristic graph used in determining the amount of water.

Determination of the water amount can be made based on a change in the weight of the fuel cell 14, or using a power generation characteristic (power generation map), which indicates a relationship between the power generation current If and the power generation voltage Vf, as shown in FIG. 5. In the present embodiment, such a determination is made based on the power generation characteristic (current/voltage characteristic) 300, when the temperature Th of the fuel cell 14 is 25° C. (Th=25[° C.]). It should be noted that the memory stores beforehand data of the power generation characteristic at each temperature.

As understood from the power generation characteristic 300 shown in FIG. 5, as the power generation current If gets larger, a voltage drop in the power generation voltage Vf becomes large. Further, as the water amount at the electrolyte membrane 120b gets smaller, the voltage drop in the power generation voltage Vf, relative to the increase of the power generation current If, also becomes large. Characteristic 301 shown in FIG. 5 indicates a power generation characteristic when the water amount becomes optimized. The voltage drop in the power generation voltage Vf, relative to the increase of the power generation voltage Vf, is at its smallest. Characteristic 304 indicates a power generation characteristic when the amount of the water is at a minimum. Characteristic 305 indicates a power generation characteristic when the water amount reaches a predetermined value (threshold). That is, in the area above the characteristic 305, the water amount is relatively large, whereas in the area below the characteristic 305, the water amount is relatively small.

During the process of determining the water amount in the fuel gas flow field 148 in step S5, based on the detected temperature Th (Th=Te) of the fuel cell 14 when the ignition switch 76 is turned off, i.e., at the time immediately before the system is stopped, the power generation characteristic 300 at the time when the temperature Th is Te (Th=Te, and Te=25[° C.] in this case) is selected. In order to determine whether the current water amount is within the normal scavenging process area 302, in which the water amount is considered to be relatively large (an area requiring a normal scavenging process, as described later) or within a three stage scavenging process area 303 in which the water amount is regarded as relatively small (an area requiring a three stage scavenging process, as described later), the current power generation current If and the power generation voltage Vf (when the ignition switch 76 is turned off) are plotted.

Next, in step S6, if the plotted points fall within the three stage scavenging process area 303 below the predetermined value indicated by the characteristic 305 (i.e., an area in which the absolute amount of water is regarded as small), the three stage scavenging process in step S8 is initiated. If the plotted points are within the normal scavenging process area 302 above the predetermined value indicated by the characteristic 305 (i.e., an area in which the amount of water is regarded as normal), the normal scavenging process in step S7 is initiated.

Next, objects and details of the normal scavenging process in step S7, as well as the three stage scavenging process in step S8, shall be described.

First, operations of the normal scavenging process in step S7 shall be described with reference to the flow chart shown in FIG. 6.

In this process, in step S7a, the control device 70 closes the hydrogen supply valve 44 in order to stop the supply of fuel gas to the fuel cell 14.

Then, in step S7b, the intercooler bypass valve 57 and the humidifier bypass valve 58 are closed, whereby the amount of air discharged from the air compressor 36 is increased. Dry air at a large flow rate is supplied from the air supply port 24 into the fuel cell 14.

As a result of the dry air supplied into the fuel cell 14, water (liquid droplets) or the like produced in the oxygen-containing gas flow field 146 of the fuel cell 14 is discharged at a large flow rate to the outside, together with the scavenging air, through the air discharge port 26, the back pressure control valve 38, and the air discharge channel 40. In this manner, the scavenging process on the cathode side is initiated.

Then, in step S7c, a discharge control is started. Such a discharge control is intended to consume the fuel gas remaining in the fuel gas flow field 148 of the fuel cell 14 in a short period of time. During this process, the contactor 82 is closed, and a portion of the power generation current If is consumed by the discharge resistor 80. Further, during discharge control, the power generation current If is used for driving the air compressor 36.

Next, in step S7d, after a predetermined period of time has elapsed and when the scavenging process on the cathode side is finished, in step S7e, operation of the air compressor 36 is stopped in order to stop the supply of air to the fuel cell 14. At this time, the back pressure control valve 38 is fully opened, and the oxygen-containing gas flow field 146 is opened to the outside.

Then, in step S7f, it is determined whether the power generation voltage Vf of the fuel cell 14 is at or below a predetermined voltage. When the power generation voltage Vf is at or below the predetermined voltage, in step Sg7, the contactor 82 is opened, whereupon the discharge control is finished.

Then, in step S7h, the control device 70 itself, i.e., the ECU, is placed in a sleep mode, and operation of the fuel cell system 10 is stopped (system stop state).

As described above, during the normal scavenging process, in step S3, after an OFF state of the ignition switch 76 has been detected, in only a short period of time, the fuel cell system 10 is placed in a system stop state. Therefore, the operator, e.g., the driver of the fuel cell vehicle 12, does not experience a sense of discomfort.

Then, during soaking of the fuel cell system 10, in each of steps S7i, S7j and S7k, the control device 70 wakes up at predetermined time intervals, in accordance with the system temperature (temperature Th of the fuel cell 14), and detects the temperature Th of the fuel cell 14. In particular, it is determined whether the detected temperature Th is at a preset temperature Td (e.g., Td=5[° C.]) or less (Th≦Td). As a result, it is determined whether or not the outside temperature Ta is decreasing.

If the determination in step S7k is affirmative (YES), then it is determined that the outside temperature Ta may be reaching a low temperature, such as a temperature below the freezing point. In order to prevent freezing of liquid droplets in the fuel gas flow field 148 of the fuel cell 14, in step S7l, the electrical energy of the capacitor 16 is used for driving the air compressor 36, whereby the air supply valve 54 is opened for supplying hot compressed air that is discharged from the air compressor 36 to the fuel gas flow field 148 and the oxygen-containing gas flow field 146 of the fuel cell 14, from both of the hydrogen supply port 20 and the air supply port 24, through the intercooler bypass valve 57, the air inlet channel 53, and the air supply valve 54. In this manner, a scavenging process on the anode side is initiated using the supplied air.

Then, after the air has flowed through the fuel gas flow field 148 in the fuel cell 14, air is discharged from the hydrogen discharge port 22. At the beginning of the scavenging process on the anode side using the supplied air, the air is discharged at a small flow rate through the drain valve 50 and the discharge channel 52 together with the diluted fuel gas and water (liquid droplets). After a predetermined period of time has elapsed, the air is discharged together with water (liquid droplets) through the hydrogen purge valve 30 and the hydrogen purge channel 32.

In step S7m, after the scavenging process has been performed for a predetermined period of time, in step S7n, the air compressor 36 is stopped and all remaining valves are closed.

At this time, the scavenging process on the anode side (anode scavenging process) is stopped, thereby completing the normal scavenging process. In step S9, operation of the fuel cell system 10 is stopped.

As described above, when the outside air temperature Ta decreases, a scavenging process in the fuel gas flow field 148 is automatically performed. Thus, it is possible to reliably restart the fuel cell system 10 when it is subsequently operated, even at low temperatures such as a temperature below the freezing point.

Figure 7:
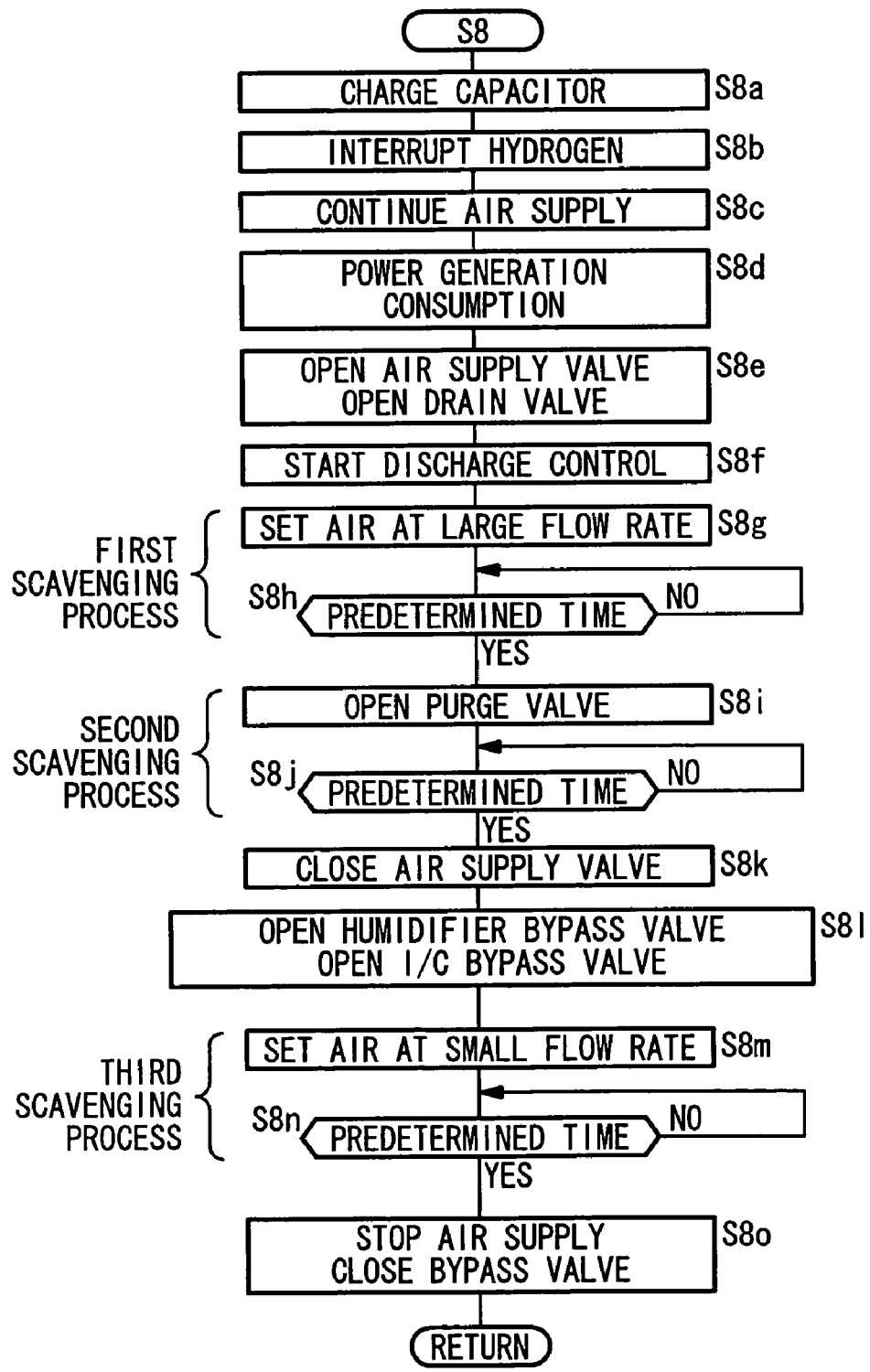
FIG. 7 is a flow chart showing a three stage scavenging process.
Figure 8:
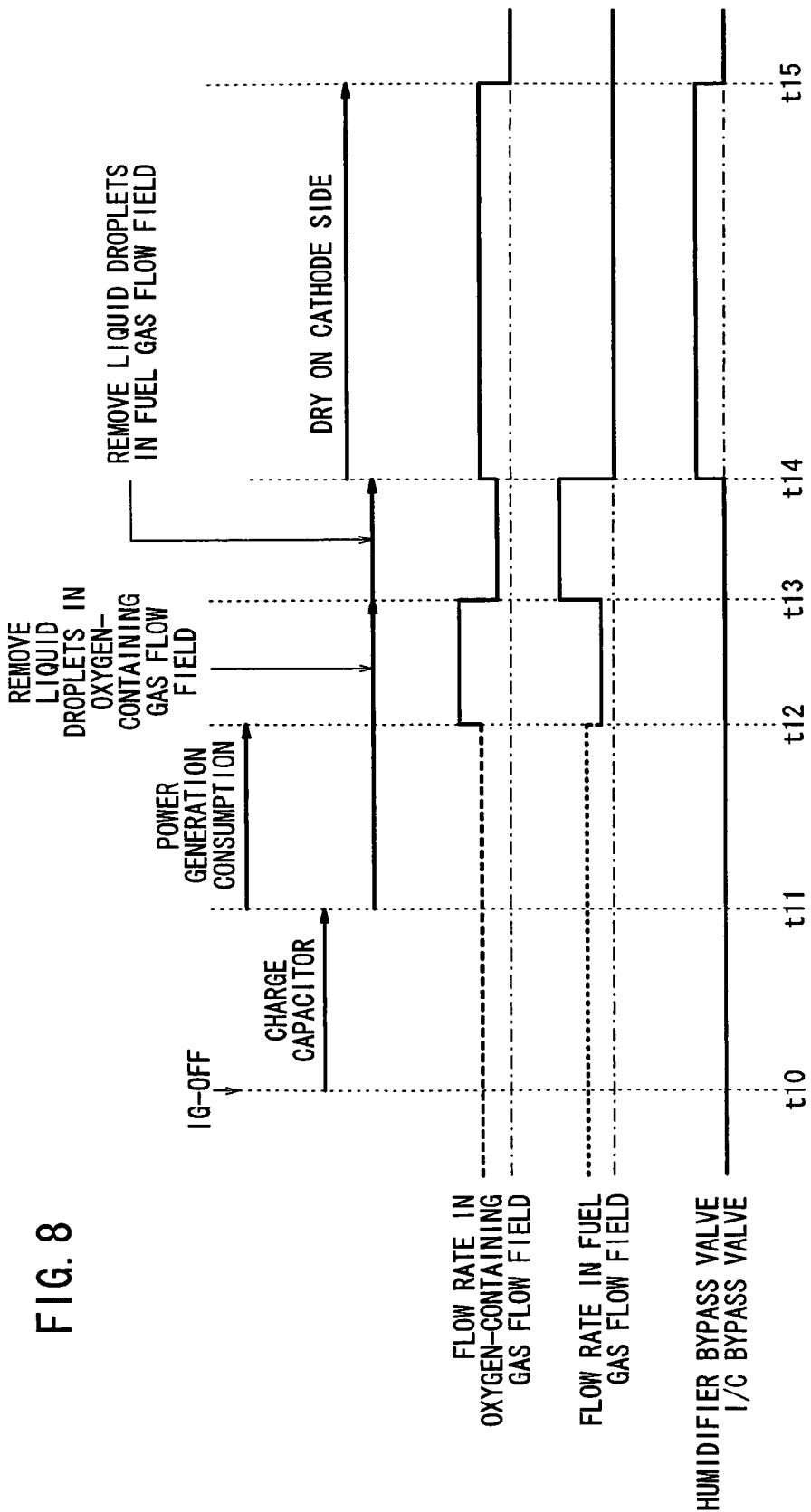
FIG. 8 is a time chart showing the three stage scavenging process.

Next, operations of the three stage scavenging process shall be described with reference to the flow chart shown in FIG. 7 and the time chart shown in FIG. 8.

During this process, in order to reliably implement a current system stop control and initiate the next operation of the fuel cell system 10 at low temperatures, such as a temperature below the freezing point, upon detecting that the ignition switch 76 has been placed into an OFF state at time t10, first, the capacitor 16 is charged to a predetermined capacity level in step S8a using the power generation current If (time t10 to time t11).

After charging is completed, in step S8b, the hydrogen supply valve 44 is closed and supply of fuel gas to the fuel cell 14 is finished. It should be noted that even after the hydrogen supply valve 44 is closed, fuel gas remains within the fuel gas flow field 148. In order to consume the remaining gas, in step S8c, supply of air continues.

Accordingly, in step S8d, the power generation current If is supplied to the auxiliary devices such as the air compressor 36 in order to consume the fuel gas (time t11 to time t12). As a result of consuming the fuel gas, the gas pressure in the fuel gas flow field 148 decreases gradually (time t11 to time t12).

Then, in step S8e, in order to satisfy a dilution requirement when the fuel gas is discharged from the fuel cell system 10 to the outside, the drain valve 50 is opened to provide a relatively small flow rate, while the air supply valve 54 also is opened (time t12).

Then, in steps S8f, S8g, and S8h, a process for discharging liquid droplets in the oxygen-containing gas flow field 146 is performed (time t12 to time t13). At this time, in step S8f, the contactor 82 is closed to initiate the discharge process and to allow the discharge resistor 80 to consume the power generation current If (time t12). At time t12, the flow rate of the fuel gas in the fuel gas flow field 148 becomes substantially zero.

Then, in step S18g, the flow rate of the air discharged from the air compressor 36 is increased (time t12). Air, at a large flow rate, is supplied to the oxygen-containing gas flow field 146 for a predetermined period of time (time t12 to time t13) in step S18h in order to discharge (remove) the liquid droplets remaining in the oxygen-containing gas flow field 146. The time required for removing the liquid droplets in the oxygen-containing gas flow field 146, from time t11 to time t13, is about 20 seconds.

Since the air supply valve 54 is opened at time t12, air also is supplied into the fuel gas flow field 148 after time t12. The hydrogen purge valve 30 operating at the large flow rate is closed, and the drain valve 50 is opened to provide a small flow rate. Therefore, only air, which flows at a small flow rate, flows into the fuel gas flow field 148. At time t12 to time t13, the fuel gas discharged from the drain valve 50 through the discharge channel 52, and the oxygen-containing gas, which is discharged at a large flow rate from the air discharge channel 40, are mixed together through a dilution box, and the diluted fuel gas is discharged to the outside.

In this manner, liquid droplets are discharged from the oxygen-containing gas flow field 146, whereas the fuel gas is diluted and discharged at time t13. From time t13, a process for discharging (removing) liquid droplets from the fuel gas flow field 148 is performed.

During this process, in step S8i, the hydrogen purge valve 30 is opened to provide a large flow rate (time t13). Thus, air flowing at a large flow rate is supplied into the fuel gas flow field 148, where the diluted fuel gas remains, for a predetermined period of time in step S8i (time t13 to time t14). Thus, liquid droplets in the fuel gas flow field 148 are discharged (removed). Then, in step S8k, the air supply valve 54 is closed.

At time t12 to t14, liquid droplets in the oxygen-containing gas flow field 146 and liquid droplets in the fuel gas flow field 148 are removed during separate periods of time, so that the flow rate in the oxygen-containing gas flow field 146 and the flow rate in the fuel gas flow field 148 do not become large at the same time. Thus, operation of the air compressor 36 can be restricted to achieve reduction in noise. As a result, compared to the conventional technique, a small and lightweight air compressor with a small capacity can be used as the air compressor 36. Further, as a result of using the small and lightweight air compressor 36 with a small capacity, compared to using a large air compressor, since the size and weight of the motor and/or the fan can be reduced, energy consumption is small. This provides an advantage in terms of product merchantability of the fuel cell system 10 and the fuel cell vehicle 12.

Then, in steps S8l to S8o, a process for drying the fuel cell 14 on the cathode 120c side is performed, in order to enable reliable starting operations of the fuel cell system 10 at low temperatures, such as a temperature below the freezing point (time t14 to time t15).

During this process, in step S8l, the humidifier bypass valve 58 and the intercooler bypass valve 57 are opened (time t13). Then, in step S8m, operation of the air compressor 36 is suppressed in order to reduce the flow rate of air, whereupon dry air, at a small flow rate, is supplied into the oxygen-containing gas flow field 146 (time t14). The process of opening the bypass valves 57 and 58 in step S8l may be carried out upon initiation of the scavenging process at the large flow rate (time t12).

Then, in step S8n, dry air is supplied at a small flow rate into the oxygen-containing gas flow field 146 for a predetermined period of time, to enable reliable starting during the next operation of the fuel cell system 10 (time t14 to time t15). The predetermined period of time is a time required for achieving an optimum moisture content in the electrolyte membrane 120b, which is determined based on the starting performance at the next operation of the fuel cell system 10 (hereinafter also referred as the "next start up performance").

Figure 9:
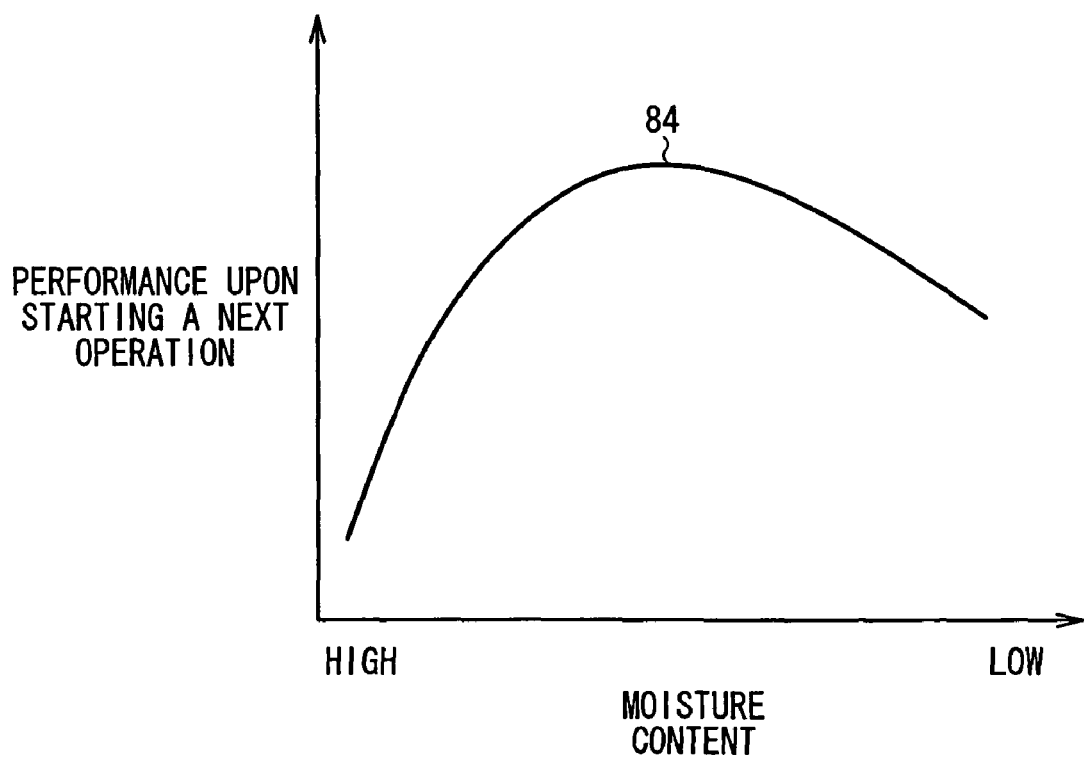
FIG. 9 is a characteristic graph showing the relationship between moisture content and performance upon initiating a next operation of the fuel cell system.

Specifically, referring to FIG. 9, as can be seen from the relationship (characteristic curve) 84 between the starting performance of the next operation (as determined by the maximum output after power generation is enabled) and the moisture content of the electrolyte membrane 120b, the starting performance of the next operation becomes high (i.e., the maximum output becomes high) at an intermediate state, where the moisture content is neither excessively high nor excessively low. Thus, based on the characteristic curve 84, the predetermined period of time in step S8n is a time required for supplying dry air at a small flow rate, in order to achieve a certain starting performance of the next operation, which is at or above a predetermined value.

Alternatively, the process of step S8n may be performed by determining whether an electrical energy remaining in the capacitor 16 has decreased to a predetermined electrical energy amount required for starting the fuel cell system 10 during the next operation thereof at a low temperature such as a temperature below the freezing point.

Further, during the discharge control process initiated in step S8f, although it is not shown in the flow chart, at time t14, when the gas pressure in the fuel gas flow field 148 decreases to a value at or below a predetermined value, or when the power generation voltage Vf of the fuel cell 14 decreases to a predetermined value or less, the contactor 82 is opened, thereby ending the discharge control process.

Then, in step S8o, operation of the air compressor 36 is stopped, and the bypass valves 57, 58 are closed, at which point the three stage scavenging process is finished.

In this manner, when the ignition switch 76 is turned off in step S3, in the case where water is produced in the oxygen-containing gas flow field 146 on the cathode 120c side, as well as in the fuel gas flow field 148 on the anode 120a side, as a result of performing the three stage scavenging process, the fuel cell system 10 can be reliably started at a next operation thereof, even when such starting is initiated at low temperatures, such as a temperature below the freezing point.

Figure 10:
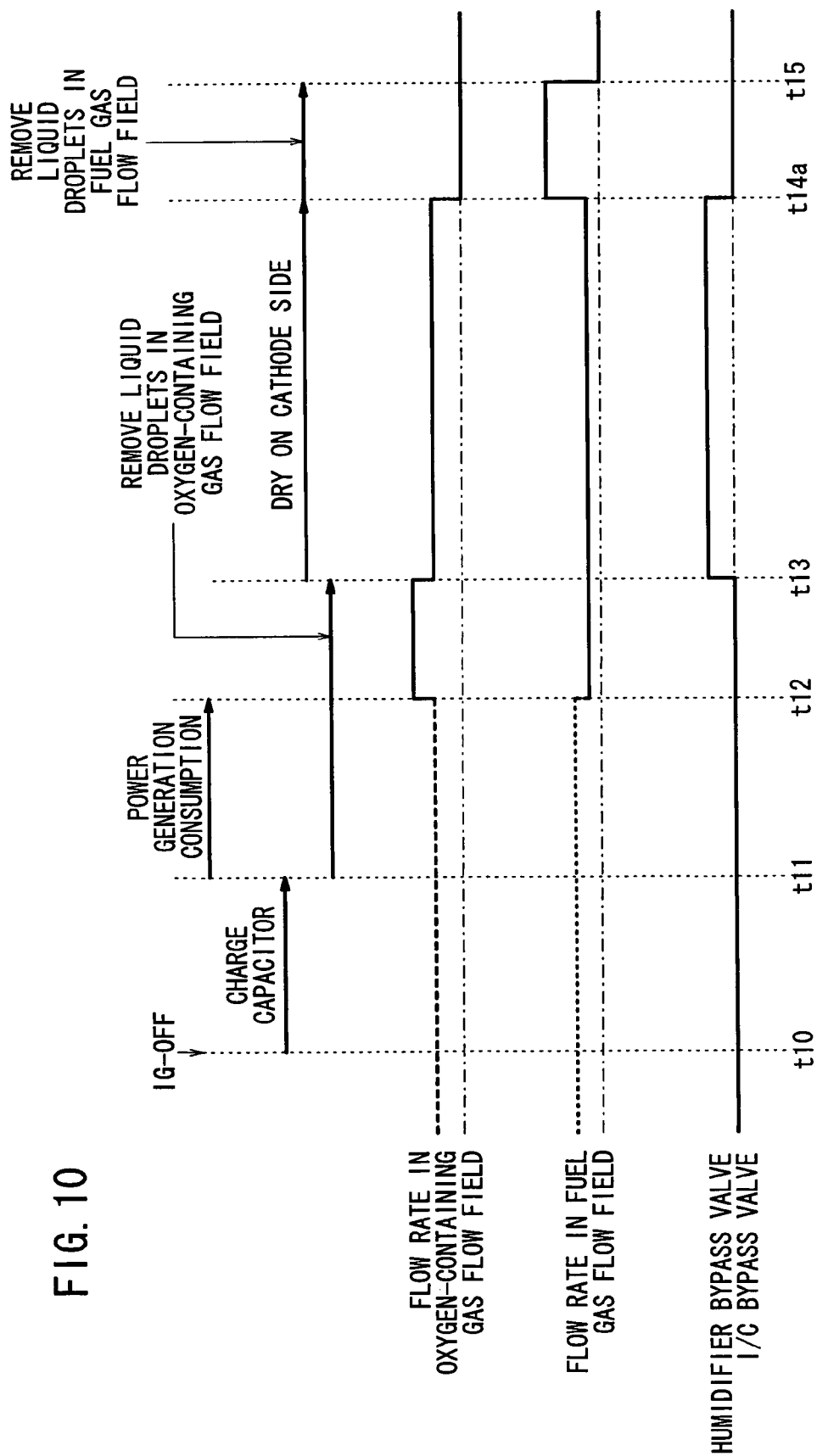
FIG. 10 is a time chart showing another example of the three stage scavenging process.

The three stage scavenging process is performed in order of the first scavenging process, which is conducted at a large flow rate on the cathode side (time t12 to time t13: step S8g, S8h), the second scavenging process, which is conducted at a large flow rate on the anode side (time t13 to time t14: steps S8i, S8h), and the third scavenging process, which is conducted at a small flow rate on the cathode side (time t14 to time t15: steps S8m, S8n). Alternatively, as shown by the time chart in FIG. 10, the three stage scavenging process may be performed in order of the first scavenging process, which is conducted at a large flow rate on the cathode side (time t12 to time t13), the third scavenging process, which is conducted at a small flow rate on the cathode side (time t13 to time t14a), and the second scavenging process, which is conducted at a large flow rate on the anode side (time t14 to time t15).

Figure 11:
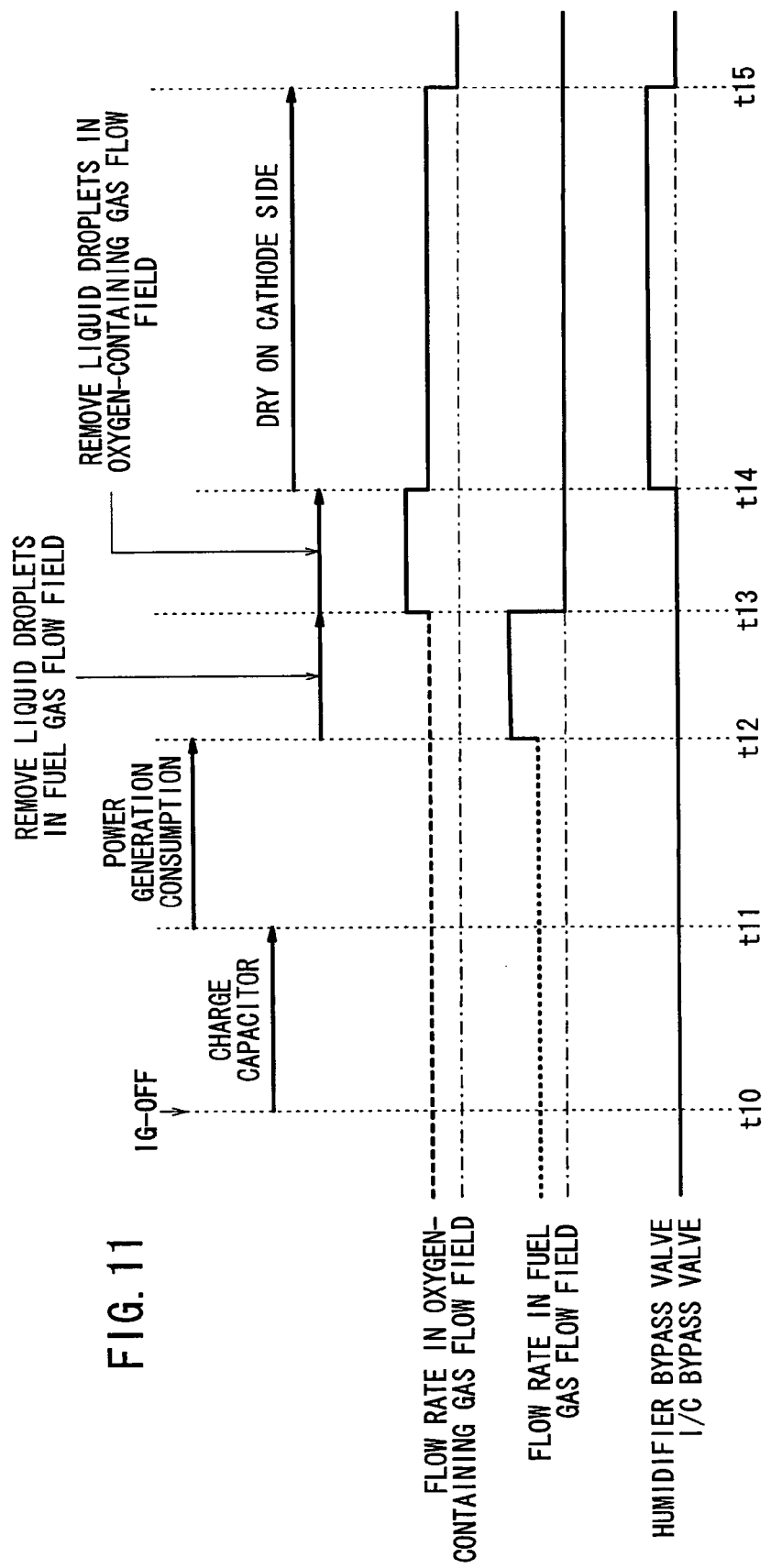
FIG. 11 is a time chart showing still another example of the three stage scavenging process.

Alternatively, as shown by the time chart in FIG. 11, the three stage scavenging process may also be performed in order of the second scavenging process, which is conducted at a large flow rate on the anode side (time t12 to time t13), the second scavenging process, which is conducted at a large flow rate on the cathode side (time t13 to time t14), and the third scavenging process, which is conducted at a small flow rate on the cathode side (time t14 to time t15).

The period of time required for the first scavenging process and the period of time required for the second scavenging process are substantially the same. The period of time required for the third scavenging process is relatively longer than either of the periods of time required for the first scavenging process or the second scavenging process.

Figure 12:
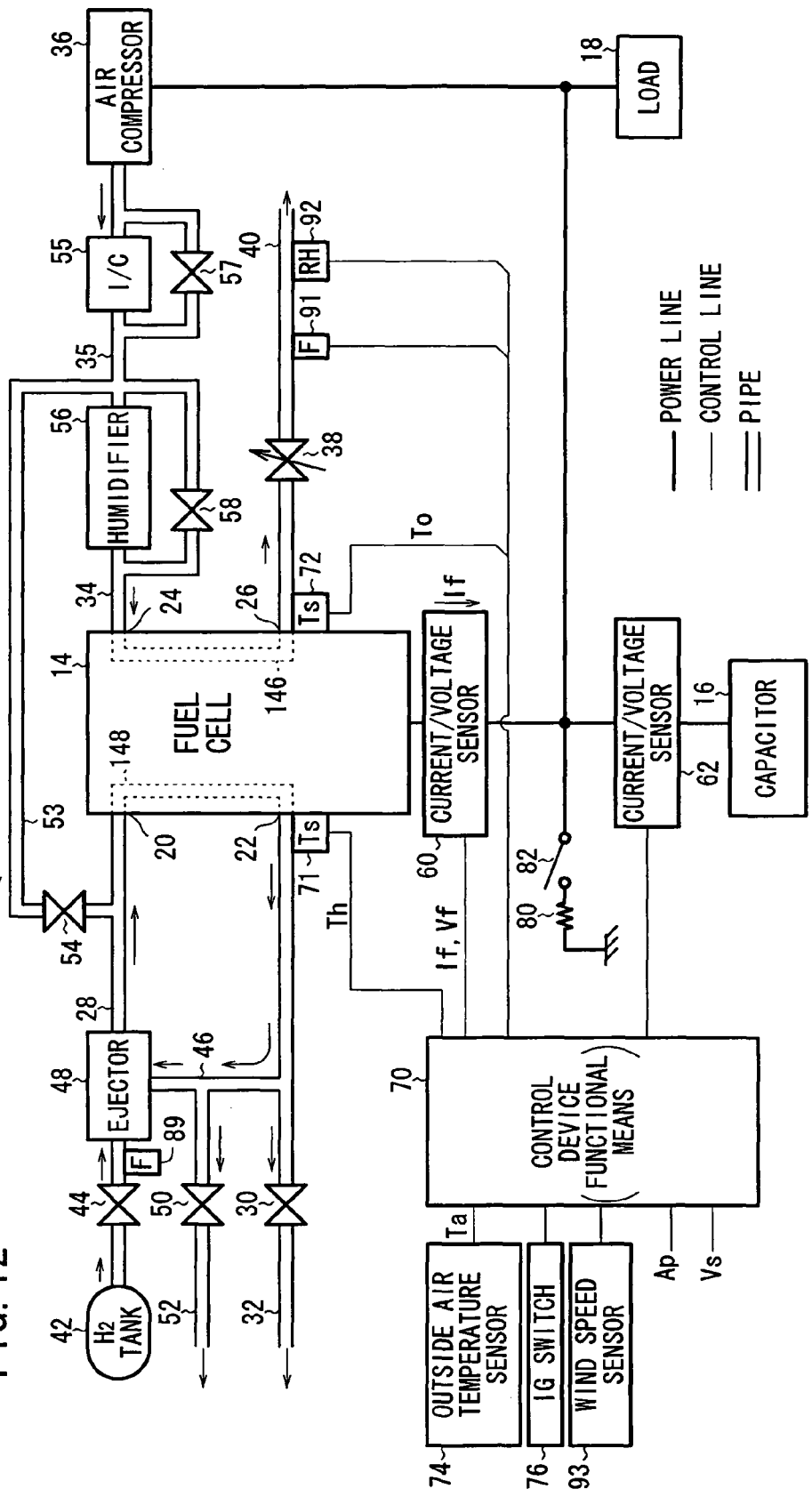
FIG. 12 is a diagram schematically showing the structure of a fuel cell vehicle equipped with a fuel cell system according to a second embodiment of the present invention.

FIG. 12 is a diagram schematically showing the structure of a fuel cell vehicle 12A equipped with a fuel cell system 10A according to a second embodiment of the present invention.

The fuel cell system 10A differs from the fuel cell system 10 shown in FIG. 1, in that the fuel cell system 10A further includes a flow rate sensor (flow rate detection means) 89 disposed in the hydrogen supply channel 28, for measuring a volume flow rate in order to determine the hydrogen consumption amount. Further, a flow rate sensor or a flow rate meter (flow rate detection means) 91 also is disposed in the air discharge channel 40, for measuring a volume flow rate in order to determine an accumulated air flow amount. In addition, a humidification sensor (humidification detection means) 92 for measuring a relative humidity RH in the air discharge channel 40, and a wind speed sensor (wind speed detection means) 93 for measuring wind speed, are provided.

The flow rate sensors 89, 91, and the humidification sensor 92 are connected respectively to the control device 70.

In this structure, the control device 70 functions as a means for calculating (detecting) an accumulated power generation amount (based on measurements performed by the current/voltage sensor 60 and the timer), a means for calculating (detecting) the accumulated flow rate of gas passing through the oxygen-containing gas flow field 146 (based on measurements by the flow rate sensor 91, the timer, or the like), and means for calculating (detecting) an amount of consumed hydrogen (based on measurements by the flow rate sensor 89, the timer, or the like).

Figure 13:
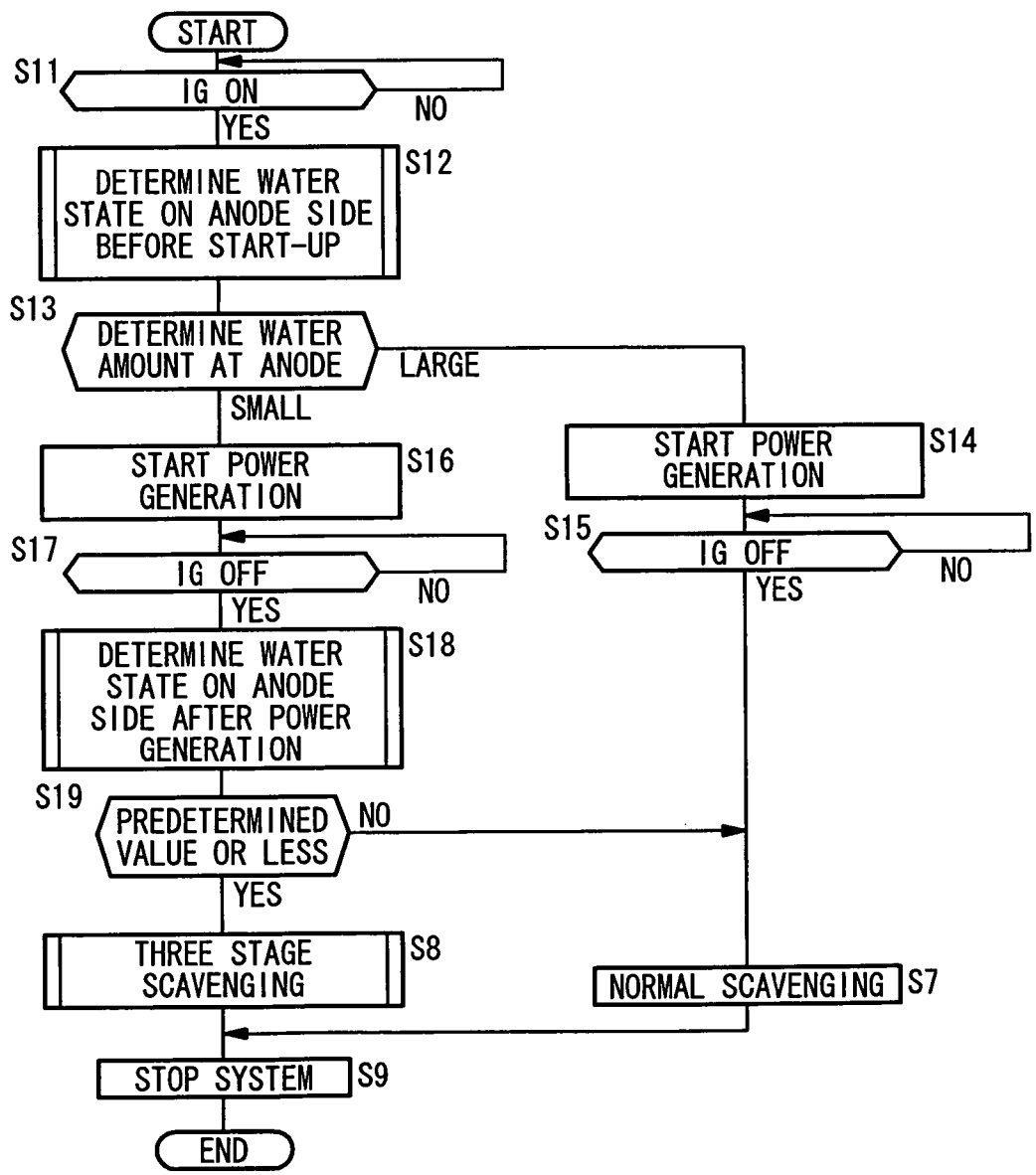
FIG. 13 is a flow chart showing operation of a scavenging process according to the second embodiment.

Next, operations of the fuel cell system 10A, and the fuel cell vehicle 12a equipped with the fuel cell system 10A, while performing scavenging processes, shall be described with reference to a flow chart of FIG. 13.

In step S11, when the control device 70 detects an ON signal from the ignition switch 76, in steps S12 and S13, before initiating power generation, a determination of the water state is made. Specifically, it is determined whether an amount of water on the anode side, prior to performing the starting operation, is relatively large or small.

A small amount of water is determined in cases where (1) the soaking period from the time when the ignition switch 76 was previously turned off to the time when the ignition switch 76 is presently turned on is long, wherein a dry condition occurs, (2) a preparatory process for starting operation at a temperature below the freezing point, such as the three stage scavenging process for preventing freezing, has been performed during a previous operation before the ignition switch 76 is presently turned on, and (3) although the soaking period is short, since the outside air humidity during soaking is low and the wind speed detected by the wind speed sensor 93 is large, a dry state occurs easily. In other cases, the amount of water on the anode side is determined to be large.

If it is determined that the amount of water on the anode side is large, then, in step S14, power generation is initiated. During power generation, in step S15, it is detected whether an OFF signal has been output from the ignition switch 76.

If an OFF signal is detected, the above-described normal scavenging process is performed in step S7.

In step S13, if it is determined that the amount of water on the anode side is small, then, in step S16, power generation is initiated and, in step S17, it is detected whether an OFF signal has been output from the ignition switch 76.

If an OFF signal is detected, in steps S18 and S19, a further determination is made with respect to the water state on the anode side during current power generation.

A small amount of water is determined in cases where (a) the accumulated power generation amount from initiation to termination of current power generation is at or below a predetermined value, (b) the accumulated flow rate of the oxygen-containing gas passing through the oxygen-containing gas flow field 146 from initiation to termination of current power generation is at or below a predetermined value, and (c) the hydrogen consumption amount from initiation to termination of current power generation is at or below a predetermined value.

Further, a small amount of water is determined in cases where (d) the difference between the temperature Th when the ignition switch 76 is turned on (S11) and the temperature Th when the ignition switch 76 is turned off (S17) is at or below a predetermined value, (e) the temperature Th (Th=Te) when the ignition switch 76 is turned off (S17) is at or below a predetermined value, (f) the temperature Th when the ignition switch 76 is turned on (S11) is at or below a preset temperature Ta (e.g., Ta is 0[° C.]), and the temperature Th when the ignition switch 76 is turned off is at or below a preset temperature Tb (Ta<Tb, e.g., Tb is 10[° C.]).

Further, a small amount of water is determined in cases where (g) the accumulated power generation amount from initiation to termination of current power generation is at or below a predetermined value.

In step S19, if it is determined that the amount of water on the anode side from initiation to termination of current power generation is at or below a predetermined value, i.e., that the amount of water is small, the above described three stage scavenging process in step S8 is performed. On the other hand, if none of the above conditions (a) to (g) is satisfied, and it is determined that the water amount exceeds the predetermined value, then the normal scavenging process in step S7 is performed.

After the normal scavenging process in step S7 or the three stage scavenging process in step S8 has been performed, a system stop process is performed in step S9.

The above-described process for determining the water state on the anode side after power generation in steps S18 and S19, i.e., the process of determining whether the three stage scavenging process or the normal scavenging process should be performed, may be made by searching a map (look up table).

Figure 14:
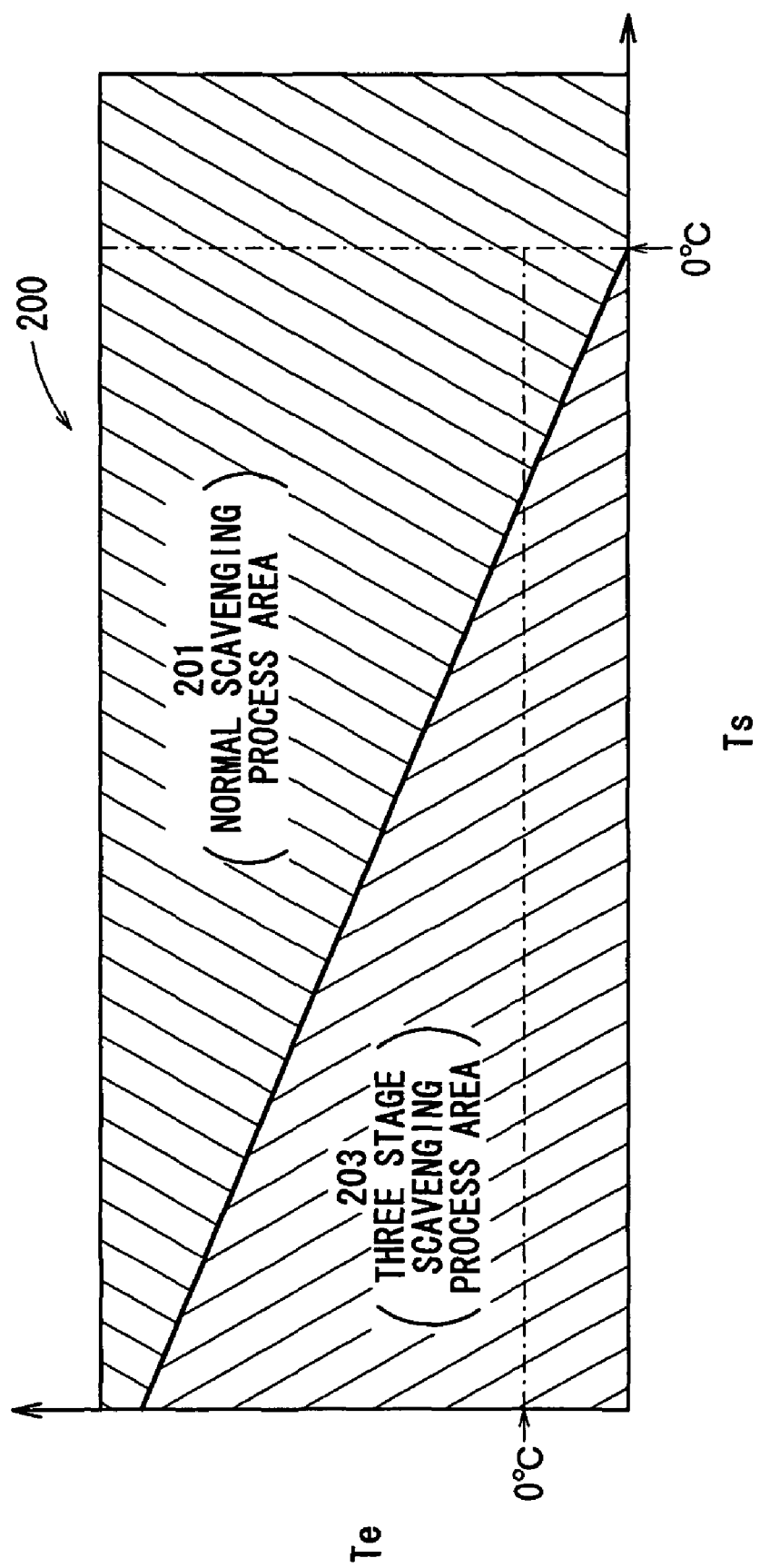
FIG. 14 is a graph illustrating a scavenging process determination map.

FIG. 14 shows a map (scavenging process determination map), which is searched during the process for determining the scavenging process. In the scavenging process determination map 200, the power generation start temperature Ts and the power generation end temperature Te are used as coordinate points, for determining which scavenging process should be performed.

Basically, an area in which the power generation start temperature Ts and the power generation end temperature Te are relatively large is determined as a normal scavenging process area 201, whereas an area in which the power generation end temperature Te is low is determined as a three stage scavenging process area 203.

As described above, in the present embodiment, the fuel cell system 10 (10A) includes the scavenging means (70, 36, 54) for scavenging at least one of the fuel gas flow field 148 where the fuel gas flows, and the oxygen-containing gas flow field 146 where the oxygen-containing gas flows, using a scavenging gas (air is employed as the scavenging gas in the present embodiment) when, or after, power generation by the fuel cell 14 has been stopped.

When the ignition switch 76 is turned off and the fuel cell system 10 (10A) is stopped, and the amount of water present in the fuel gas flow field (148), as detected by the water amount detection means (70, S5, S12, S18), is at or below a predetermined value, the scavenging means performs the three stage scavenging process, i.e., carries out steps for performing a first scavenging process for scavenging liquid droplets in the oxygen-containing gas flow field 146 using air flowing at a large flow rate, performing a second scavenging process for scavenging liquid droplets in the fuel gas flow field 148 using air flowing at a small flow rate, and performing a third scavenging process for scavenging the oxygen-containing gas flow field 146 using air flowing at a small flow rate. The first through third scavenging processes are performed in a predetermined order (i.e., in order of the first scavenging process at the large flow rate on the cathode side→the second scavenging process at the large flow rate on the anode side→the third scavenging process at the small flow rate on the cathode side; in order of the first scavenging process at the large flow rate on the cathode side→the third scavenging process at the small flow rate on the cathode side→the second scavenging process at the large flow rate on the anode side; or in order of the second scavenging process at the large flow rate on the anode side→the second scavenging process at the large flow rate on the cathode side→the third scavenging process at the small flow rate on the cathode side).

Since the first and second scavenging processes are performed for removing liquid droplets, such processes are performed for a relatively short period of time. Since the third scavenging process is performed for purposes of drying, the third scavenging process is performed for a relatively longer period of time.

As described above, when power generation by the fuel cell system 10 (10A) is stopped, since the first and second scavenging processes, which are conducted at a large flow rate, are not performed at the same time, a small and low energy consumption air compressor, which produces low noise, can be used as the air compressor 36.

Further, since an amount of water of the electrolyte membrane 120b becomes optimized or nearly optimized when power generation has been stopped, it is possible to improve performance when starting a next operation.

Figure 15:
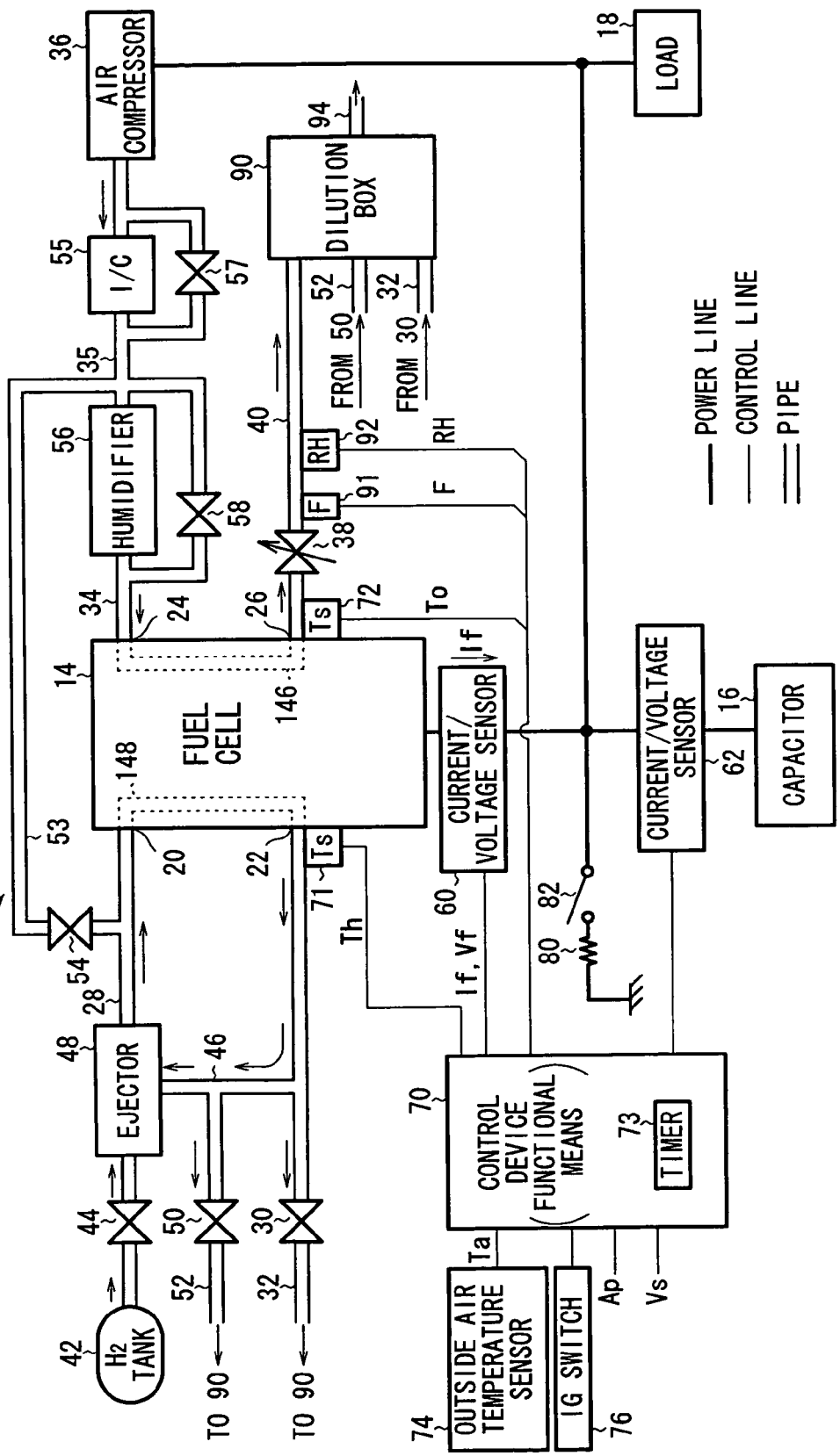
FIG. 15 is a diagram schematically showing the structure of a fuel cell vehicle equipped with a fuel cell system according to a third embodiment of the present invention.

FIG. 15 is a diagram schematically showing the structure of a fuel cell vehicle 12B equipped with a fuel cell system 10B, according to a third embodiment of the present invention.

The fuel cell system 10B differs from the fuel cell system 10 shown in the example of FIG. 1, in that the fuel cell system 10B additionally includes a flow rate sensor (flow rate detection means) 91 provided in the air discharge channel 40, for measuring a volume flow rate and to determine an accumulated air flow rate, and a humidification sensor (humidification detection means) 92, for measuring a relative humidity RH in the air discharge channel 40. Further, in FIG. 15, a dilution box 90, which is connected to the hydrogen purge channel 32 and the discharge channel 52, a further discharge channel 94 having one end connected to the discharge port of the dilution box 90 and the other end connected to the outside, and a timer 73 provided in the control device 70, also are shown. As described above, the dilution box 90 dilutes the fuel gas (exhaust gas) supplied through the hydrogen purge channel 32 and the discharge channel 52, using an oxygen-containing gas supplied from the air discharge channel 40, and then discharges the diluted gas to the outside through the discharge channel 94. The flow rate sensor 91 and the humidification sensor 92 are connected to the control device 70.

In the third embodiment, the control device 70 operates as a scavenging means, a means for preparing a starting operation of the fuel cell system 10 at low temperature, a means for determining when to stop operation of the fuel cell system 10 after generating power for a short period of time at low temperature, a scavenging processing means, a means for detecting (calculating) the residual electrical energy stored in the capacitor 16, and a time counting means (counter/timer 73).

During normal power generation in a fuel cell vehicle 12B equipped with the fuel cell system 10B, the control device 70 calculates a required electrical energy based on a pedal position Ap of the accelerator pedal, the vehicle speed Vs, or the like. Further, based on the calculated required electrical energy, the control device 70 implements various controls, e.g., for sending control signals to the fuel cell 14, the load 18, the air compressor 36, and the back pressure control valve 38, or the like. In order to reliably implement control of the load 18, and to control the starting operation of the fuel cell system 10 at low temperatures, such as a temperature below the freezing point, the control device 70 receives signals indicating the power generation current If, the power generation voltage (terminal voltage for each cell 114) Vf, the current flowing into the capacitor 16, the voltage Vc of the capacitor 16, the outside air temperature Ta, the gas temperature Th in the hydrogen discharge port 22, the gas temperature To in the air discharge port 26, as well as the relative humidity RH and the volume flow rate F in the air discharge channel 40 from the current/voltage sensors 60, 62, the outside air temperature sensor 74, the temperature sensors 71, 72 and the humidification sensor 92, and the flow rate sensor 91.

Figure 16:
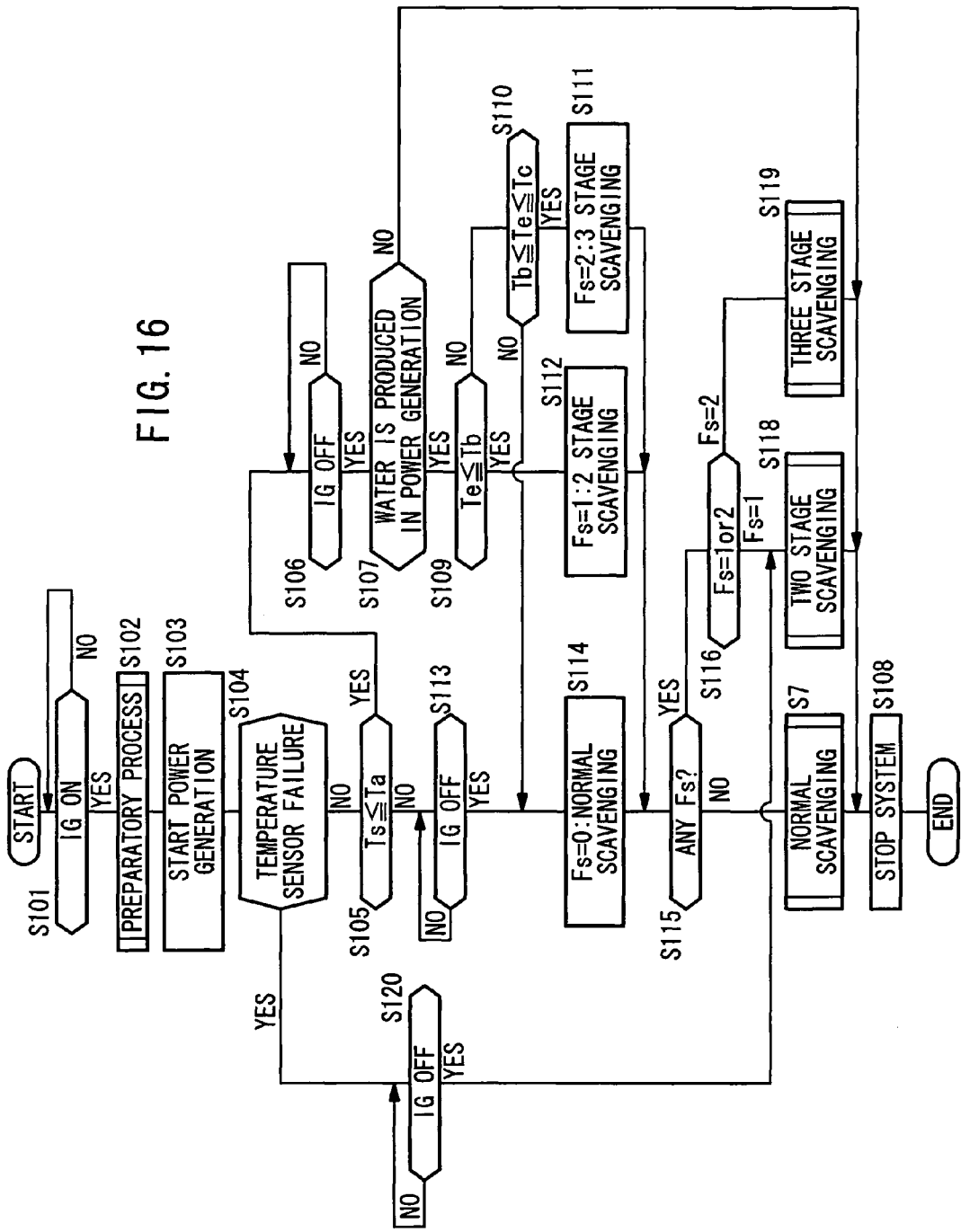
FIG. 16 is a flow chart showing the entire operation of a scavenging process.

The basic structure and operations of the fuel cell system 10B and the fuel cell vehicle 12B equipped with the fuel cell system 10B have been described above. Next, operations of the scavenging process shall be described with reference to the flow chart shown in FIG. 16.

In step S101, when the control device 70 detects an ON signal from the ignition switch 76, as a start-up signal for starting operation of the fuel cell system 10 (fuel cell vehicle 12B), in step S102, a preparatory process (to be described later) is performed based on the type of scavenging process that was performed at the time of stopping the previous operation (i.e., at a time when the ignition switch 76 was previously turned off).

After the preparatory process has been performed, in step S103, power generation by the fuel cell 14 is started.

Then, in step S104, the temperature detection means for detecting the temperature of the fuel cell 14, which in the embodiment comprises a temperature sensor 71 attached to the hydrogen discharge port 22, detects the fuel cell temperature Th. At this time, it is also determined whether the temperature sensor 71 is operating properly. Instead of using the temperature sensor 71 provided at the hydrogen discharge port 22, a temperature sensor (not shown) attached to the hydrogen supply port 20, a temperature sensor (not shown) that detects the temperature of the coolant, or the temperature sensor 72 provided at the air discharge port 26, may also be used for detecting the temperature of the fuel cell 14.

In step S104, the temperature sensor 71 is determined not to be operating properly when, e.g., no output value is obtained, the output value does not change, or the output value is abnormal. For example, when a difference between the temperature Th obtained from the temperature sensor 71 and the temperature Ta obtained from the outside air temperature sensor 74 is a predetermined value or more, i.e., if the difference is abnormally large after the soaking period (the period of time elapsed after the fuel cell system 10B is stopped) has gone on for several hours, the output value of the temperature sensor 71 is determined to be abnormal.

If failure of the temperature sensor 71 is not indicated, in step S105, it is determined whether the temperature Th of the fuel cell 14 (Th=Ts) detected during step S104, immediately after initiating power generation, is at or below the preset temperature (threshold) Ta. For example, the predetermined value is the freezing temperature of 0[° C.] (Ta=0), which is generally considered as the low temperature.

Then, if the temperature Th (Th=Ts) of the fuel cell immediately after initiating power generation is at or below the preset temperature Ta (Ts≦Ta), in step S106, it is detected whether an OFF signal has been output from the ignition switch 76. If the OFF signal is detected, it is determined that a stop request was received during power generation, after initiating operation of the fuel cell 14 (step S101). In the next step S107, it is determined whether water has been produced in the fuel cell 14 by power generation of the fuel cell 14, from the time of initiating the present operation to the time when the stop request was received (step S106).

The determination of step S107 is made based on the amount of electrical energy, i.e., the accumulated power generation amount [Wh], which is calculated by the control device 70 based on the power generation current If and the power generation voltage Vf, as detected by the current/voltage sensor 60, and the amount of elapsed time from the time of initiating the present operation to the time when the stop request was received. Further, instead of an accumulated power generation amount, a weight change of the fuel cell 14 may also be considered for making this determination. Further, simply, the elapsed time only may be considered for making this determination. In any of these cases, the relationship between the accumulated power generation amount and the water amount, the relationship between the weight change and the water amount, or the relationship between the elapsed time and the water amount, are determined in advance and data thereof is stored in the memory of the control device 70. The data of such relationships (characteristics) is referred to in order to detect the amount of water (production of water) in the fuel cell 14.

In step S107, for example, when it is determined that the elapsed time is extremely small and hence water has not been produced, it is not necessary to perform the scavenging process. Therefore, without performing the scavenging process, in step S108, for example, a normal stopping process for the fuel cell system 10B is performed (for example, the hydrogen supply valve 44 is closed and the air compressor 36 is stopped).

In step S107, if it is determined that water has been produced, in step S109, the temperature Th of the fuel cell 14 (the temperature Th is the temperature Te, when the stop request is received at the time of stopping the present operation) is detected by the temperature sensor 71, whereupon it is determined whether the temperature Th (Th=Te), immediately after the ignition switch 76 was turned off, is at or below a preset temperature (threshold value) Tb. The temperature Tb (Ta<Tb) is determined in advance, and data of the temperature Tb is stored in a memory. The determination of step S109 is based on a threshold for determining a state in which water is produced only in the oxygen-containing gas flow field 146, because no significant time has elapsed after starting power generation, and thus, water has not been transmitted to the fuel gas flow field 148.

Further, the determination of step S109 may be made by considering whether an accumulated power generation amount, from the time of initiating the present operation (step S101: YES) to the time when the ignition is turned off (step S106: YES), is at or below a predetermined accumulated power generation amount.

If the determination in step S109 is negative (NO), i.e., the temperature Th (Th=Te) of the fuel cell 14 exceeds the preset temperature Tb, in step S110, it is determined whether the temperature Th (Th=Te) is at or below the preset temperature (threshold) Tc (Tb≦Te≦Tc).

The temperature Tc (Tb<Tc) is determined in advance, and data of the temperature Tc is stored in a memory. Step S110 is intended to determine whether water has been produced in both the oxygen-containing gas flow field 146 as well as the fuel gas flow field 148.

If the determination in either of steps S110 or S109 is affirmative (YES), reception of an OFF signal from the ignition switch 76 (i.e., an operation of turning off the ignition switch 76) is determined as an operation for requesting to stop operation of the fuel cell system 10B after power has been generated for only a short period of time at low temperature. If the determination in step S110 is affirmative (YES), then in step S111, a value "2" for the second scavenging process is set as a scavenging process flag Fs, based on the request to stop operation of the fuel cell system 10B after power generation for a short period of time at low temperature (Fs=2).

Also, if the determination in step S109 is affirmative, reception of the OFF signal from the ignition switch 76 (i.e., an operation of turning off the ignition switch 76) is determined as an operation for requesting to stop operation of the fuel cell system 10B after power has been generated for only a short period of time at low temperature. In step S112, a value "1" for the first scavenging process is set as the scavenging process flag Fs, based on the request to stop operation of the fuel cell system 10B after power generation for a short period of time at low temperature (Fs=1).

Further, in the determination of step S105, if the temperature Th (Th=Ts) of the fuel cell 14 immediately after starting power generation exceeds a preset temperature Ta (Ta=0[° C.]) (Ts>Ta), and thereafter, in step S113, an OFF signal is received from the ignition switch 76, and in step S110, the temperature Th (Th=Te) of the fuel cell 14 exceeds a preset temperature Tc (Te>Tc), in this case, it is determined that reception of the OFF signal from the ignition switch 76 represents a case in which operation of the fuel cell system 10B was not started at a low temperature, or it is determined that reception of the OFF signal from the ignition switch 76 represents a case in which, even if operation of the fuel cell system 10B was started at a low temperature, power generation has already been performed for a sufficient period of time. That is, reception of the OFF signal from the ignition switch 76 is not determined as an operation for requesting to stop operation of the fuel cell system 10B after power has been generated for only a short period of time at low temperature. In step S114, the scavenging process flag Fs is not set (Fs=0), and thus, the scavenging process flag Fs remains at a default value indicating the normal scavenging process.

Then, in step S115, it is determined whether the scavenging process flag Fs has been set. If the scavenging process flag Fs has been set, in step S116, it is determined whether the value of the scavenging process flag is "1" indicating the first scavenging process or "2" indicating the second scavenging process. Based on the determination result, in step S118, a two stage scavenging process of the first scavenging process (described later) is performed, or in step S119, a three stage scavenging process of the second scavenging process (described later) is performed. In step S115, if the scavenging process flag Fs has not been set, in step S7, the above-described normal scavenging process (see FIG. 6), in which the fuel cell 14 is stopped normally, is performed.

Further, if it is determined that the temperature sensor 71 has not operated properly in step S104, and in step S120 it is determined that the ignition switch 76 has been placed in an OFF state, the two stage scavenging process is performed in step S118.

After any of the scavenging processes has been performed, the system stop process of step S108 is conducted in the same manner as the above-described process of step S9.

Next, objects and details of the normal scavenging process of step S7, the two stage scavenging process of step S118, and the three stage scavenging process of step S119, shall be described with reference to various flow charts and time charts.

Figure 6:
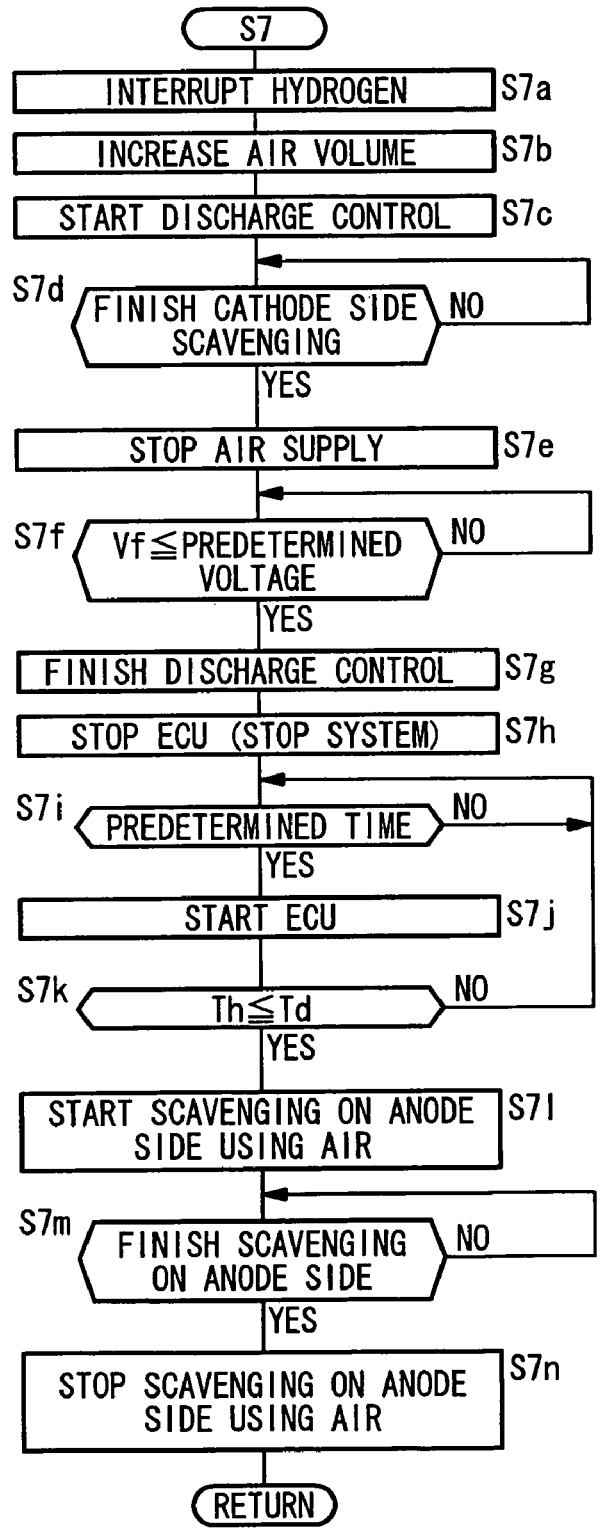
FIG. 6 is a flow chart showing a normal scavenging process.

With reference to the flow chart of FIG. 6, operations of the above-described normal scavenging process of step S7, in a case where it is determined that the present operation of turning off the ignition switch 76 in step S113 is not a request to stop operation of the fuel cell system after power has been generated for only a short period of time, i.e., the present operation of turning off the ignition switch 76 in step S113 is a stop request made under normal conditions, shall briefly be described.

During this process, in step S7a, the supply of fuel gas to the fuel cell 14 is stopped.

Then, in step S7b, the amount of air discharged from the air compressor 36 is increased, whereupon dry air, at a large flow rate, is supplied into the fuel cell 14 from the air supply port 24.

As a result of dry air being supplied at a large flow rate to the fuel cell 14, water (liquid droplets) or the like within the oxygen-containing gas flow field 146 of the fuel cell 14 is discharged to the outside together with the scavenging air. In this manner, the scavenging process on the cathode side is initiated.

Next, in step S7c, a discharge control is initiated.

In step S7d, after the cathode scavenging process has finished and a predetermined period of time has elapsed, in step S7e, operation of the air compressor 36 is halted, so as to stop the supply of air to the fuel cell 14.

Then, in step S7f, it is determined whether the power generation voltage Vf of the fuel cell 14 is at or below a predetermined voltage. When the power generation voltage Vf arrives at or below the predetermined voltage, in step S7g, the contactor 82 is opened, thereby ending the discharge control.

Then, in step S7h, the control device 70 is placed in a sleep state, and operation of the fuel cell system 10B is stopped.

During the normal scavenging process, since operation of the fuel cell system 10B is stopped a short period of time after detecting the OFF state from the ignition switch 76 in step S113, the operator of the fuel cell vehicle 12B, such as the driver, does not experience any sense of discomfort.

Then, during soaking of the fuel cell system 10B, in steps S7i, S7j, and S7k, at time intervals determined in accordance with the system temperature (temperature Th of the fuel cell 14), the control device 70 wakes up and detects the temperature Th of the fuel cell 14. In particular, it is determined whether the detected temperature Th is at or below a preset temperature Td, e.g., Td=5[° C.] (Th≦Td). As a result, it is determined whether the outside temperature Ta is low or not.

If the determination in step S7k is affirmative, it is determined that the outside temperature may be a low temperature, such as a temperature below the freezing point. In order to prevent freezing of liquid droplets within the fuel gas flow field 148 of the fuel cell 14, in step S71, the air compressor 36 is driven by electrical energy from the capacitor 16, and the air supply valve 54 is opened. Hot compressed air discharged from the air compressor 36 is supplied from both the hydrogen supply port 20 and the air supply port 24 to the fuel gas flow field 148 and the oxygen-containing gas flow field 146, in order to start scavenging on the anode side.

Air supplied into the fuel gas flow field 148 of the fuel cell 14 is discharged from the hydrogen discharge port 22. At the beginning of the scavenging process, on the anode side when using air, the air is discharged at a small flow rate together with diluted fuel gas and water (liquid droplets) through the drain valve 50 and the discharge channel 52. After a predetermined period of time has elapsed, air is discharged together with water (liquid droplets) through the hydrogen purge valve 30 and the hydrogen purge channel 32. In this manner, the scavenging process on the anode side is performed.

In step S7m, after the scavenging process has been performed for a predetermined period of time, in step S7n, operation of the air compressor 36 is stopped, and all of the remaining valves are closed. Thus, the scavenging process on the anode side is stopped, thereby finishing the normal scavenging process. In step S108, operation of the fuel cell system 10B is stopped.

As described above, when the outside air temperature Ta decreases, the scavenging process in the fuel gas flow field 148 is performed automatically. Thus, it is possible to reliably start the fuel cell system 10 at the next operation thereof, even at low temperatures such as a temperature below the freezing point.

Figure 17:
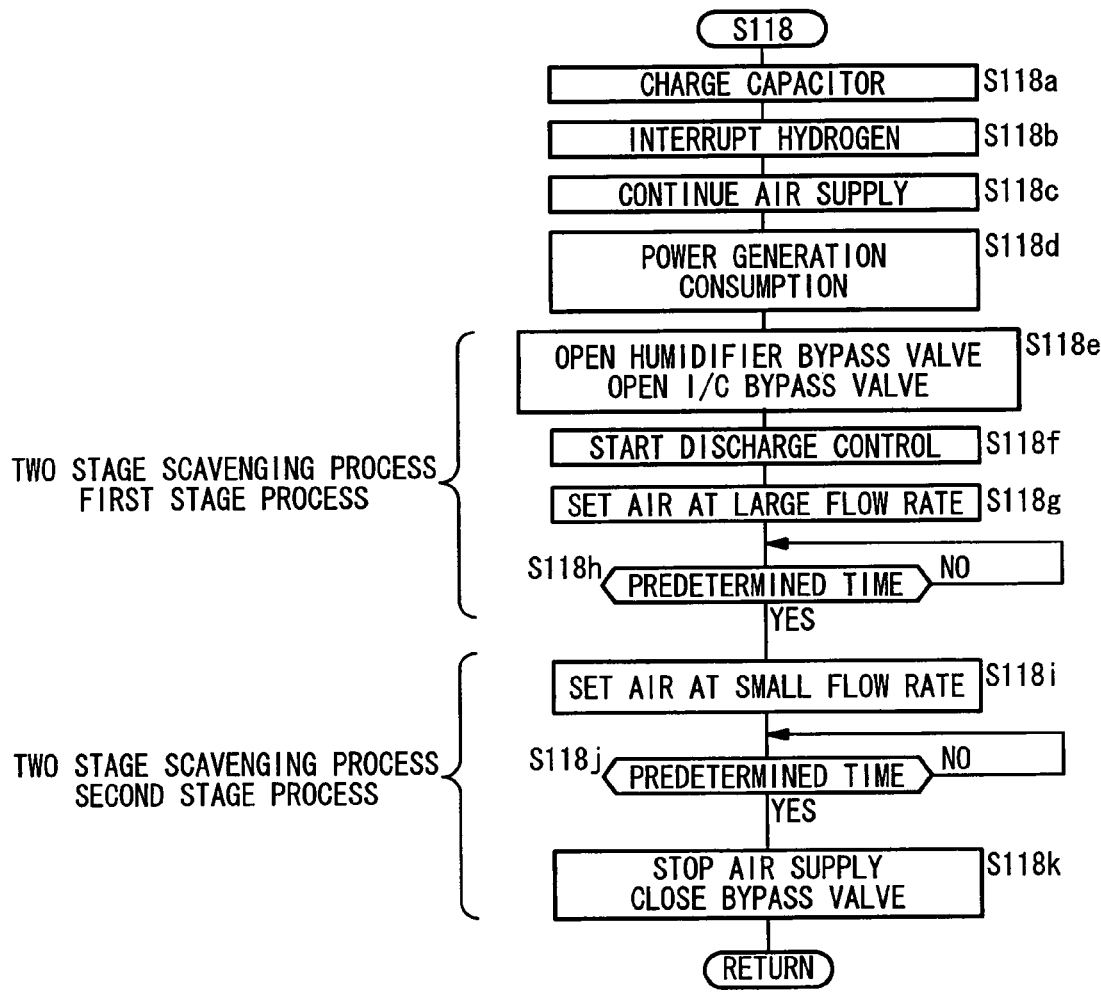
FIG. 17 is a flow chart showing a two stage scavenging process.
Figure 18:
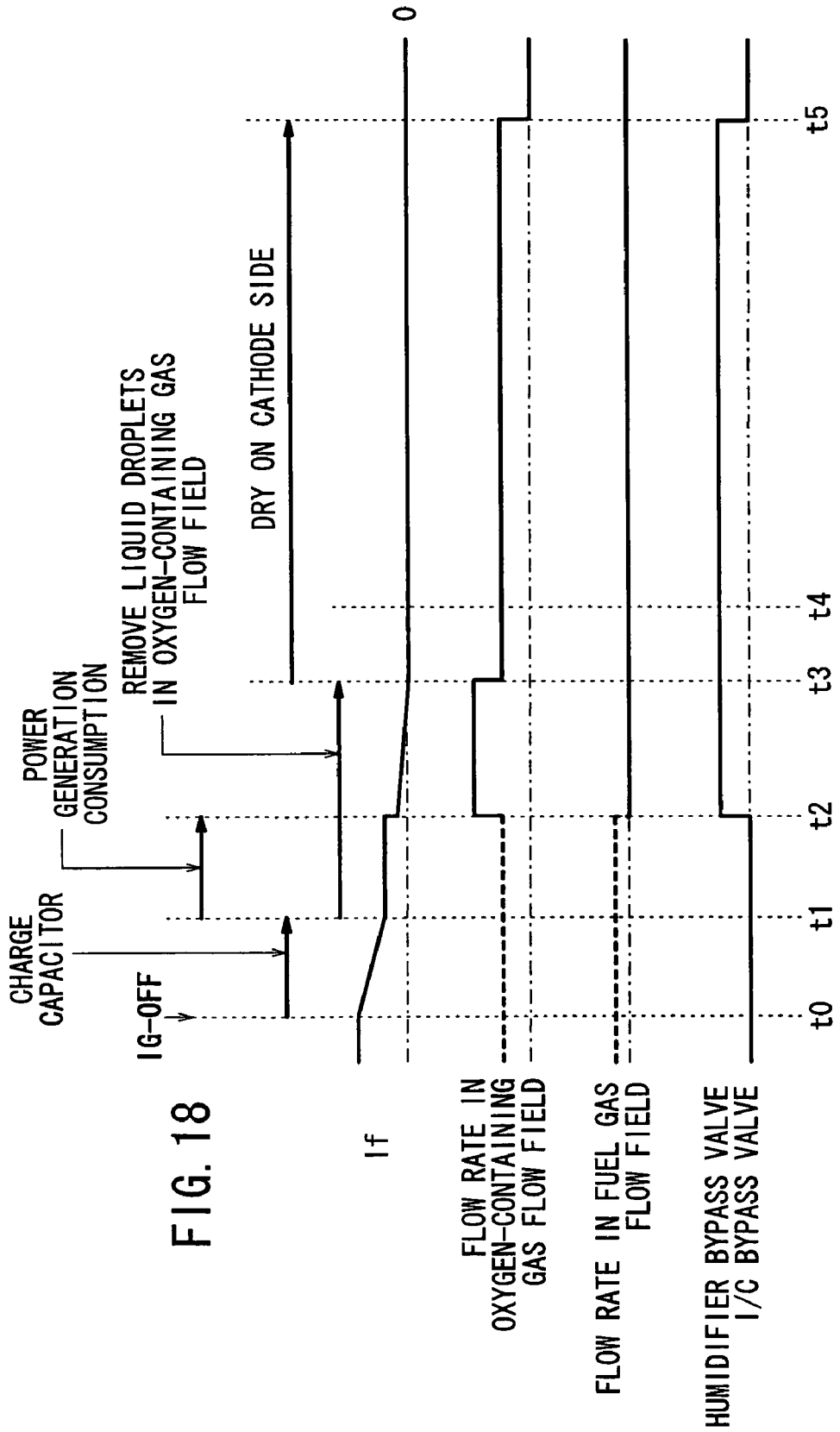
FIG. 18 is a time chart showing a two stage scavenging process.

Next, with reference to the flow chart of FIG. 17 and the time chart of FIG. 18, operations of the two stage scavenging process, which is performed in cases where a present reception of the OFF signal from the ignition switch 76 in step S106 is treated as a request to stop operation of the fuel cell system 10B after generating power for a short period of time at low temperatures, and water is produced only within the oxygen-containing gas flow field 146 on the cathode 120c side, shall be described.

During this process, in order to reliably implement a control for stopping the system, and then initiate operation of the fuel cell system 10B at low temperatures such as a temperature below the freezing point, at time t0, when the OFF signal from the ignition switch is detected, first, in step S118a, the capacitor 16 is charged to a predetermined capacity level by means of the power generation current If (time t0 to time t1).

After charging is finished, in step S118b, the hydrogen supply valve 44 is closed and the supply of fuel gas to the fuel cell 14 is stopped. It should be noted that even after the hydrogen supply valve 44 has been closed, fuel gas remains within the fuel gas flow field 148. In order to consume the remaining gas, in step S118c, the supply of air continues.

Therefore, in step S118d, the power generation current If is supplied to auxiliary devices, such as the air compressor 36, in order to consume the fuel gas (time t1 to time t2). Due to consumption of the fuel gas, the gas pressure within the fuel gas flow field 148 gradually decreases (time t1 to time t2).

Then, in steps S118e, S118f, S118g and S118h, the first stage process of the second scavenging process, for discharging liquid droplets in the oxygen-containing gas flow field 146, is performed (time t2 to time t3). At this time, in step S118e, the humidification bypass valve 58 and the intercooler bypass valve 57 are opened (time t2).

Then, in step S118f, the contactor 82 is closed to initiate the discharge process, thereby allowing the discharge resistor 80 to consume the power generation current If (time t2).

Then, in step S118g, the flow rate of air discharged from the air compressor 36 is increased (time t2), and dry air, at a large flow rate, is supplied to the oxygen-containing gas flow field 146 for a predetermined period of time (time t2 to time t3) in step S118h, thereby discharging (removing) liquid droplets that remain in the oxygen-containing gas flow field 146. The time required for removing liquid droplets from the oxygen-containing gas flow field 146, from time t1 to time t3, is about 20 [sec].

After liquid droplets have been discharged from the oxygen-containing gas flow field 146 by the first stage process of the two stage scavenging process, in steps S118i to S118k, the cathode 120c of the fuel cell 14 is dried, and the second stage process of the two stage scavenging process is performed (time t3 to time t5), so as to enable reliable starting of the next operation of the fuel cell system 10B at low temperatures, such as a temperature below the freezing point.

At this time, in step S118i, operation of the air compressor 36 is suppressed, so that air is supplied at a small flow rate. Dry air at a small flow rate is supplied to the oxygen-containing gas flow field 146 (time t3). The small flow rate in the second stage process of the two stage scavenging process (third scavenging process) is determined in order to achieve a flow rate pressure in which the accumulated volume flow rate F, as measured by the flow rate sensor 91, becomes maximum, or to achieve a flow rate pressure in which the relative humidity RH of the air discharge channel 40 at the exhaust port of the scavenging gas, as measured by the humidification sensor 92, becomes maximum, in order to efficiently dry the oxygen-containing gas flow field 146.

Then, in step S118*j*, dry air at a small flow rate is supplied into the oxygen-containing gas flow field 146, at a small flow rate and for a predetermined period of time, in order to reliably enable starting of the next operation at low temperatures (time t3 to time t5). The period of time during which dry air is supplied is a time required for achieving a predetermined moisture content in the electrolyte membrane 120*b*, so as to have a value determined based on performance when starting the next operation of the fuel cell system 10B. Alternatively, the period of time during which dry air is supplied is a time required for achieving a predetermined relative humidity in the air discharge channel 40, so as to have a predetermined value.

Figure 19:
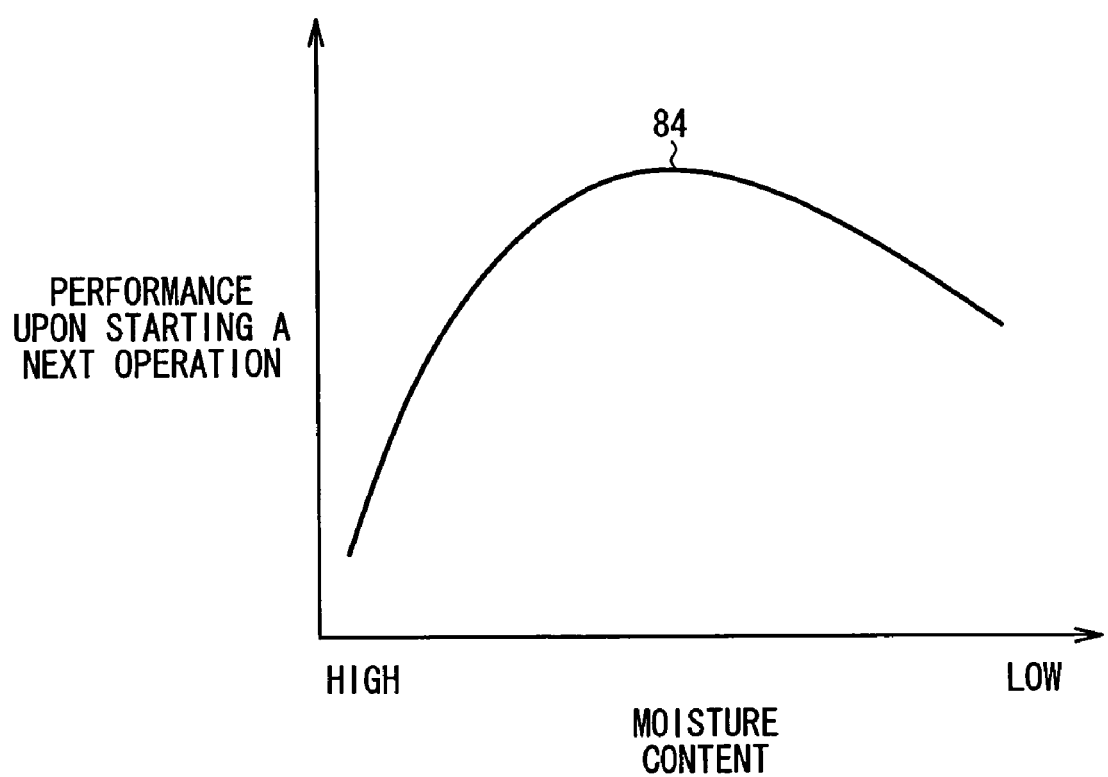
FIG. 19 is a characteristic graph showing the relationship between moisture content and performance upon initiating a next operation of the fuel cell system.

Specifically, in FIG. 19, as can be seen from the relationship (characteristic curve) 84 between the starting performance at the next operation (i.e., the maximum output after power generation is enabled) and the moisture content in the electrolyte membrane 120*b*, the starting performance at the next operation becomes high (i.e., the maximum output becomes high) at an intermediate state, where the moisture content is neither excessively high nor excessively low. Thus, based on the characteristic curve 84, the predetermined period of time in step S118*j* is a time required for supplying dry air at a small flow rate, in order to achieve a starting performance at the next operation, so as to have the predetermined value or greater.

Alternatively, the process of step S118*j* may be performed by determining whether a residual electrical energy remaining in the capacitor 16 has decreased to an electrical energy required for starting the next operation of the fuel cell system 10 at low temperatures, such as a temperature below the freezing point. Further, during the discharge control that is initiated in step S118*f*, although not shown in the flow chart, at time t14, when the gas pressure in the fuel gas flow field 148 decreases to a predetermined value or less, or at a time when the power generation voltage Vf of the fuel cell 14 decreases to a predetermined value or less, the contactor 82 is opened, thereby completing the discharge control process.

Then, in step S118*k*, operation of the air compressor 36 is stopped, and the bypass valves 57, 58 are closed, thereby completing the second stage process of the two stage scavenging process. In this manner, the second scavenging process is finished.

Thus, if it is determined that a present operation of turning off the ignition switch 76, in step S106, represents a stop request for stopping operation of the fuel cell system 10B, after generating power for a short period of time at low temperatures, and water is produced only within the oxygen-containing gas flow field 146 on the cathode 120*c* side, then liquid droplets in the oxygen-containing gas flow field 146 are discharged at a large flow rate, and thereafter, the two stage scavenging process is performed at a small flow rate to cause drying. In this manner, reliable performance upon starting the next operation of the fuel cell system 10 can be achieved, even at low temperatures, such as a temperature below the freezing point.

During this control, in step S104, after it is determined that the temperature sensor 71 is not operating properly, in step S120, if the ignition switch 76 is turned off, the above described two stage scavenging process in step S118 is performed. By performing the two stage scavenging process, under any circumstances, it is possible to reliably start the next operation. That is, even if the ignition switch 76 has been turned off at low temperatures, such as a temperature below the freezing point, in comparison with the three stage scavenging process (to be described later), operation can be restarted with small energy consumption.

Although the first and second stage processes of the two stage scavenging process, which have been described with reference to the flow chart of FIG. 17 and the time chart of FIG. 18, are performed temporally continuously when the ignition switch 76 is turned off, as shown by the flow chart of FIG. 20 and the time chart of FIG. 21, the first stage process of the two stage scavenging process may be performed when the ignition switch 76 is turned off, and the second stage process of the two stage scavenging process may be performed a predetermined period of time after the ignition switch 76 has been turned off (after a predetermined condition is satisfied), i.e., the first and second stage processes may be performed intermittently, and separately (in divided periods of time).

Figure 20:
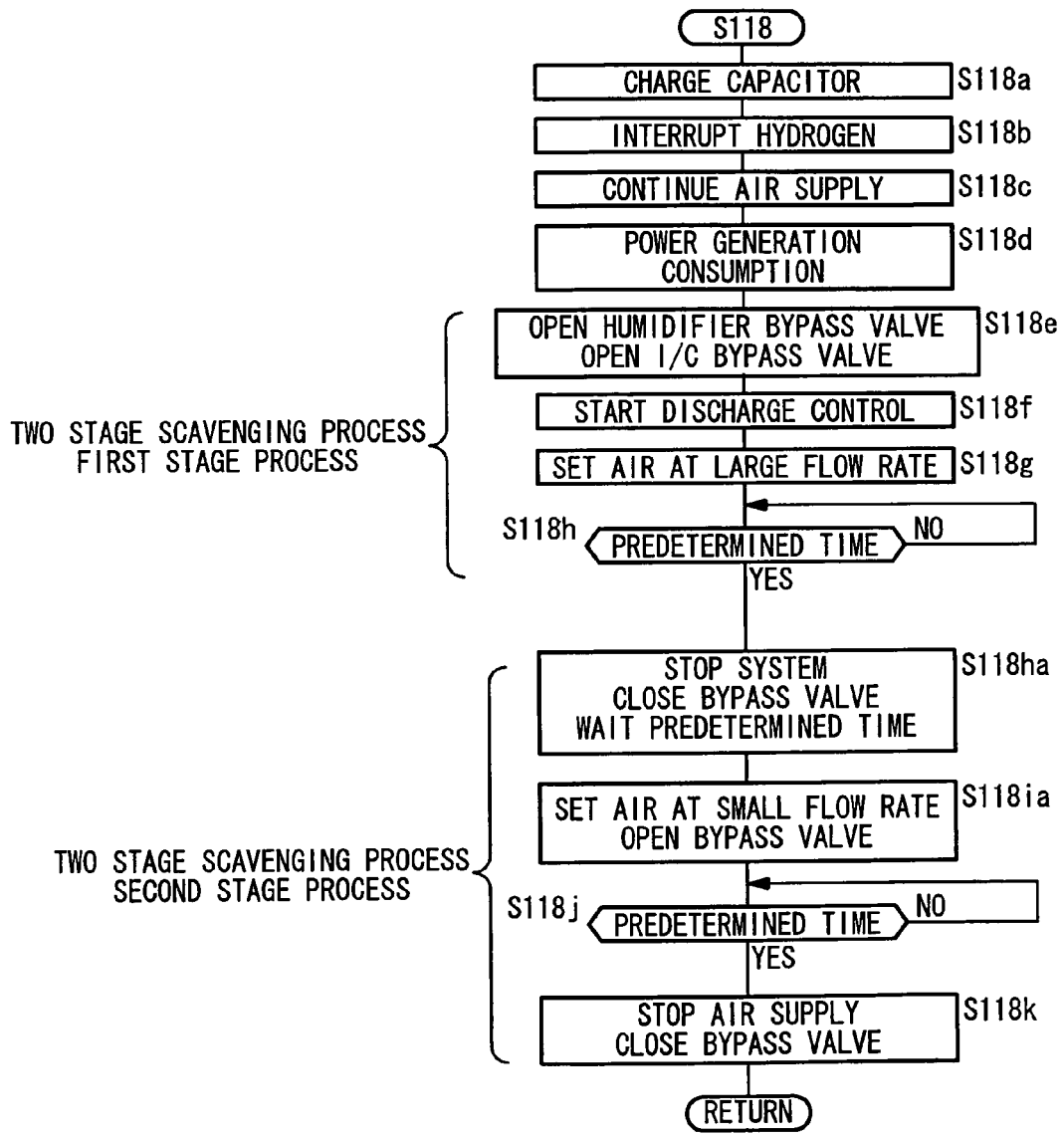
FIG. 20 is a flow chart showing a two stage scavenging process (with division)
Figure 21:
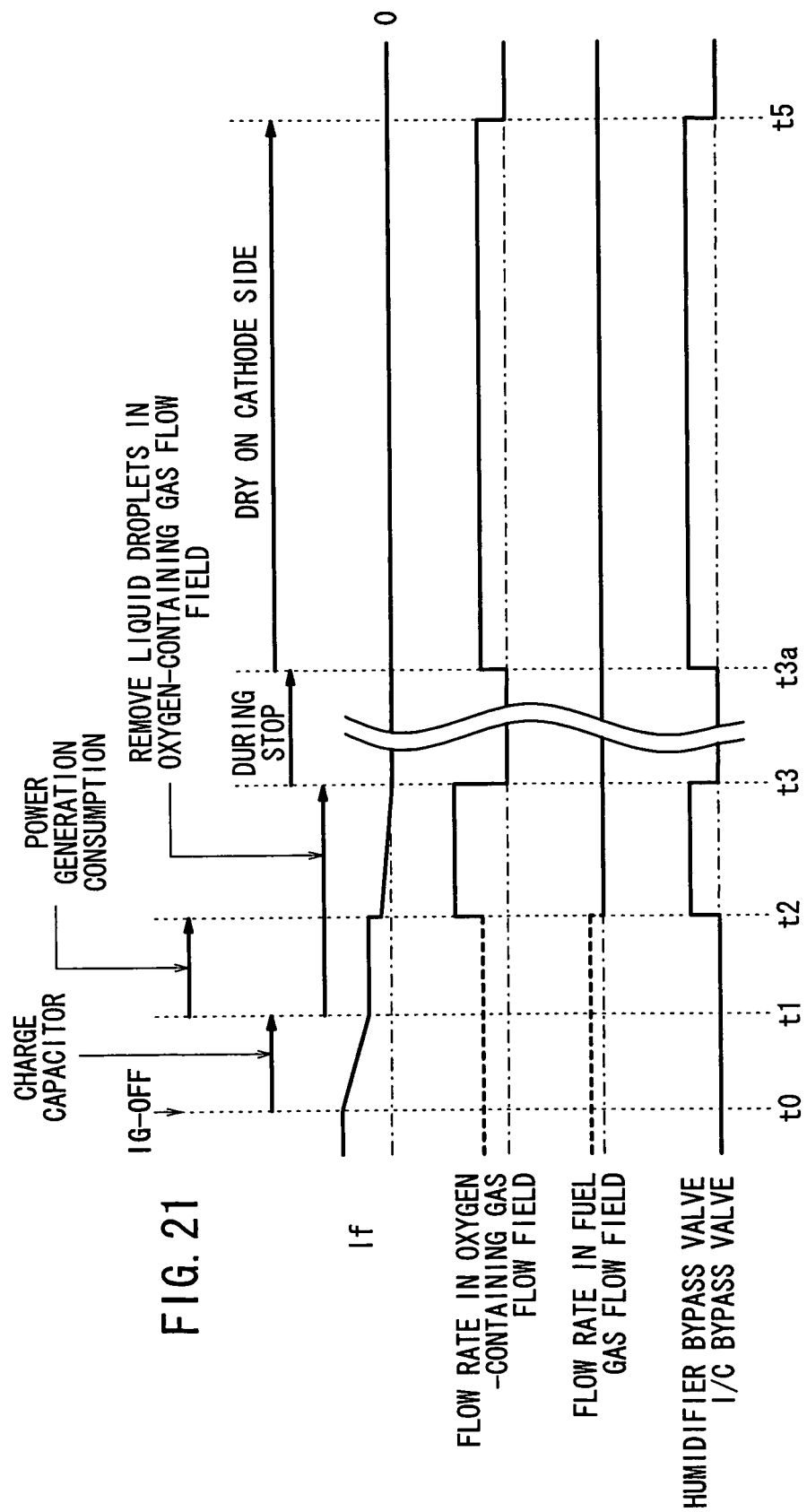
FIG. 21 is a time chart showing the two stage scavenging process (with division)

The flow chart of FIG. 20 and the time chart of FIG. 21 show the two stage scavenging process (with division).

During the two stage scavenging process (with division), after the processes of steps S118*a* to S118*d* are completed and the first stage process of the two stage scavenging process, in steps S118*e* to S118*h*, has finished, in step S118*ha*, a system stopping process is performed, e.g., by closing the humidifier bypass valve 58 and the intercooler bypass valve 57, so as to stop operation of the air compressor 36 (time t3). Then, time counting for a predetermined period of time, i.e., time intervals determined in accordance with the system temperature (temperature Th of the fuel cell 14) is initiated, while the control device 70 is placed in a sleep mode. That is, in the present embodiment, the control device 70 is placed in a standby state for the predetermined period of time.

After a predetermined period of time in the standby state has elapsed (when the predetermined time period has elapsed after stopping the system), the control device 70 wakes up, and performs the second stage process of the two stage scavenging process. At this time, in step S118*ia*, operation of the air compressor 36 is adjusted in order to supply air at a small flow rate, while the humidifier bypass valve 58 and the intercooler bypass valve 57 are opened to supply dry air at a small flow rate into the oxygen-containing gas flow field 146 (time t3*a*).

Then, as described above, in step S118*j*, dry air at a small flow rate is supplied for a predetermined period of time, until the starting performance of the next operation reaches or exceeds a predetermined value on the characteristic curve 84. Then, in step S118*k*, operation of the air compressor 36 is stopped and the bypass valves 57, 58 are closed, thereby completing the two stage scavenging process (with division).

During the two stage scavenging process (with division), when the ignition switch 76 is turned off, by supplying oxygen-containing gas at a large flow rate, liquid droplets in the oxygen-containing gas flow field 146 are removed in a short period of time. Then, the system is stopped temporarily. After a predetermined period of time has elapsed, oxygen-containing gas at a small flow rate is supplied to the oxygen-containing gas flow field 146 in order to dry the electrolyte membrane 120*b* or the like. Thus, after a stop request, such as turning off the ignition switch 76, has occurred, the system is stopped immediately. Therefore, it is possible to even further prevent the operator from experiencing a sense of discomfort.

Figure 22:
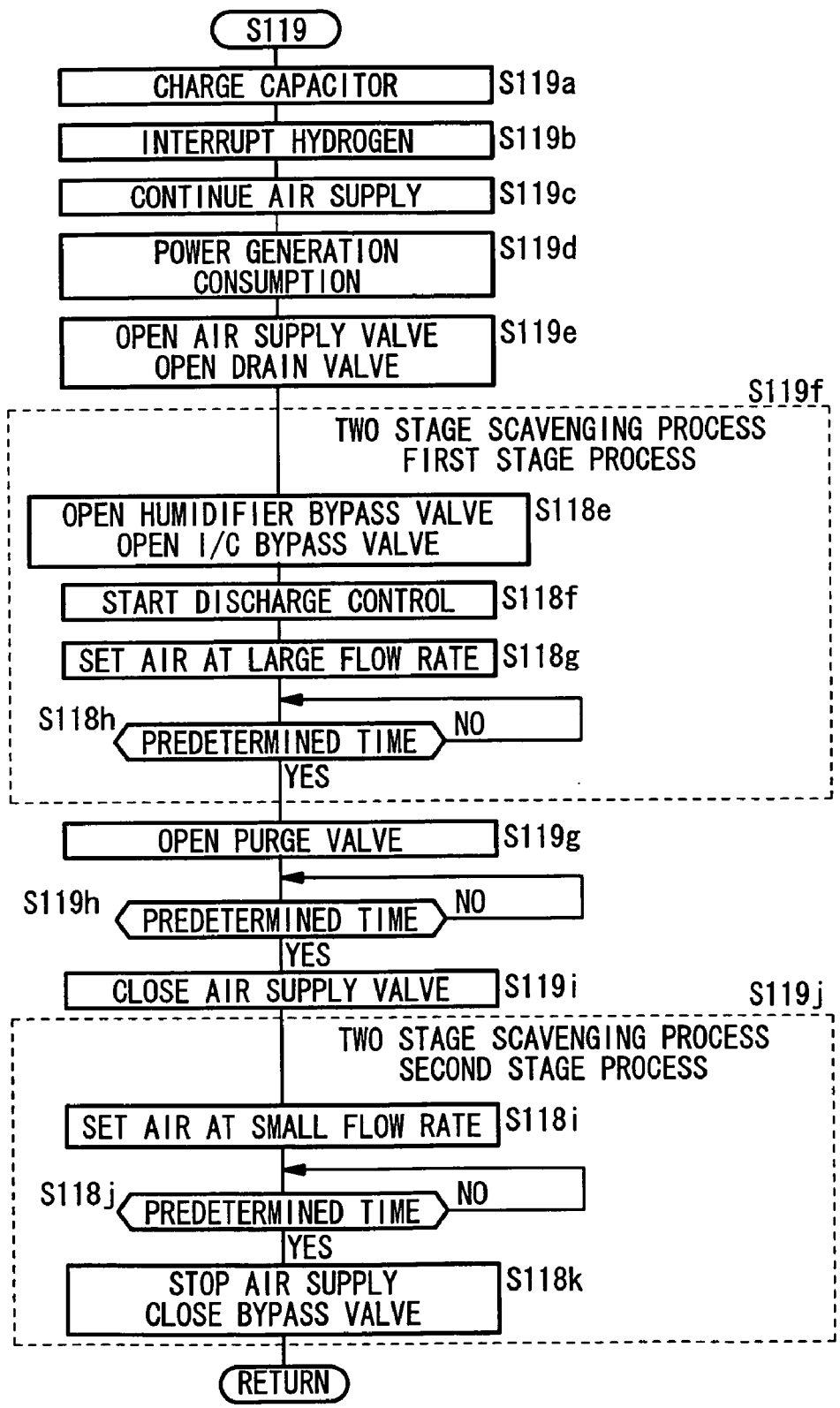
FIG. 22 is a flow chart showing a three stage scavenging process.
Figure 23:
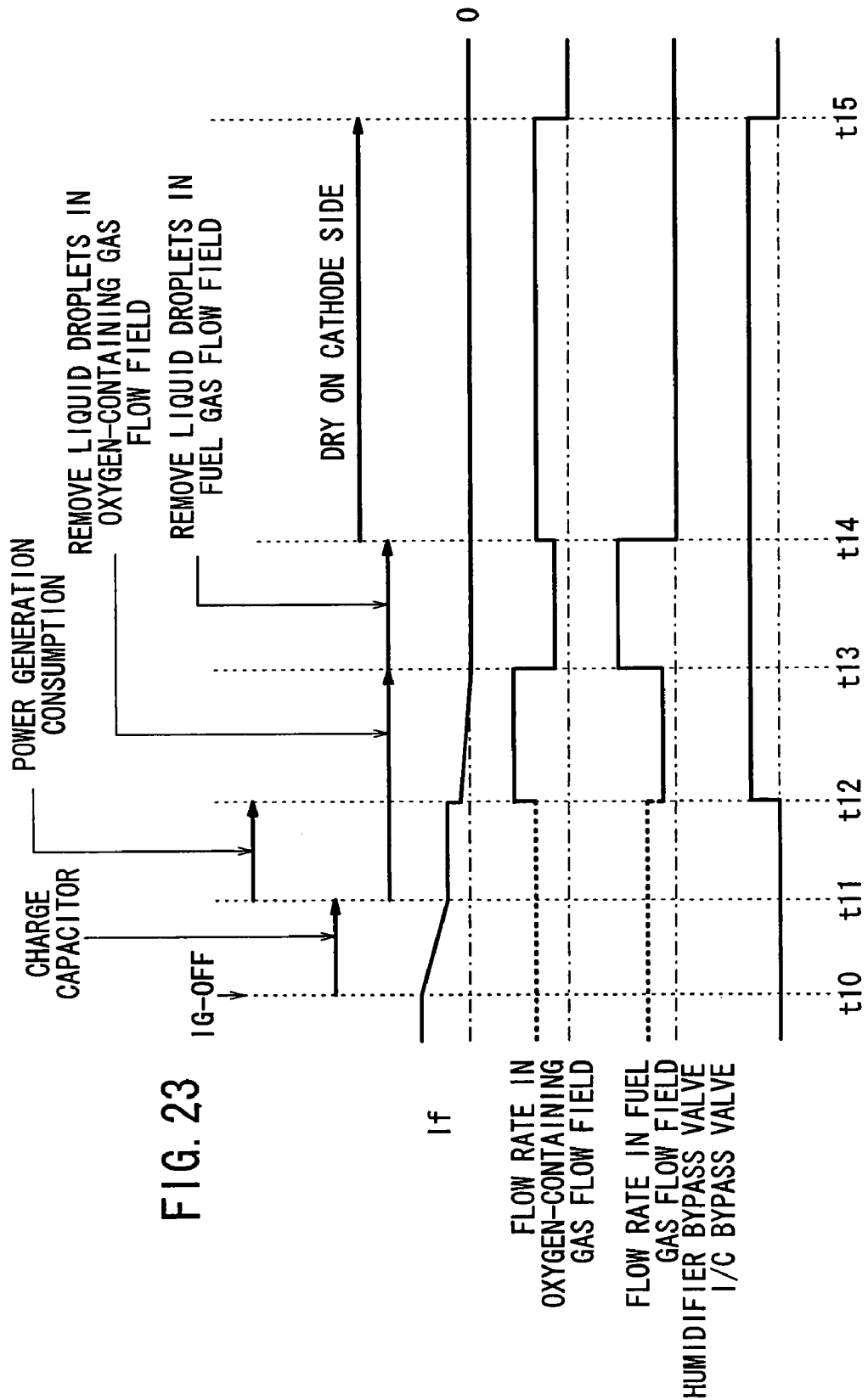
FIG. 23 is a time chart showing the three stage scavenging process.

Next, with reference to the flow chart shown in FIG. 22, and the time chart shown in FIG. 23, operations of the three stage scavenging process, in step S119, shall be described. The three stage scavenging process is performed in cases where it is determined that the present operation of turning off the ignition switch 76, in step S106, represents a request to stop operation of the fuel cell system 10B after generating power for a short period of time at low temperatures, and water is produced in both the oxygen-containing gas flow field 146 on the cathode 120c side and the fuel gas flow field 148 on the anode 120a side.

During this process, in order to reliably implement the present system stop control, and reliably start the next operation of the fuel cell system 10B at low temperatures, such as a temperature below the freezing point, when it is detected that the ignition switch 76 has been placed in the OFF state at time t10, first, in step S119a, the capacitor 16 is charged to a predetermined capacity level using the power generation current If (time t10 to time t11).

After charging is completed, in step S119b, the hydrogen supply valve 44 is closed and supply of the fuel gas to the fuel cell 14 is finished. It should be noted that, even after the hydrogen supply valve 44 has been closed, fuel gas remains within the fuel gas flow field 148. In order to consume the remaining gas, in step S119c, supply of air continues.

Therefore, in step S119d, the power generation current If is supplied to auxiliary devices, such as the air compressor 36, in order to consume the fuel gas (time t11 to time t12). By consuming the fuel gas, the gas pressure within the fuel gas flow field 148 gradually decreases (time t11 to time t12).

Then, in step S119e, in order to meet a dilution requirement for the fuel gas discharged to the outside, the drain valve 50 is opened to provide a relatively small flow rate, and the air supply valve 54 is opened (time t12).

Then, in step S119f, the first stage process of the two stage scavenging process, which is identical to the process of steps S118e to S118h as described with reference to the flow chart of FIG. 17, i.e., wherein liquid droplets are discharged from the oxygen-containing gas flow field 146, is performed (time t12 to time t13). Therefore, during the period from time t12 to time t13, as described above, dry air at a large flow rate is supplied into the oxygen-containing gas flow field 146 in order to discharge (remove) liquid droplets remaining in the oxygen-containing gas flow field 146. Also, in this case, the time required for removing liquid droplets in the oxygen-containing gas flow field 146, during the period from time t11 to time t13, is about 20 [sec].

Since the air supply valve 54 is opened at time t12, after time t12, air also is supplied to the fuel gas flow field 148. The hydrogen purge valve 30, which provides a large flow rate, is closed, whereas the drain valve 50 is opened so as to provide a small flow rate. Therefore, air is supplied at the small flow rate to the fuel gas flow field 148. In this case, the fuel gas discharged from the drain valve 50 through the discharge channel 52, as well as the oxygen-containing gas discharged from the air discharge channel 40, are diluted through the dilution box 90 and discharged to the outside as diluted gases.

In this manner, liquid droplets are discharged from the oxygen-containing gas flow field 146, whereas the fuel gas is diluted and discharged from time t13 without increasing the fuel gas discharge concentration, so as to discharge (remove) liquid droplets from the fuel gas flow field 148.

During this process, in step S119g, by opening the hydrogen purge valve 30 to provide a large flow rate (time t13), in step S119h, air at a large flow rate is supplied into the fuel gas flow field 148 where the diluted fuel gas remains, the air being supplied for a predetermined time period (time t13 to time t14) so as to discharge (remove) the liquid droplets in the fuel gas flow field 148 together with the diluted fuel gas. Then, in step S119i, the air supply valve 54 is closed.

From time t12 to time t14, liquid droplets in the oxygen-containing gas flow field 146 and the fuel gas flow field 148 are removed respectively, in separated periods of time, so that the flow rates in the oxygen-containing gas flow field 146 and the fuel gas flow field 148 do not become large at the same time. Thus, it is possible to restrict operation of the air compressor 36 and reduce noise. As a result, compared to the conventional technique, a small and lightweight air compressor, with a small capacity, can be used as the air compressor 36. Further, from time t12 to t13, the fuel gas is gradually diluted and the diluted gas is discharged to the outside. Therefore, an oxygen-containing gas does not have to be supplied to the dilution box 90 simply for the purpose of diluting the fuel gas.

Then, in step S119j, the second stage process of the two stage scavenging process, which is identical to the process of steps S118i to S118k as described with reference to the flow chart of FIG. 17, i.e., a process for drying the fuel cell 14 on the cathode 120c side, is performed (time t14 to time t15), so as to enable reliable starting at the next operation at low temperatures, such as a temperature below the freezing point.

In this manner, by performing the three stage scavenging process in cases where it is determined that an operation of turning off the ignition switch 76 represents a request to stop operation after generating power for a short period of time at low temperatures, and water is produced in both the oxygen-containing gas flow field 146 on the cathode 120c side and the fuel gas flow field 148 on the anode 120a side, stable performance upon starting the next operation can reliably be achieved, even at low temperatures, such as a temperature below the freezing point.

Although the first and second stage processes of the two stage scavenging process, which are performed during the three stage scavenging process that has been described with reference to the flow chart of FIG. 22 and the time chart of FIG. 23, are performed temporally continuously, as shown in the flow chart of FIG. 24 and the time chart of FIG. 25, the first stage process of the two stage scavenging process may be performed when the ignition switch 76 is turned off, whereas the second stage process of the two stage scavenging process may be performed a predetermined period of time after the ignition switched 76 has been turned off (after a predetermined condition is satisfied). In other words, these processes may be performed intermittently, and separately (in divided periods of time).

Figure 24:
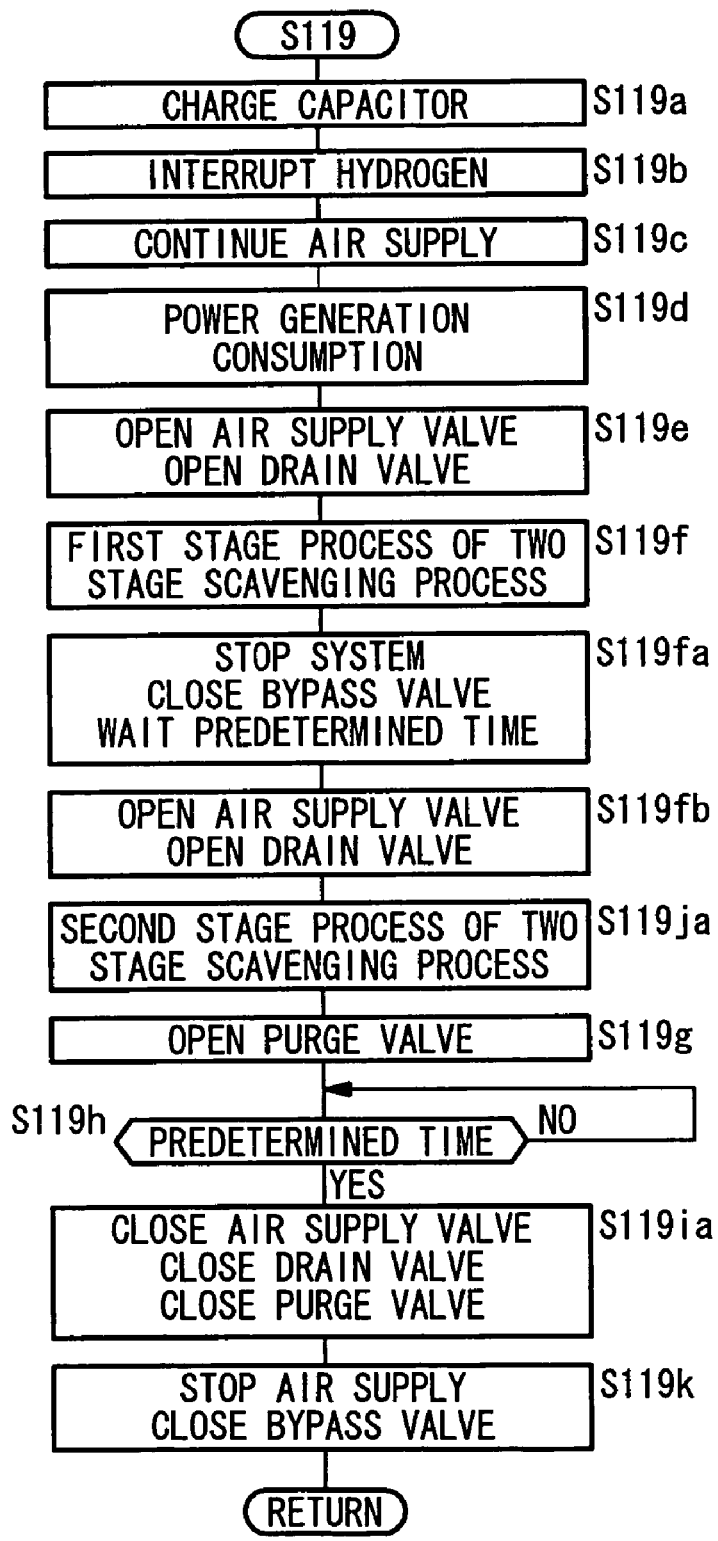
FIG. 24 is a flow chart showing the three stage scavenging process (with division)
Figure 25:
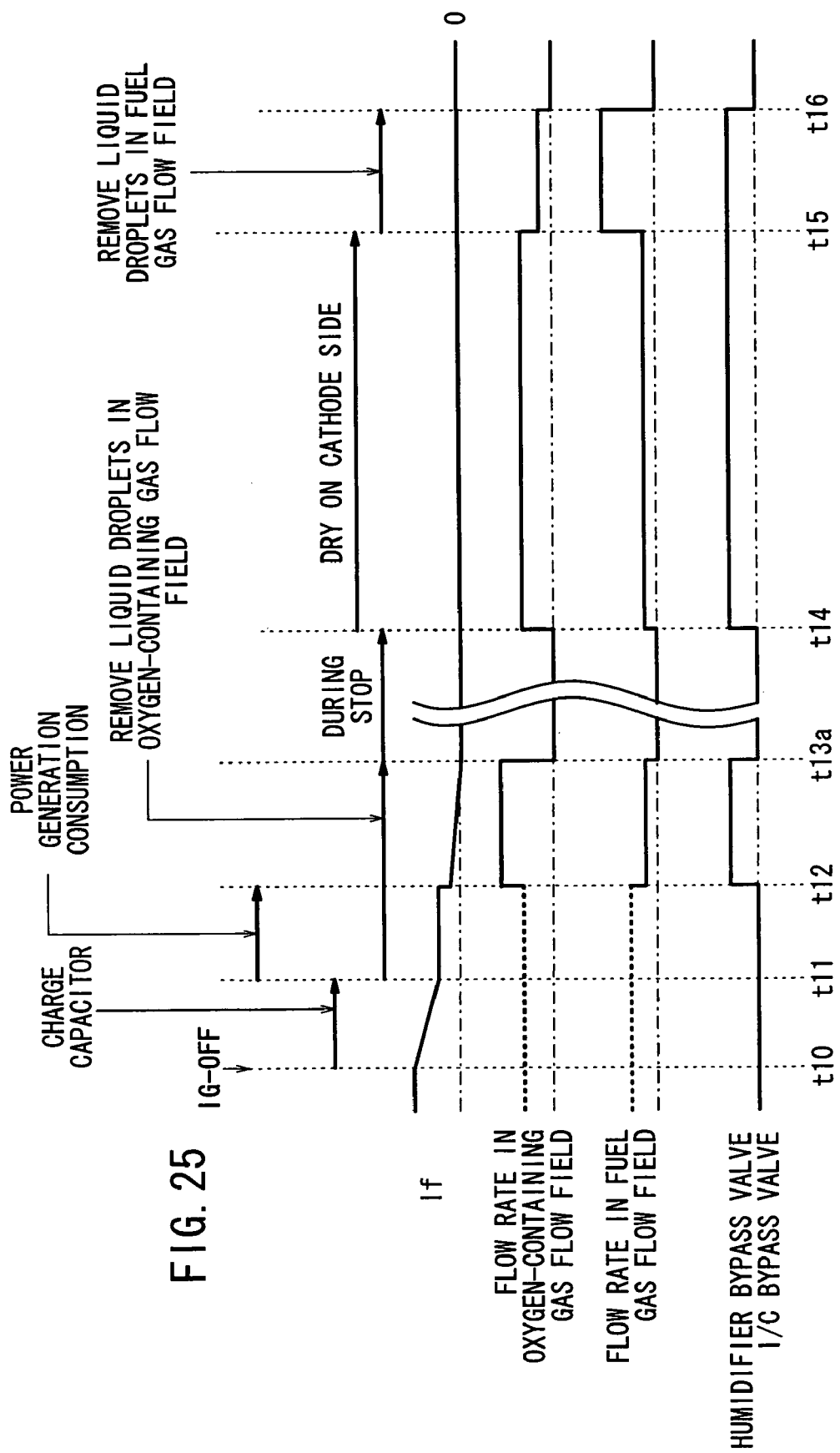
FIG. 25 is a time chart showing the three stage scavenging process (with division)

The flow chart of FIG. 24 and the time chart of FIG. 25 show a three stage scavenging process (with division).

During the three stage scavenging process (with division), after the processes of steps S119a to S119d and the first stage process of the two stage scavenging process, in step S119fa of step S119f, are finished, a process for stopping the system is performed. For example, the humidifier bypass valve 58 and the intercooler bypass valve 57 are closed, so as to stop operation of the air compressor 36 (time t13). Then, counting of time intervals that define a predetermined time period, i.e., time intervals that are determined in accordance with the system temperature (temperature Th of the fuel cell 14), is initiated. Accordingly, the control device 70 is placed in a sleep mode, or standby state, for a predetermined period of time.

After the predetermined period of time in the standby state has elapsed (when the predetermined time period has elapsed after stopping the system), the control device 70 wakes up. Then, in order to perform the second stage process of the two stage scavenging process, first, in step S119fb, the air supply valve 54 and the drain valve 50 are opened to provide a small flow rate.

Then, during the second stage process of the two stage scavenging process of step S119ja (the step is referred to as S119a instead of S119, since the valve open/close control in the process of step S118*k* is different, as described later), as described above with reference to the flow chart of FIG. 20, in step S118*ia*, operation of the air compressor 36 is controlled to supply air at a small flow rate, whereas the humidifier bypass valve 58 and the intercooler bypass valve 57 are both opened to supply dry air at a small flow rate into the oxygen-containing gas flow field 146.

Then, in step S118*j*, dry air is supplied, at a small flow rate and for a predetermined period of time, until the next start up performance reaches or exceeds a predetermined value, as determined by the characteristic curve 84, and operation of the air compressor 36 is stopped. In this process, unlike the process of step S118*k*, the two stage scavenging process (with division) is completed (time t15) without closing the bypass valves 57 and 58.

Next, the above-described process for discharging (removing) liquid droplets from the fuel gas flow field 148 is performed (time t15 to time t16).

During this process, in step S119*g*, by opening the hydrogen purge valve 30 to provide a large flow rate (time t15), in step S119*h*, air is supplied at a large flow rate into the fuel gas flow field 148 for a predetermined period of time, thereby discharging (removing) the liquid droplets in the fuel gas flow field 148. Then, in step S119*ia*, the air supply valve 54 is closed, while the drain valve 50 and the hydrogen purge valve 30 also are closed (time t16). At the same time, the air compressor 36 is stopped, while the bypass valves 57, 58 are closed (time t16), in order to complete the three stage scavenging process (with division).

Figure 26:
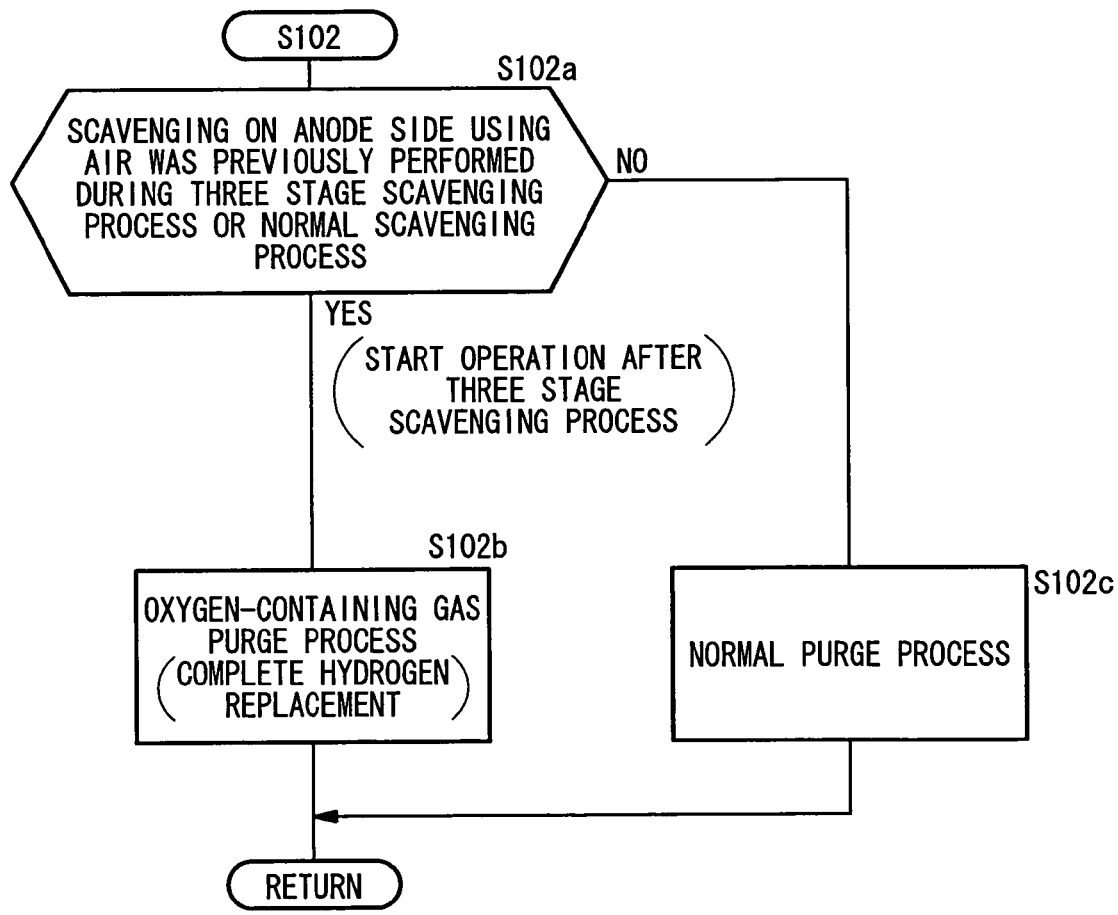
FIG. 26 is a flow chart showing a preparatory process.

Next, the preparatory process of step S102 shall be described below with reference to the flow chart shown in FIG. 26.

As described above, in step S101, when an ON signal from the ignition switch 76 is detected, in step S102, data is provided indicating whether scavenging on the anode side using air had been performed during the scavenging process at the time of stopping the previous operation. That is, if a scavenging process on the anode side using air was performed, during the three stage scavenging process or during the normal scavenging process, gas within the fuel gas flow field 148 has been replaced by air. Therefore, an oxygen-containing gas, made up chiefly of nitrogen, remains within the flow field on the anode side including the fuel gas flow field 148. Thus, in order to achieve a desired start up performance, an oxygen-containing gas purging process must be performed, for discharging the oxygen-containing gas and replacing the oxygen-containing gas with a hydrogen gas, thereby providing a highly pure fuel gas.

For this purpose, in step S102*b*, after the hydrogen supply valve 44 has been opened, the hydrogen purge valve 30 also is opened until the gas residing within the flow field of the anode system is completely replaced by hydrogen gas. Thereafter, in step S103, power generation is initiated.

As a result of the determination made in step S102*a*, in cases where the three stage scavenging process was not performed, or when the scavenging process on the anode side using air was not performed during the two stage scavenging process (i.e., in cases where the two stage scavenging process was performed or the scavenging process on the anode side using air was not performed during the normal scavenging process), the normal purge process is performed in step S102*c*. During the normal purge process, after the hydrogen supply valve 44 has been opened upon starting operation of the fuel cell system 10B, the hydrogen purge valve 30 also is opened for a predetermined period of time, in correspondence with the soaking period (a period of time which is significantly shorter in comparison with the predetermined time period in step S102*b*), for replacing the gas residing in the flow field of the anode system by the highly pure fuel gas. Then, power generation is initiated in step S103.

Figure 27:
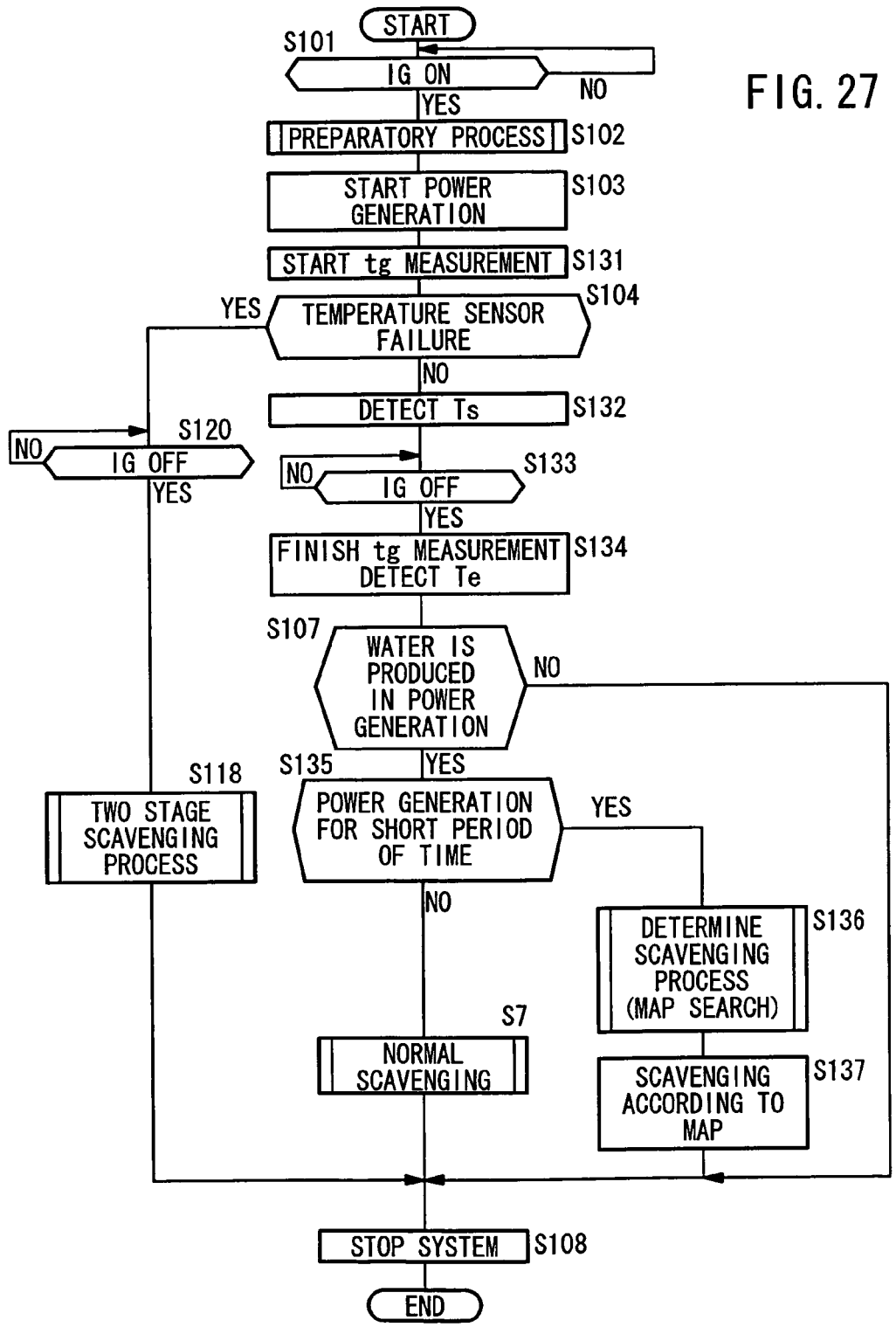
FIG. 27 is a flow chart showing operation in a case when the scavenging process is determined using a map.

FIG. 27 is a flow chart showing the process for determining the above scavenging process, as a result of using a map (look up table), according to the third embodiment of the present invention. In the flow chart of FIG. 27, processes that are identical to those shown in FIG. 16 shall be labeled using the same step numbers, and detailed descriptions thereof shall be omitted.

In step S101, when an ON signal from the ignition switch 76 is detected, in step S102, a preparatory process is performed, with reference to details of the scavenging process, which was performed when stopping the previous operation.

After the preparatory process, in step S103, power generation of the fuel cell 14 is initiated.

In step S131, the timer 73 begins counting the power generation time tg from the start of power generation. Instead of the power generation time tg, an accumulated power generation amount from the start of power generation may also be measured.

Then, in step S104, it is determined whether the temperature sensor 71 is operating properly or not.

If it is determined that the temperature sensor 71 is operating properly, in step S132, the temperature Th of the fuel cell 14, immediately after power generation, is detected as a power generation start temperature Ts (Th=Ts).

Then, in step S133, it is detected whether the ignition switch 76 has been placed in the OFF state. If the ignition switch 76 is in an OFF state, then it is determined that a stop request has been received during power generation and after starting operation of the fuel cell 14 (step S101). Then, in step S134, the temperature Th of the fuel cell 14, at the time of stopping power generation, or more correctly when the ignition switch 76 was turned off, is detected as a power generation end temperature Te (Th=Te). At the same time, in step S134, upon completion of the power generation time from the start of power generation, the time from the start to the end of the present power generation period is measured as a power generation time tg.

Then, in step S107, it is determined whether water was produced in the fuel cell 14 as a result of power generation by the fuel cell 14, from a time when the present operation was started to a time when a stop request was received.

As described above, the determination of step S107 may be made based either on an accumulated power generation amount [Wh], or on a change in the weight of the fuel cell 14. In either of these cases, the relationship (characteristic) between the accumulated power generation amount and the water amount, or the relationship between the change in weight and the water amount, is determined in advance, and such characteristic data is stored in the memory of the control device 70. With reference to such characteristic data, the water amount can be detected.

In step S107, if it is determined that water has not been produced, in step S108, for example, a normal stopping process of the fuel cell system 10B is performed (for example, the hydrogen supply valve 44 is closed and the air compressor 36 is stopped), without performing the scavenging process.

In step S107, if it is determined that water has been produced, in step S135, it is determined whether the power generation time tg counted in step S134 is a predetermined time period, e.g., a short time period of 1 to 2 minutes or less. (Alternatively, it may be determined whether the accumulated power generation amount represents an accumulated power generation amount, which corresponds to a short power generation time period or less.)

If the power generation time tg is 1 to 2 minutes or less, after the normal scavenging process in step S7 has been performed, the process in step S108 for stopping the system is performed.

In step S135, if the power generation time tg exceeds the predetermined period of time, i.e., 1 to 2 minutes, it is determined that the operation of turning off the ignition switch 76, in step S133, represents a request to stop operation after generating power for a short period of time. Then, in step S136, the power generation start temperature Ts and the power generation end temperature Te are used as coordinate points for determining the scavenging process.

Figure 28:
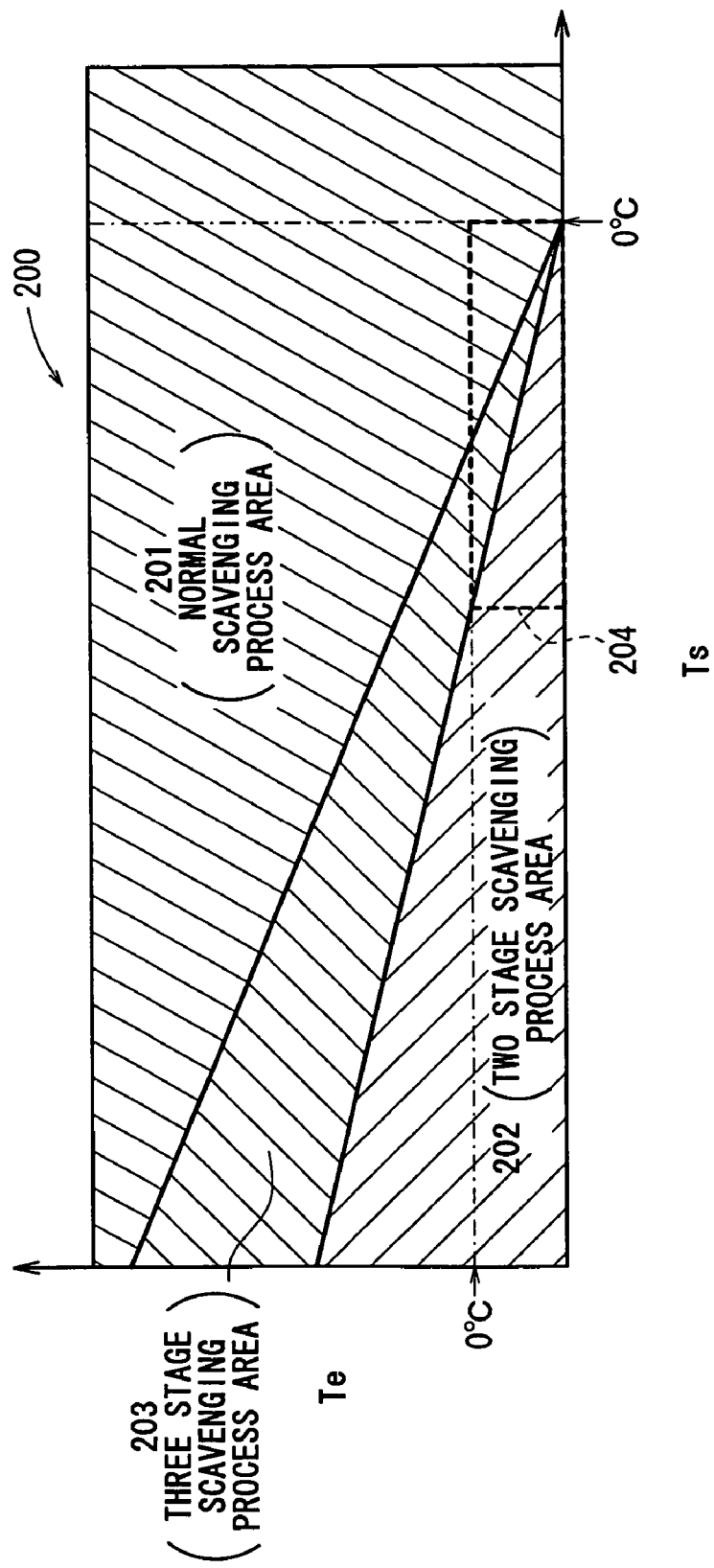
FIG. 28 is a graph of a scavenging process determination map.

FIG. 28 shows a map (scavenging process determination map) 200, which is searched during a procedure for determining the scavenging process.

Basically, an area in which both the power generation start temperature Ts and the power generation end temperature Te are relatively large is determined as a normal scavenging process area 201. An area in which the power generation end temperature Te is lowest is determined as a two stage scavenging process area 202. An intermediate area, between the normal scavenging process area 201 and the two stage scavenging process area 202, is determined as a three stage scavenging process area 203. The rectangular area, in which the power generation start temperature Ts is 0[C.°] or less while being equal to or exceeding the preset temperature, and the power generation end temperature Te is 0[C.°] or less, represents a two stage scavenging process area 204.

The two stage scavenging process area 204 is used in cases where it is determined that the device required for anode scavenging is frozen, e.g., in cases where the air supply valve 54 will not work because the air supply valve 54 is frozen. If it is determined that the device required for anode scavenging is not frozen, in the two stage scavenging process area 204, it is determined that processes in any of the other areas 201 to 203 should be performed.

Then, in step S137, a scavenging process, which is determined based on the scavenging process determination map 200, is performed.

More specifically, if it is determined that an operation of turning off the ignition switch 76 in step S133 represents a request to stop operation of the fuel cell system 10B after generating power for a short period of time at low temperatures, either the two stage scavenging process or the three stage scavenging process is performed. If it is determined that an operation of turning off the ignition switch 76 in step S133 represents a request to stop operation of the fuel cell system 10B after generating power for a short period of time, but not at low temperatures, the normal scavenging process is performed.

As described above, in the third embodiment, the fuel cell system 10B includes a scavenging means (70, 36, 54), for scavenging at least one of the fuel gas flow field 148 where the fuel gas flows, and the oxygen-containing gas flow field 146 where the oxygen-containing gas flows, using a scavenging gas (air in the present embodiment) when or after power generation by the fuel cell 14 has been stopped.

In particular, the third embodiment is intended to prevent the occurrence of cases in which power generation performance is degraded excessively, if operation of the fuel cell system 10B is stopped after generating power for a short period of time at low temperatures, such as a temperature below the freezing point, or even in a worst case scenario, in which operation of the fuel cell system 10B cannot be restarted.

The determination of whether an operation of turning off the ignition switch 76 after the ignition switch 76 was turned on represents a request to stop operation after generating power for a short period of time at a low temperature is made in the following manner. For example, if the temperature Th at the time of starting operation (at a time when the ignition switch 76 is turned on) is at or below a preset temperature Ta (Ta=0[C.°]) (step S105: YES), and the temperature at the time of turning off the ignition switch 76 is at or below a preset temperature Tb (step S109: YES), or at or below a preset temperature Tc (step S10: YES), the operation of turning off the ignition switch 76 after the ignition switch 76 was turned on is determined to be a request to stop operation after generating power for a short period of time at a low temperature. The control device 70, which functions as a scavenging process switching means, switches from the normal scavenging process (step S7) to the two stage scavenging process as the first scavenging process (step S118), or to the three stage scavenging process as the second scavenging process (step S119).

The control device 70 may select either the two stage scavenging process or the three stage scavenging process, based on the scavenging process determining map 200, while using as parameters the power generation start temperature Ts and the power generation end temperature Te, as shown in FIG. 28.

Further, if no water is produced by power generation (step S107: NO), or even if water is produced, if power is generated for only a very short period of time (or if the accumulated power generation amount is at a level representing a case where power is generated for a very short period of time), the control device 70 selects the normal scavenging process.

Basically, the two stage scavenging process includes a prior scavenging process as well as a post scavenging process, which is performed after the prior scavenging process. The prior scavenging process is performed for a short period of time, for scavenging water droplets produced in the oxygen-containing gas flow field 146 using an oxygen-containing gas at a large flow rate. The post scavenging process is performed after the prior scavenging process, for a long period of time which is longer than the short period of time, in order to regulate the electrolyte membrane 120b so as to have a desired moisture content, using a dry oxygen-containing gas at a small flow rate, thereby achieving good performance when starting the fuel cell system 10B.

Further, the three stage scavenging process includes an intermediate scavenging process, which is performed during scavenging, before or after the second stage scavenging process. The intermediate scavenging process is performed for a short period of time, for scavenging liquid droplets produced in the fuel gas flow field 148 using an oxygen-containing gas at a large flow rate. That is, the three stage scavenging process includes an additional scavenging process, which is performed on the anode 120a side for a short period of time, in addition to the two stage scavenging process.

Figure 29:
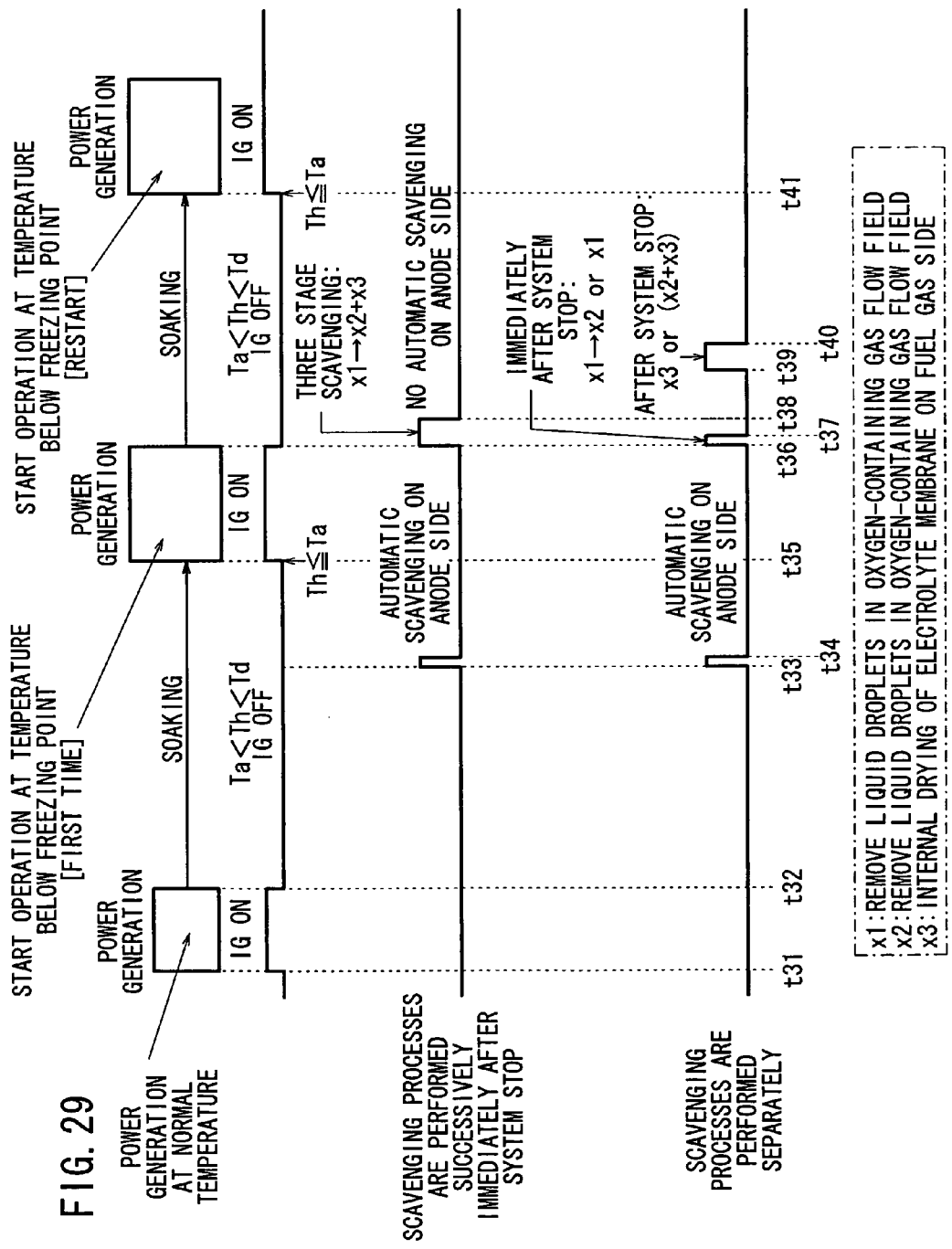
FIG. 29 is a time chart schematically showing the three stage scavenging process.

FIG. 29 is a time chart schematically showing the three stage scavenging process, according to the third embodiment.

The three stage scavenging process includes a first scavenging process x1 for scavenging using a scavenging gas at a large flow rate in order to remove liquid droplets in the oxygen-containing gas flow field 146, a second scavenging process x2 for scavenging using a scavenging gas at the large flow rate in order to remove liquid droplets in the fuel gas flow field 148, and a third scavenging process x3 for scavenging in the oxygen-containing gas flow field 146 using a scavenging gas at a small flow rate, which is smaller than the large flow rate. The second and third scavenging processes x2, x3 are performed after the first scavenging process x1, wherein the second and third scavenging processes x2, x3 are performed in order of the second scavenging process x2 followed by the third scavenging process x3, or in order of the third scavenging process x3 followed by the second scavenging process x2. The first scavenging process x1 and/or the second scavenging processes x2 are performed in order to dilute the fuel gas in the fuel gas flow field 148 and then discharge the diluted gas.

The third scavenging process x3 is performed after the first scavenging process x1, and after a predetermined condition has been satisfied. Specifically, in the example of FIG. 29, the predetermined condition is after a certain period of time, from time t36 to time t38, has elapsed.

More specifically, in the case where normal power generation is performed from time t31 to time t32, after the ignition switch 76 is turned off at time t32, a normal power generation process S7 is performed. During soaking, if the temperature Th of the fuel cell 14 arrives at or below a preset temperature Td (e.g., Td=5[C.°]), from time t33 to time t34, air scavenging on the anode side is performed automatically (step S71, S7m), in order to prepare for starting the next operation at low temperatures, such as a temperature below the freezing point.

Further, in the case where operation of the fuel cell system 10B is started at a low temperature, such as a temperature below the freezing point (Th≦Ta=0[C.°]), at time t35, and power generation is stopped within a short period of time, specifically, in cases where there is a request to stop operation of the fuel cell system 10B after generating power for a short period of time at low temperatures, when the system is stopped at time t36, a three stage scavenging process is performed continuously, immediately after stopping the system. That is, the second scavenging process x2 and the third scavenging process x3 are performed after the first scavenging process x1 (either the second scavenging process x2 or the third scavenging process x3 can be performed first). Thus, at time t41, the system can reliably be restarted at the next operation thereof, even at low temperatures such as a temperature below the freezing point.

Immediately after the system stop time t36, as the three stage scavenging process (with division), the second scavenging process x2 is performed after the first scavenging process x1. At time t39, immediately after a predetermined time period has elapsed, the third scavenging process x3 is performed. Alternatively, immediately after the system stop time t36, only the first scavenging process x1 is performed, and at time t39, after a predetermined time period has elapsed, the second scavenging process x2 is performed, and thereafter, the third scavenging process x3 is performed. Alternatively, immediately after the system stop time t36, only the first scavenging process x1 is performed, and at time t39 after a predetermined period time has elapsed, the third scavenging process x3 is performed, and thereafter, the second scavenging process x2 is performed.

In the above-described embodiment, when power generation by the fuel cell 14 is stopped, the first scavenging process x1 for removing liquid droplets from the oxygen-containing gas flow field 146 and the second scavenging process x2 for removing liquid droplets from the fuel gas flow field 148 are performed successively (i.e., the scavenging processes are not performed at the same time). Therefore, for the purpose of removing liquid droplets, compared to the conventional technique, an air compressor serving as a scavenging means and having a small capacity can be used for the air compressor 36. Further, after the liquid droplets have been removed from the oxygen-containing gas flow field 146, since additional scavenging of the oxygen-containing gas flow field 146 is performed, the oxygen-containing gas flow field 146 can be dried sufficiently up to a predetermined level of moisture content. As a result, when a request is received to stop operation of the fuel cell system, after generating power for a short period of time at low temperature, the scavenging process is reliably performed, and operation of the fuel cell system 10B can reliably be restarted, even at low temperatures, such as a temperature below the freezing point.

In the present embodiment, operation of the fuel cell system 10B is stopped after the scavenging process has been performed, at the time of stopping power generation by the fuel cell system 10B. Therefore, unlike the conventional technique, after a stop request is made, such as turning off the ignition switch, the operator does not feel any sense of discomfort due to an ongoing power generation operation.

Further, during the first scavenging process x1 and the second scavenging process x2, fuel gas within the fuel gas flow field 148 is diluted, and is discharged at the same time. Therefore, separate processes for dilution and discharge of the fuel gas are not required, and it is possible to dilute and discharge the fuel gas efficiently.

In this case, after the first scavenging process x1 has been performed and a predetermined time period has elapsed, by performing the third scavenging process for a relatively long period of time, the system can be stopped immediately upon receiving a stop request, and hence it is possible to further eliminate any sense of discomfort. Further, the second scavenging process x2 may be performed for a relatively short time period immediately after the first scavenging process x1, or during the period before or after the third scavenging process x3.

The small flow rate in the second stage process of the two stage scavenging process performed during the three stage scavenging process (i.e., the third scavenging process x3) is determined so as to achieve a flow rate pressure in which an accumulated volume flow rate F, as measured by the flow rate sensor 91, becomes maximum, or to achieve a flow rate pressure in which a relative humidity RH of the air discharge channel 40 at the exhaust port of the scavenging gas, as measured by the humidification sensor 92, becomes maximum, in order to efficiently dry the oxygen-containing gas flow field 146. The end of scavenging by the third scavenging process x3 may be determined when the relative humidity value RH in the air discharge channel 40 reaches a predetermined value.

The third scavenging process x3 is a process for drying the oxygen-containing gas flow field 146 using a scavenging gas.

Figure 30:
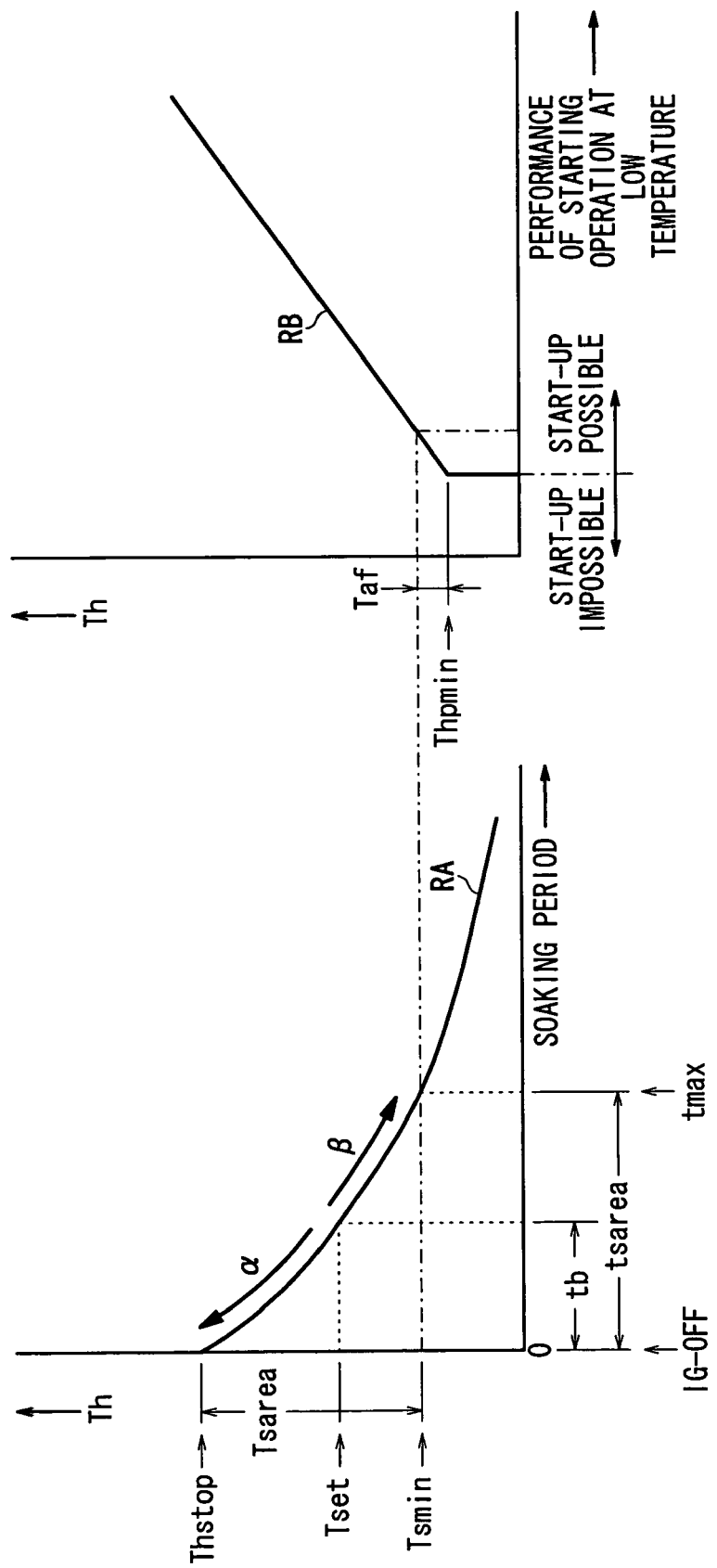
FIG. 30 includes graphs showing the relationship between the preset temperature upon starting the three stage scavenging process and starting operation performance of the fuel cell system.

On the left side in FIG. 30, the characteristic curve RA shows a relationship between the soaking period and the system temperature (Th) of the fuel cell 14. The orientation of the arrow a drawn along the characteristic curve RA indicates that, as the system temperature Th at the time of performing the third scavenging process x3 gets higher, the effectiveness of water removal (scavenging effect) by the scavenging process becomes large. That is, as can be seen from the relationship RB between the start up performance at low temperature and the system temperature Th at the time of performing the third scavenging process x3, on the right side in FIG. 30, as the system temperature Th (=preset system temperature Tset for starting the scavenging process) becomes higher, the start up performance also becomes high. Thus, a predetermined output current If can be extracted in a shorter period of time at low temperatures. On the left side in FIG. 30, the relationship RA between the soaking period and the system temperature Th shows that the temperature Th decreases after the ignition switch 76 has been turned off. Data of the relationship RA is measured in advance and stored in a ROM (memory means, memory) of the control device 70.

Conversely, the orientation of the arrow β drawn along the curve of the relationship RA opposite to the arrow α indicates that as the system temperature Th (preset system temperature Tset for starting the scavenging process) at the time of performing the third scavenging process x3 gets lower, the start up performance at low temperatures by the scavenging process becomes low. Further, as the wait time tb until the third scavenging process x3 is performed becomes longer, an improvement is achieved in terms of product merchantability.

It can be seen from the relationship RB, that if the system temperature Th during scavenging becomes lower than a minimum system temperature Thpmin at the time of performing the third scavenging process x3, the fuel cell 14 cannot be operated normally, and it becomes impossible to initiate operation of the fuel cell 14. Therefore, within the available operating temperature range Tsarea of the system temperature Th, at the time of performing the third scavenging process x3, a temperature margin Taf is provided between the minimum preset temperature Tsmin and the minimum system temperature Thpmin where it becomes impossible to initiate operation of the fuel cell 14.

As described above, as the delay in timing of performing the third scavenging process x3 from the time when the ignition switch 76 is turned off becomes larger, an improvement is achieved in terms of product merchantability. The first reason is that an operator, such as the driver of the fuel cell vehicle 12B, can more reliably perform the scavenging process from a position remote from the fuel cell vehicle 12B. The second reason is that the number of unnecessary occurrences at which the third scavenging process x3 is performed is reduced. The third scavenging process x3 is required at the time of actually starting operation of the fuel cell system 10B, but it is not required when restarting operations of the fuel cell system 10B before the temperature of the fuel cell system 10B has reached a low temperature, such as a temperature below the freezing point. Thus, by delaying the timing of performing the scavenging process, it is possible to avoid occurrence of cases in which the scavenging process is performed before reaching a cold state (i.e., cases in which the scavenging process is not required). If the third scavenging process x3 is performed before reaching a cold state, a deterioration in fuel economy occurs due to wasteful discharge of the fuel gas, and also due to the necessity of charging an energy storage, such as the capacitor 16, for compensating the energy consumed during the scavenging process.

Thus, it is preferable for the third scavenging process x3 to be performed at a timing which makes it possible to achieve a desired start up performance at low temperatures, and thus achieve an improvement in terms of product merchantability. The timing of the scavenging process is set using the timer 73, as a time counting means, by predicting a period of time (wait time) tb up to a time for performing the third scavenging process, based on the system temperature Th monitored during soaking, or the system temperature Thstop at the time of stopping the fuel cell system 10B. The wait time tb can be set within a settable area tsarea of the timer 73. More specifically, the settable area tsarea is a time width, which is defined based on the relationship RA with respect to the temperature width between the system temperature Thstop when the ignition switch 76 is turned off and the minimum preset temperature Tsmin.

As described above, the system temperature Th of the fuel cell system 10B during soaking, after power generation has been stopped in response to a request to stop operation of the fuel cell system 10B and after having generated power for only a short period of time at low temperatures, is detected by the temperature sensor 71 operating as a system temperature detection means. During soaking, when the system temperature Th decreases to the preset temperature Tset, the scavenging means performs the third scavenging process x3. In this manner, it is possible to perform the scavenging process while taking the performance of the scavenging process into account. As described above, as the system temperature Th at the time of performing the scavenging process increases, the performance of the scavenging process also becomes higher.

Further, the temperature sensor 71 detects the system temperature Thstop at the time of stopping power generation of the fuel cell system 10B, and sets the timer 73 to the wait time tb, which thereby determines a waiting period from the time when power generation is stopped to the time for performing the third scavenging process x3. The wait time Tb can be set at the time of stopping power generation (i.e., when the ignition switch 76 is turned off) with reference to the relationship RA between the soaking period from the time of power generation and the system temperature Th during the soaking period, wherein this relationship is stored beforehand in the ROM of the control device 70. In this manner, by detecting the system temperature Th=Thstop when power generation is stopped, it is unnecessary to detect the system temperature Th thereafter. As can be seen from the relationship RA, as the wait time tb grows longer, the system temperature Th becomes low and performance of the scavenging process is degraded. If the wait time tb after stopping power generation becomes long, it is more probable that the operator is away from the fuel cell vehicle 12B. In this case, the operator can perform the scavenging process from a position remote from the fuel cell vehicle 12B, which is another advantage in terms of product merchantability. Further, by setting a long time period for the wait time tb, so as to delay the timing at which the scavenging process is performed, the third scavenging process x3 may become unnecessary. The third scavenging process x3 is not required whenever the fuel cell system 10B is restarted before the preset wait time tb has elapsed.

In this case, it is preferable that the preset temperature Tset is not less than the minimum temperature Thpmin, which achieves the desired start up performance when the fuel cell system 10B is restarted at a low temperature, or within an available temperature area Ts area from a temperature (Thpmin+Taf), which is calculated by adding a margin Taf to the minimum temperature Thpmin. Further, it is preferable for the wait time tb to be set within a settable area tsarea (within the maximum period tmax) of the timer 73.

As described above, the trade off between performance of the scavenging process and product merchantability such as fuel economy becomes clear from the relationship RA between the soaking period from the time when power generation is stopped and the system temperature Th during the soaking period.

While the invention has been particularly shown and described with reference to preferred embodiments, it shall be understood that variations and modifications can be effected to the embodiment by those skilled in the art, without departing from the spirit and scope of the invention as defined by the appended claims.

What is claimed is:
1. A fuel cell system comprising:
 a fuel cell operated to generate power by reaction of a fuel gas supplied to a fuel gas flow field and an oxygen-containing gas supplied to an oxygen-containing gas flow field;
 scavenging means for scavenging in at least one of said fuel gas flow field where the fuel gas flows and said oxygen-containing gas flow field where the oxygen-containing gas flows, using a scavenging gas when power generation by said fuel cell is stopped; and water amount detection means for detecting an amount of water produced in said fuel gas flow field as a result of power generation of said fuel cell when operation of said fuel cell is stopped, wherein when the amount of water in said fuel gas flow field is at or below a predetermined value, said scavenging means performs:

a first scavenging process for scavenging in said oxygen-containing gas flow field using the scavenging gas at a large flow rate in order to remove liquid droplets in said oxygen-containing gas flow field;

a second scavenging process for scavenging in said fuel gas flow field using the scavenging gas at a large flow rate in order to remove liquid droplets in said fuel gas flow field, the second scavenging process performed sequentially either before or after the first scavenging process; and a third scavenging process for scavenging in said oxygen-containing gas flow field after the first scavenging process using a scavenging gas at a small flow rate, which is smaller than the large flow rate.

2. A fuel cell system according to claim 1, wherein said water amount detection means detects the water amount based on a moisture state at the time of starting operation of said fuel cell, as well as a moisture state at the time of stopping operation of said fuel cell.

3. A scavenging method for a fuel cell system, comprising a fuel cell operated to generate power by reaction of a fuel gas supplied to a fuel gas flow field and an oxygen-containing gas supplied to an oxygen-containing gas flow field, wherein when power generation is stopped, scavenging is performed using a scavenging gas, so as to conduct scavenging in at least one of said fuel gas flow field where the fuel gas flows and said oxygen-containing gas flow field where the oxygen-containing gas flows, the method comprising the step of:

detecting an amount of water produced in said fuel gas flow field by power generation of said fuel cell, at a time when operation of said fuel cell is stopped, wherein, when the amount of water in said fuel gas flow field is at or below a predetermined value, the method further comprises the steps of:

performing a first scavenging process for scavenging in said oxygen-containing gas flow field using the scavenging gas at a large flow rate in order to remove liquid droplets in said oxygen-containing gas flow field;

performing a second scavenging process for scavenging in said fuel gas flow field using the scavenging gas at the large flow rate in order to remove liquid droplets in said fuel gas flow field, the second scavenging process performed sequentially either before or after the first scavenging process; and performing a third scavenging process after the first scavenging process has been performed, for scavenging in said oxygen-containing gas flow field using the scavenging gas at a small flow rate, which is smaller than the large flow rate.

4. A scavenging method according to claim 3, wherein in the water amount detection step, the water amount is detected based on a moisture state at the time of starting operation of said fuel cell, as well as a moisture state at the time of stopping operation of said fuel cell.

5. A fuel cell system comprising:

a fuel cell operated to generate power by reaction of a fuel gas supplied to a fuel gas flow field and an oxygen-containing gas supplied to an oxygen-containing gas flow field; and scavenging means for scavenging in at least one of said fuel gas flow field where the fuel gas flows and said oxygen-containing gas flow field where the oxygen-containing gas flows, using a scavenging gas when power generation by said fuel cell is stopped, wherein said scavenging means performs:

a first scavenging process for scavenging in said oxygen-containing gas flow field using the scavenging gas at a large flow rate in order to remove liquid droplets in said oxygen-containing gas flow field;

a second scavenging process for scavenging in said fuel gas flow field using the scavenging gas at the large flow rate in order to remove liquid droplets in said fuel gas flow field; and a third scavenging process for scavenging in said oxygen-containing gas flow field using the scavenging gas at a small flow rate, which is smaller than the large flow rate, and wherein the second and third scavenging processes are performed after the first scavenging process in order of the second scavenging process followed by the third scavenging process, or in order of the third scavenging process followed by the second scavenging process; and the fuel gas in said fuel gas flow field is diluted and discharged at the same time in the first scavenging process or in the second scavenging process.

6. A fuel cell system according to claim 5, wherein the third scavenging process is performed after the first scavenging process, and after a predetermined condition has been satisfied.

7. A fuel cell system according to claim 5, further comprising a system temperature detection means for detecting a temperature of said fuel cell system during a soaking period after stopping power generation, wherein said scavenging means performs the third scavenging process when the system temperature decreases to a preset temperature during the soaking period.

8. A fuel cell system according to claim 5, further comprising:

system temperature detection means for detecting a temperature of said fuel cell system at the time of stopping power generation; and time counting means having a preset wait time from the time of stopping power generation until the time for performing the third scavenging process, wherein the wait time is set at the time of stopping power generation, based on a relationship between the soaking period from the time of stopping power generation and the system temperature during the soaking period.

9. A fuel cell system according to claim 7, wherein the preset temperature is set at or above a minimum temperature, the minimum temperature being determined based on the relationship between the soaking period from the time of stopping power generation and the system temperature during the soaking period, so as to achieve a predetermined start up performance when a restarting operation is conducted at low temperature.

10. A fuel cell system according to claim 8, wherein the wait time is within a maximum period, which is determined based on the relationship between the soaking period from the time of stopping power generation and the system temperature during the soaking period, so as to achieve a predetermined start up performance when the restarting operation is conducted at low temperature.

11. A scavenging method for a fuel cell system, comprising a fuel cell operated to generate power by reaction of a fuel gas supplied to a fuel gas flow field and an oxygen-containing gas supplied to an oxygen-containing gas flow field, wherein when power generation is stopped, scavenging is performed using a scavenging gas, so as to conduct scavenging in at least one of said fuel gas flow field where the fuel gas flows and said oxygen-containing gas flow field where the oxygen-containing gas flows, the method comprising the steps of:

performing a first scavenging process in said oxygen-containing gas flow field for scavenging using the scavenging gas at a large flow rate in order to remove liquid droplets in said oxygen-containing gas flow field;

performing a second scavenging process in said fuel gas flow field for scavenging using the scavenging gas at the large flow rate in order to remove liquid droplets in said fuel gas flow field; and performing a third scavenging process for scavenging in said oxygen-containing gas flow field using the scavenging gas at a small flow rate, which is smaller than the large flow rate, and wherein the second and third scavenging processes are performed after the first scavenging process in no particular order; and the fuel gas in said fuel gas flow field is diluted and discharged at the same time in the first scavenging process or in the second scavenging process.

12. A scavenging method according to claim 11, wherein the third scavenging process is performed after the first scavenging process, and after a predetermined condition has been satisfied.

13. A scavenging method according to claim 11, wherein said third scavenging process is performed when a system temperature of said fuel cell system decreases to a preset temperature during a soaking period after stopping power generation.

14. A scavenging method according to claim 11, further comprising the step of setting a wait time from the time of stopping power generation until the time for performing the third scavenging process, wherein the wait time is set at the time of stopping power generation, based on a relationship between the soaking period from the time of stopping power generation and the system temperature during the soaking period.

15. A scavenging method according to claim 13, wherein the preset temperature is set at or above a minimum temperature, the minimum temperature being determined based on the relationship between the soaking period from the time of stopping power generation and the system temperature during the soaking period, so as to achieve a predetermined start up performance when a restarting operation is conducted at low temperature.

16. A scavenging method according to claim 14, wherein the wait time is within a maximum period which is determined based on the relationship between the soaking period from the time of stopping power generation and the system temperature during the soaking period, so as to achieve a predetermined start up performance when the restarting operation is conducted at low temperature.

* * * * *